United States Patent
Lee et al.

(10) Patent No.: US 12,393,237 B2
(45) Date of Patent: **\*Aug. 19, 2025**

(54) DISPLAY DEVICE INCLUDING A METAL PATTERN

(71) Applicant: SAMSUNG DISPLAY CO., LTD., Yongin-si (KR)

(72) Inventors: Hyun Jae Lee, Seongnam-si (KR); Jang Hui Kim, Suwon-si (KR); Kang Won Lee, Seoul (KR); Sang Chul Lee, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/739,302

(22) Filed: Jun. 10, 2024

(65) Prior Publication Data

US 2024/0329699 A1 Oct. 3, 2024

Related U.S. Application Data

(63) Continuation of application No. 17/154,649, filed on Jan. 21, 2021, now Pat. No. 12,007,815.

(30) Foreign Application Priority Data

Apr. 14, 2020 (KR) .................... 10-2020-0045007

(51) Int. Cl.
*G06F 1/16* (2006.01)
*H01Q 1/38* (2006.01)

(52) U.S. Cl.
CPC ............. *G06F 1/1698* (2013.01); *H01Q 1/38* (2013.01)

(58) Field of Classification Search
CPC ....... G06F 1/1698; G06F 3/0412; H01Q 1/38; H01Q 1/52; H01Q 1/243; H04M 1/0266
See application file for complete search history.

(56) References Cited

U.S. PATENT DOCUMENTS

| | | | |
|---|---|---|---|
| 9,325,072 B2 | 4/2016 | Oh et al. | |
| 9,715,290 B2 | 7/2017 | Kim et al. | |
| 10,845,905 B2 | 11/2020 | Kanaya | |
| 11,340,722 B2 * | 5/2022 | Oh | G06F 3/0446 |
| 2014/0111953 A1 | 4/2014 | McClure et al. | |
| 2015/0324056 A1 | 11/2015 | Sato | |
| 2016/0188092 A1 | 6/2016 | Sebastian et al. | |
| 2017/0139520 A1 | 5/2017 | Yeh et al. | |
| 2019/0220123 A1 * | 7/2019 | Kanaya | H10K 59/40 |
| 2020/0067176 A1 * | 2/2020 | Kim | H01Q 1/38 |

(Continued)

FOREIGN PATENT DOCUMENTS

| | | |
|---|---|---|
| KR | 10-2016-0048534 A | 5/2016 |
| KR | 10-1632237 | 6/2016 |
| KR | 10-1704536 | 2/2017 |

(Continued)

*Primary Examiner* — Angelica Perez
(74) *Attorney, Agent, or Firm* — Womble Bond Dickinson (US) LLP

(57) ABSTRACT

A display device includes: a substrate; a first sensor electrode and a second sensor electrode disposed on the substrate; an antenna electrically separated from the first sensor electrode to transmit and receive radio frequency signals; and an antenna feed line electrically connected to the antenna pattern.

20 Claims, 42 Drawing Sheets

(56) References Cited

U.S. PATENT DOCUMENTS

2022/0247069 A1\* 8/2022 Kim .................. H01Q 1/52
2022/0416402 A1   12/2022 Choi et al.

FOREIGN PATENT DOCUMENTS

| KR | 10-2019-0019802   | 2/2019 |
| KR | 10-2019-0086350 A | 7/2019 |
| KR | 10-2019-0090226 A | 8/2019 |
| KR | 10-2009382        | 8/2019 |

\* cited by examiner

DISPLAY DEVICE INCLUDING A METAL PATTERN

CROSS-REFERENCE TO RELATED APPLICATIONS

This application is a continuation of U.S. patent application Ser. No. 17/154,649, filed Jan. 21, 2021, which claims priority to and the benefit of Korean Patent Application No. 10-2020-0045007, filed Apr. 14, 2020, the entire content of both of which is incorporated herein by reference.

BACKGROUND

Field

Embodiments of the invention relate generally to a display device and, more specifically, to a display device including an antenna.

Discussion of the Background

As the information-oriented society evolves, various demands for display devices are ever increasing. For example, display devices are being employed by a variety of electronic devices such as smart phones, digital cameras, laptop computers, navigation devices, and smart televisions.

A display device may include an antenna that transmits and receives wireless electromagnetic waves for wireless communications. For example, a display device may include an antenna for fourth generation (4G) mobile communications and fifth generation (5G) mobile communications such as long-term evolution (LTE). Therefore, there may be a variety of the frequency bands of wireless electromagnetic waves that are transmitted and received depending on the communication techniques, and the shapes or lengths of the antennas may vary depending on the frequency bands of the wireless electromagnetic waves. Therefore, a display device requires different antennas for different frequency bands of wireless electromagnetic waves. For this reason, a display panel including an antenna pattern for implementing an antenna has been recently studied.

The above information disclosed in this Background section is only for understanding of the background of the inventive concepts, and, therefore, it may contain information that does not constitute prior art.

SUMMARY

Applicant recognized that it is difficult to integrate multiple antennas in a display device without substantially increasing the size or cost of the display device, which is especially disadvantageous in portable electronic devices like mobile phones, and without decreasing the performance characteristics of the display, including e.g., luminance.

Display devices constructed according to the principles and embodiments of the invention are capable of transmitting and receiving radio frequency signals through an antenna, such as an antenna pattern, which may be implemented utilizing a sensor electrode for sensing the touch of a user.

Display devices constructed according to the principles and some embodiments of the invention include antenna patterns as well as driving electrodes and sensing electrodes. Therefore, such a display device can sense a touch of an object or a person using the mutual capacitance between the driving electrodes and the sensing electrodes as well as transmit and receive radio frequency signals using the antenna patterns.

In display devices constructed according to the principles and some embodiments of the invention, the antenna patterns and the antenna pads are all disposed adjacent to one side of a touch sensor area, so the length of the antenna feed lines connecting the antenna patterns with the antenna pads can be reduced. Accordingly, it is possible to reduce loss of radio frequency signals transmitted through the antenna feed lines.

In display devices constructed according to the principles and some embodiments of the invention the touch sensor area includes antenna patterns, so antenna patterns may be formed simultaneously when the driving electrodes, sensing electrodes, and dummy patterns are formed. Therefore, no additional process for forming antenna patterns is required.

In display devices constructed according to the principles and some embodiments of the invention antenna patterns are formed in place of some dummy patterns in the touch sensor area, so a high degree of design freedom can be achieved for the number and size of antenna patterns.

In display devices constructed according to the principles and some embodiments of the invention, shielding electrodes overlap the antenna feed lines in the third direction (z-axis direction) of the display device, so that the electric field by the radio frequency signals applied to the antenna feed lines from the outside can be blocked by the shielding electrodes. As a result, it is possible to reduce the sensor electrodes from being affected by the electric field of the antenna feed lines.

In display devices constructed according to the principles and some embodiments of the invention, the antenna pattern and the antenna feed line are directly connected without passing through the contact holes, and thus it is possible to prevent loss of radio frequency signals caused by the contact resistance in the contact holes. In this manner, when the display device is employed by a portable electronic device including a battery such as a mobile phone, a smart phone and a tablet PC, it is possible to prevent the battery lifetime from being reduced due to additional power consumption caused by loss of radio frequency signals.

In display devices constructed according to the principles and some embodiments of the invention, when an antenna pattern is connected to a first antenna feed line and a second antenna feed line in the display device, the radio frequency signal of a first polarized wave can be transmitted and received via the first antenna feed line, and the radio frequency signal of a second polarized wave can be can be transmitted and received via the second antenna feed line. That is, two radio frequency signals of polarized waves can be transmitted and received using a single antenna pattern.

In display devices constructed according to the principles and some embodiments of the invention may include a plurality of antenna patterns having different areas, so that a plurality of radio frequency signals having different frequencies can be transmitted and received.

Additional features of the inventive concepts will be set forth in the description which follows, and in part will be apparent from the description, or may be learned by practice of the inventive concepts.

According to one aspect of the invention, a display device includes: a substrate; a first sensor electrode and a second sensor electrode disposed on the substrate; an antenna electrically separated from the first sensor electrode to transmit and receive radio frequency signals; and an antenna feed line electrically connected to the antenna pattern.

The antenna may be at least partially surrounded by the first sensor electrode.

The line may be connected to the antenna through a first contact hole penetrating through a first sensor insulating layer disposed between the antenna and the line in a thickness direction of the substrate.

The line may overlap the first sensor electrode in the thickness direction of the substrate.

The display device may further include: a second sensor line disposed on the first sensor insulating layer and connected to the second sensor electrode. The line may intersect the second sensor line.

The line may be connected to an antenna pad that is disposed on the substrate, and the antenna pad may be exposed by the first sensor insulating.

The line may include an antenna feed line including: a first subsidiary antenna feed line disposed on the substrate; and a second subsidiary antenna feed line disposed on the first subsidiary antenna feed line. A first sensor insulating layer may be disposed between the first subsidiary antenna feed line and the second subsidiary antenna feed line, and the first subsidiary antenna feed line may be connected to the second subsidiary antenna feed line through a first feed contact hole penetrating through the first sensor insulating layer.

The display device may further include: a second sensor line disposed on the substrate and connected to the second sensor electrode. The second subsidiary antenna feed line may intersect the second sensor line.

The display device may further include: a second sensor line disposed on the first sensor insulating layer and connected to the second sensor electrode. The first subsidiary antenna feed line may intersect the second sensor line.

The second subsidiary antenna feed line may be connected to an antenna pad disposed on the first sensor insulating layer.

The line may include an antenna feed line including: a first subsidiary antenna feed line disposed on the substrate; a second subsidiary antenna feed line disposed on the first subsidiary antenna feed line; and a third subsidiary antenna feed line disposed on the substrate. A first sensor insulating layer may be disposed between the first subsidiary antenna feed line and the second subsidiary antenna feed line, the first subsidiary antenna feed line may be connected to the second subsidiary antenna feed line through a first feed contact hole penetrating through the first sensor insulating layer, and the third subsidiary antenna feed line may be connected to the second subsidiary antenna feed line through a second feed contact hole penetrating through the first sensor insulating layer.

The display device may further include: a second sensor line disposed on the substrate and connected to the second sensor electrode. The second subsidiary antenna feed line may intersect the second sensor line.

The third subsidiary antenna feed line may be connected to an antenna pad disposed on the substrate and exposed by the first sensor insulating layer.

The display device may further include: a blocking member electrically separated from the first sensor electrode and overlapping the line in a thickness direction of the substrate to block electric fields caused by radio frequency signals applied to the line.

The blocking member may include a shielding electrode.

The antenna may include an antenna pattern and may further include a capacitor electrode pattern overlapping the antenna in a thickness direction of the substrate and connected to the line.

The display device may further include: a second sensor line disposed on the substrate and connected to the second sensor electrode. The antenna and the line may be disposed on a first sensor insulating layer disposed on the second sensor line.

The line may intersect the second sensor line.

The line may be connected to an antenna pad disposed on the first sensor insulating layer.

The line may include an antenna feed line including: a first subsidiary antenna feed line disposed on the first sensor insulating layer; and a second subsidiary antenna feed line disposed on the substrate and connected to the first subsidiary antenna feed line through a first feed contact hole penetrating through the first sensor insulating layer.

The display device may further include: a second sensor line disposed on the substrate and connected to the second sensor electrode. The first subsidiary antenna feed line may intersect the second sensor line.

The display device may further include: a second sensor line disposed on the first sensor insulating layer and connected to the second sensor electrode. The second subsidiary antenna feed line intersects the second sensor line.

The second subsidiary antenna feed line may be connected to an antenna pad disposed on the substrate, and the antenna pad may be exposed by the first sensor insulating layer.

The line may include an antenna feed line including: a first subsidiary antenna feed line disposed on the first sensor insulating layer; a second subsidiary antenna feed line disposed on the substrate; and a third subsidiary antenna feed line disposed on the first sensor insulating layer and spaced apart from the first subsidiary antenna feed line. The first subsidiary antenna feed line may be connected to the second subsidiary antenna feed line through the first feed contact hole penetrating through the first sensor insulating layer, and the third subsidiary antenna feed line may be connected to the second subsidiary antenna feed line through a second feed contact hole penetrating through the first sensor insulating layer.

The display device may further include: a second sensor line disposed on the first sensor insulating layer and connected to the second sensor electrode. The second subsidiary antenna feed line may intersect the second sensor line.

The third subsidiary antenna feed line may be disposed on the first sensor insulating layer.

According to another aspect of the invention, a display device includes: a substrate; first sensor electrode a disposed on the substrate; an antenna pattern including a first antenna pattern and a second antenna pattern electrically separated from the first sensor electrodes; a first antenna feed line electrically connected to the first antenna pattern; and a second antenna feed line electrically connected to the second antenna pattern and electrically separated from the first antenna feed line. The first antenna pattern is configured to transmit and receive a radio frequency signal of a first polarized wave through the first antenna feed line. The second antenna pattern is configured to transmit and receive a radio frequency signal of a second polarized wave through the second antenna feed line.

The display device may further include: a first shield disposed between the first antenna feed line and the second antenna line and electrically separated from the first antenna feed line and the second antenna line.

The first antenna feed line and the second antenna feed line may be electrically separated from the first sensor electrode.

The display device may further include: a second shield disposed between the first antenna feed line and one of the first sensor electrodes and electrically separated from the first antenna feed line and the first sensor electrodes; and a third shield disposed between the second antenna feed line and another one of the first sensor electrode, and electrically separated from the second antenna feed line and the first sensor electrodes.

The first, second and third shields may include first, second and third shielding lines, respectively.

According to still another aspect of the invention, a display device includes: a substrate; first sensor electrodes disposed on the substrate; a first antenna electrically separated from one of the first sensor electrodes; and a second antenna electrically separated from another one of the first sensor electrodes. The first antenna has a first area and the second antenna has a second area different from the first area.

The first antenna may be configured to transmit and receive a first radio frequency signal and the second antenna may be configured to transmit and receive a second radio frequency signal different from the first radio frequency signal.

The first antenna may include a first antenna pattern, the second antenna comprises a second antenna pattern and may further include: a first antenna feed line electrically connected to the first antenna pattern; and a second antenna feed line electrically connected to the second antenna pattern.

An area of a first sensor electrode adjacent to the first antenna may be different from an area of a first sensor electrode adjacent to the second antenna.

An area of a first sensor electrode adjacent to the first antenna may be substantially equal to an area of a first sensor electrode adjacent to the second antenna.

The display device may further include an antenna connection electrode electrically connecting the first antenna with the second antenna.

The display device may further include an antenna line electrically connected to the first antenna, the second antenna, and the antenna connection electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1:
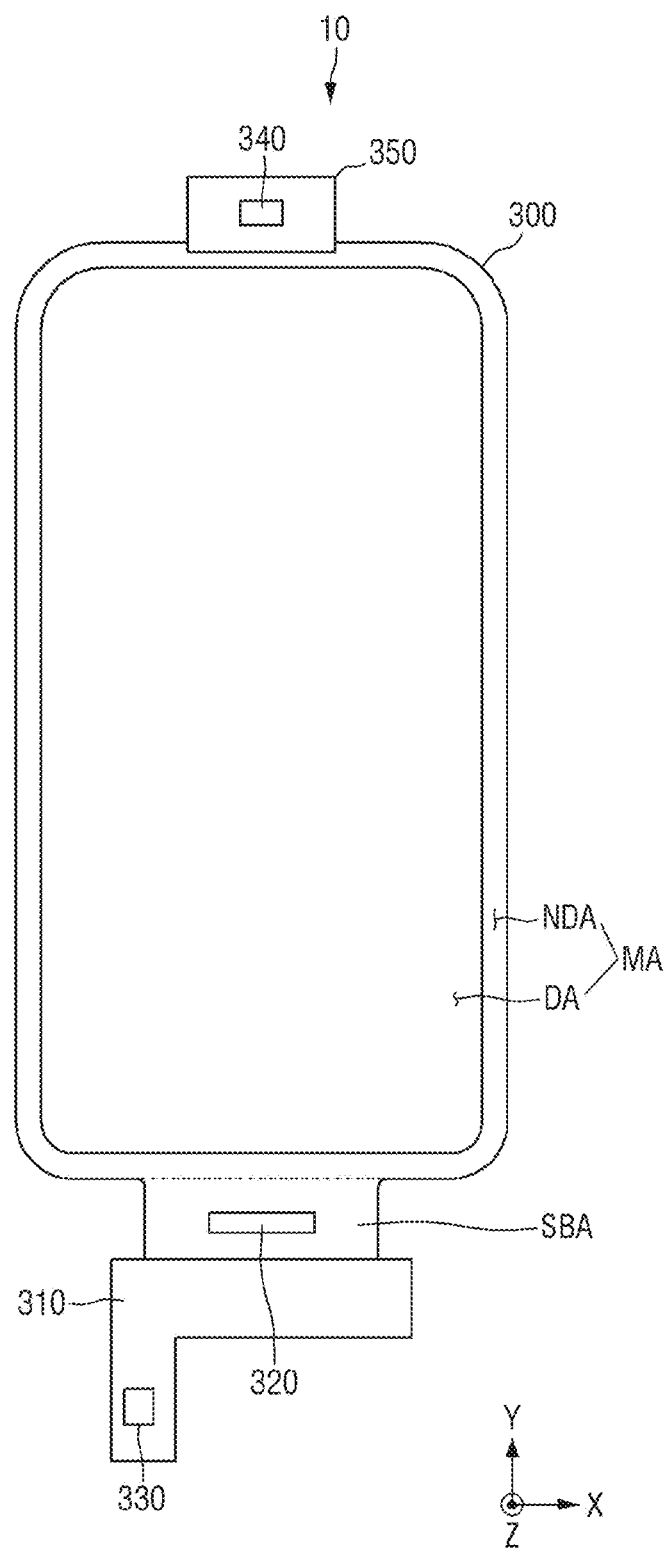
FIG. 1 is a plan view of an exemplary embodiment of a display device constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a plan view of an exemplary embodiment of a display device constructed according to the principles of the invention.

Referring to FIG. 1, a display device 10 may be applied to or take the form of various electronic devices including, e.g., portable electronic devices such as a mobile phone, a smart phone, a tablet PC, a mobile communications terminal, an electronic notebook, an electronic book, a portable multimedia player (PMP), a navigation device and a ultra mobile PC (UMPC). Alternatively, the display device 10 may be used as a display unit of a television, a laptop computer, a monitor, an electronic billboard, or the Internet of Things (IoT). Alternatively, the display device 10 according to the exemplary embodiment may be applied to wearable devices such as a smart watch, a watch phone, a glasses-type display, and a head-mounted display (HMD) device. Alternatively, the display device 10 according to some embodiments may be used as a center information display (CID) disposed at the instrument cluster, the center fascia or the dashboard of a vehicle, as a room mirror display on the behalf of to the side mirrors of a vehicle, as a display placed on the back of each of the front seats that is an entertainment system for passengers at the rear seats of a vehicle.

As used herein, the first direction (x-axis direction) may be the shorter side direction of the display device 10, for example, the horizontal direction of the display device 10. The second direction (y-axis direction) may be the longer side direction of the display device 10, for example, the vertical direction of the display device 10. The third direction (z-axis direction) may refer to the thickness direction of the display device 10.

The display device 10 may have a generally quadrangular shape when viewed from the top. For example, the display device 10 may have a generally quadrangular shape having shorter sides in a first direction (x-axis direction) and longer sides in a second direction (y-axis direction) when viewed from the top as shown in FIG. 1. Each of the corners where the short side in the first direction (x-axis direction) meets the longer side in the second direction (y-axis direction) may be rounded with a predetermined curvature or may be a right angle. The shape of the display device 10 when viewed from the top is not limited to a quadrangular shape. For example, the shape of the display device 10 when viewed from the top may be formed in other regular or irregular shapes including other generally polygonal shapes, a circular shape, or an elliptical shape to name a few examples.

According to an exemplary embodiment, the display device 10 includes a display panel 300, a display circuit board 310, a display driver circuit 320, a touch driver circuit 330, an antenna driver circuit 340 and an antenna circuit board 350.

The display panel 300 may be a light-emitting display panel including light-emitting elements. For example, the display panel 300 may be an organic light-emitting display panel using organic light-emitting diodes including organic emissive layer, a micro light-emitting diode display panel using micro LEDs, a quantum-dot light-emitting display panel including quantum-dot light-emitting diodes including an quantum-dot emissive layer, or an inorganic light-emitting display panel using inorganic light-emitting elements including an inorganic semiconductor.

The display panel 300 may be a rigid display panel that is substantially rigid and thus is not easily bent, or a flexible display panel that is flexible and thus can be easily bent, folded or rolled. For example, the display panel 300 may be a foldable display panel that can be folded and unfolded, a curved display panel having a curved display surface, a bendable display panel having a bent area other than the display surface, a rollable display panel that can be rolled and unrolled, and a stretchable display panel that can be stretched.

Alternatively, the display panel 300 may be implemented as a transparent display panel to allow a user to see an object or a background under the display panel from above the display panel 300 through it. Alternatively, the display panel 300 may be implemented as a reflective display panel that can reflect an object or a background on the upper surface of the display panel 300.

The display panel 300 may include a main area MA and a subsidiary area SBA extending from one side of the main area MA.

The main area MA may include a display area DA where images are displayed, and a non-display area NDA around the display area DA. The display area DA may occupy most of the main area MA. The display area DA may be disposed at the center of the main area MR. The non-display area NDA may be disposed on the outer side of the display area DA. The non-display area NDA may be defined as an edge of the display panel 300.

Figure 2:
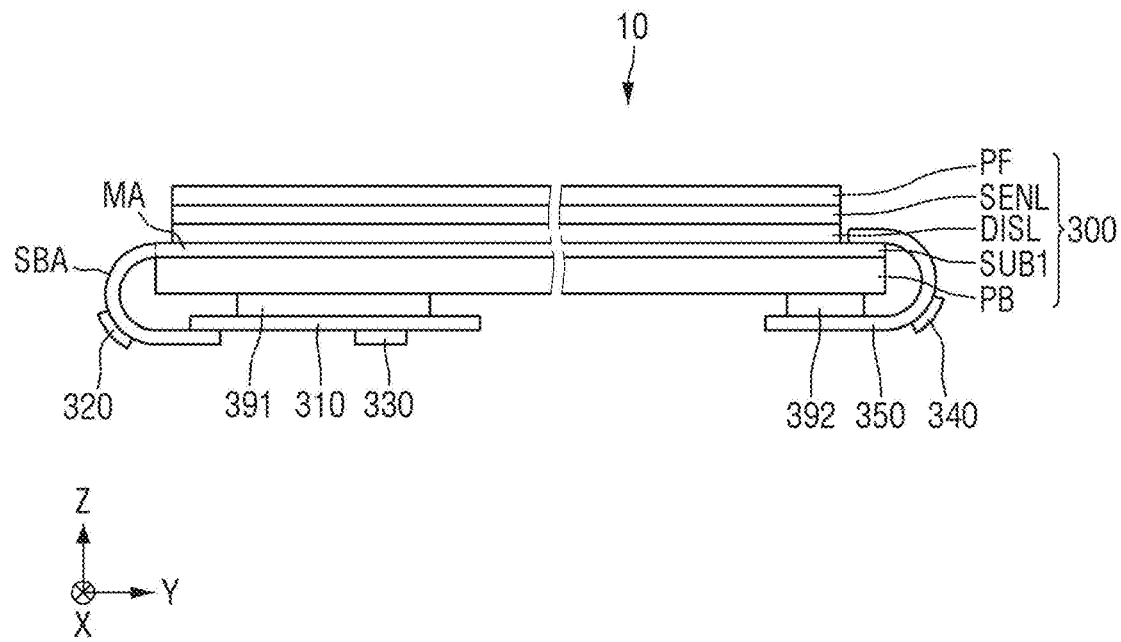
FIG. 2 is a cross-sectional view of an exemplary embodiment of the display device of FIG. 1.

The subsidiary area SBA may project from one side of the main area MA in the second direction (y-axis direction). As shown in FIG. 2, the length of the subsidiary area SBA in the first direction (x-axis direction) may be smaller than the length of the main area MA in the first direction (x-axis direction). The length of the subsidiary area SBA in the second direction (y-axis direction) may be smaller than the length of the main area MA in the second direction (y-axis direction). It is, however, to be understood that the embodiments are not limited thereto. The subsidiary area SBA may be bent and disposed on the lower surface of the display panel 300, as shown in FIG. 2. The subsidiary area SBA may overlap with the main area MA in the thickness direction (z-axis direction).

The subsidiary area SBA of the display panel 300 may be bent so that it is located under the display panel 300, as shown in FIG. 2. The subsidiary area SBA of the display panel 300 may overlap with the main area MA of the display panel 300 in the third direction (z-axis direction).

The display circuit board 310 may be attached to the subsidiary area SBA of the display panel 300. The display circuit board 310 may be attached on pads of the subsidiary area SBA of the display panel 100 using a low-resistance, high-reliability material such as an anisotropic conductive film and a self assembly anisotropic conductive paste (SAP). The display circuit board 310 may be a flexible printed circuit board (FPCB) that can be bent, a rigid printed circuit board (PCB) that is rigid and not bendable, or a hybrid printed circuit board including a rigid printed circuit board and a flexible printed circuit board.

The display driver circuit 320 may be disposed on the subsidiary area SBA of the display panel 300. The display driver circuit 320 may receive control signals and supply voltages and may generate and output signals and voltages for driving the display panel 300. The display driver circuit 320 may be implemented as an integrated circuit (IC).

A touch driver circuit 330 may be disposed on the display circuit board 310. The touch driver circuit 330 may be implemented as an integrated circuit. The touch driver circuit 330 may be attached on the display circuit board 310.

The touch driver circuit 330 may be electrically connected to sensor electrodes of a sensor electrode layer of the display panel 300 through the display circuit board 310. Therefore, the touch driver circuit 330 may output a touch driving signal to each of the sensor electrodes and may sense a voltage charged in mutual capacitance of the sensor electrodes. The sensor electrodes of the sensor electrode layer will be described later with reference to FIG. 4.

The touch driver circuit 330 may generate touch data based on a change in the electric signals sensed by each of the sensor electrodes to transmit it to the main processor 710, and the main processor 710 may analyze the touch data to calculate the coordinates of the position where the touch input is made. Touches may include a physical contact and a near proximity. A physical contact refers to when an object such as the user's finger or a pen is brought into contact with the cover window disposed on the sensor electrode layer. A near proximity refers to when an object such as a person's finger or a pen is close to but is spaced apart from the cover window 100, such as hovering over it.

On the display circuit board 310, a power supply for supplying driving voltages for driving the display pixels and the display driver circuit 320 of the display panel 300 may be further disposed. Alternatively, the power supply may be integrated with the display driver circuit 320, in which case, the display driver circuit 320 and the power supply may be implemented as a single integrated circuit.

The antenna circuit board 350 may be attached to the main area MA of the display panel 300. The antenna circuit board 350 may be attached on antenna pads of the main area MA of the display panel 300 using a low-resistance, high-reliability material such as an anisotropic conductive film and a self assembly anisotropic conductive paste (SAP).

The antenna circuit board 350 may be a flexible printed circuit board that can be bent or a flexible film such as a chip-on-film. The antenna circuit board 350 may be bent so that it is located under the display panel 300. In addition, although the antenna circuit board 350 is disposed on the upper side of the display panel 300 in the example shown in FIG. 1, the embodiments are not limited thereto. The antenna circuit board 350 may be disposed on the left or right side of the display panel 300.

An antenna driver circuit 340 may be disposed on the antenna circuit board 350. The antenna driver circuit 340 may be electrically connected to an antenna that may be in the form of antenna patterns of the sensor electrode layer of the display panel 300 through the antenna circuit board 350. Therefore, the antenna driver circuit 340 may receive a radio frequency signal received at the antenna patterns and may output the radio frequency signal to the antenna patterns. The antenna circuit board 350 may be implemented as an integrated circuit (IC). The antenna patterns of the sensor electrode layer will be described later with reference to FIG. 4.

The antenna driver circuit 340 may process radio frequency signals transmitted and received at the antenna patterns. For example, the antenna driver circuit 340 may change the amplitude of the radio frequency signal received at the antenna patterns. Alternatively, the antenna driver circuit 340 may not only change the amplitude of the radio frequency signal received at the antenna patterns, but also the phase. The antenna driver circuit 340 may transmit the processed radio frequency signal to the mobile communications module.

In addition, the antenna driver circuit 340 may change the amplitude of the radio frequency signal transmitted from the mobile communications module. Alternatively, the antenna driver circuit 340 may change not only the amplitude of the radio frequency signal received at the mobile communications module, but also the phase. The antenna driver circuit 340 may transmit the processed radio frequency signal to the antenna patterns.

FIG. 2 is a cross-sectional view of an exemplary embodiment of the display device of FIG. 1.

Referring to FIG. 2, the display panel 300 may include a first substrate SUB1, a display layer DISL, a sensor electrode layer SENL, a polarizing film PF, and a panel bottom cover PB.

The first substrate SUB1 may be made of an insulating material such as glass, quartz and a polymer resin. The first substrate SUB1 may be a rigid substrate or a flexible substrate that can be bent, folded, rolled, and so on.

The display layer DISL may be disposed on the main area MA of the first substrate SUB1. The display layer DISL may include emission areas to display images. The display layer DISL may include a thin-film transistor layer on which thin-film transistors are formed, an emission material layer on which light-emitting elements emitting light are disposed in the emission areas, and an encapsulation layer for encapsulating the emission material layer.

In addition to the emission areas, scan lines, data lines, power lines, etc. for driving light-emitting elements may be disposed in the display area DA of the display layer DISL. In the non-display area NDA of the display layer DISL, a scan driver outputting scan signals to the scan lines, fan-out lines connecting the data lines with the display driver circuit 320, etc. may be disposed.

The sensor electrode layer SENL may be disposed on the display layer DISL. The sensor electrode layer SENL may include sensor electrodes and antenna patterns. The sensor electrode layer SENL may be a layer for sensing a touch using the sensor electrodes and transmitting and receiving radio frequency signals using the antenna patterns.

The polarizing film PF may be disposed on the sensor electrode layer SENL. The polarizing film PF may include a first base member, a linear polarizer, a retardation film such as a λ/4 (quarter-wave) plate, and a second base member. The first base member, the retardation film, the linear polarizer and the second base member may be sequentially disposed on the sensor electrode layer SENL.

The cover window may be disposed on the polarizing film PF. The cover window may be attached onto the polarizing film PF by a transparent adhesive member such as an optically clear adhesive (OCA) film.

A panel bottom cover PB may be disposed under the display panel 300. The panel bottom cover PB may be attached to the lower surface of the display panel 300 by an adhesive member. The adhesive member may be a pressure-sensitive adhesive (PSA). The panel bottom cover PB may include at least one of: a light-blocking member for absorbing light incident from outside, a buffer member for absorbing external impact, and a heat dissipating member for efficiently discharging heat from the display panel 300.

The light-blocking member may be disposed under the display panel 300. The light-blocking member blocks the transmission of light to prevent the elements disposed thereunder from being seen from above the display panel 300, such as the display circuit board 310. The light-blocking member may include a light-absorbing material such as a black pigment and a black dye.

The buffer member may be disposed under the light-blocking member. The buffer member absorbs an external impact to prevent the display panel 300 from being damaged. The buffer member may be made up of a single layer or multiple layers. For example, the buffer member may be formed of a polymer resin such as polyurethane, polycarbonate, polypropylene and polyethylene, or may be formed of a material having elasticity such as a rubber and a sponge obtained by foaming a urethane-based material or an acrylic-based material.

The heat dissipating member may be disposed under the buffer member. The heat-dissipating member may include a first heat dissipation layer including graphite or carbon nanotubes, and a second heat dissipation layer formed of a thin metal film such as copper, nickel, ferrite and silver, which can block electromagnetic waves and have high thermal conductivity.

The subsidiary area SBA of the first substrate SUB1 may be bent and may be disposed under the display panel 300. The subsidiary area SBA of the first substrate SUB1 may be attached to the lower surface of the panel bottom cover PB by an adhesive layer 391.

In addition, the antenna circuit board 350 may be attached on the upper surface of the first substrate SUB1 using a low-resistance, high-reliability material such as an anisotropic conductive film and a self assembly anisotropic conductive paste (SAP). The antenna circuit board 350 may be bent so that it is located under the display panel 300. The antenna circuit board 350 may be attached on the lower surface of the panel bottom cover PB by an adhesive layer 392. The adhesive layers 391 and 392 may be pressure sensitive adhesives.

Alternatively, the sensor electrode layer SENL may be disposed on a separate transparent substrate and then attached to the second substrate SUB2 via a lamination process or the like.

Figure 3:
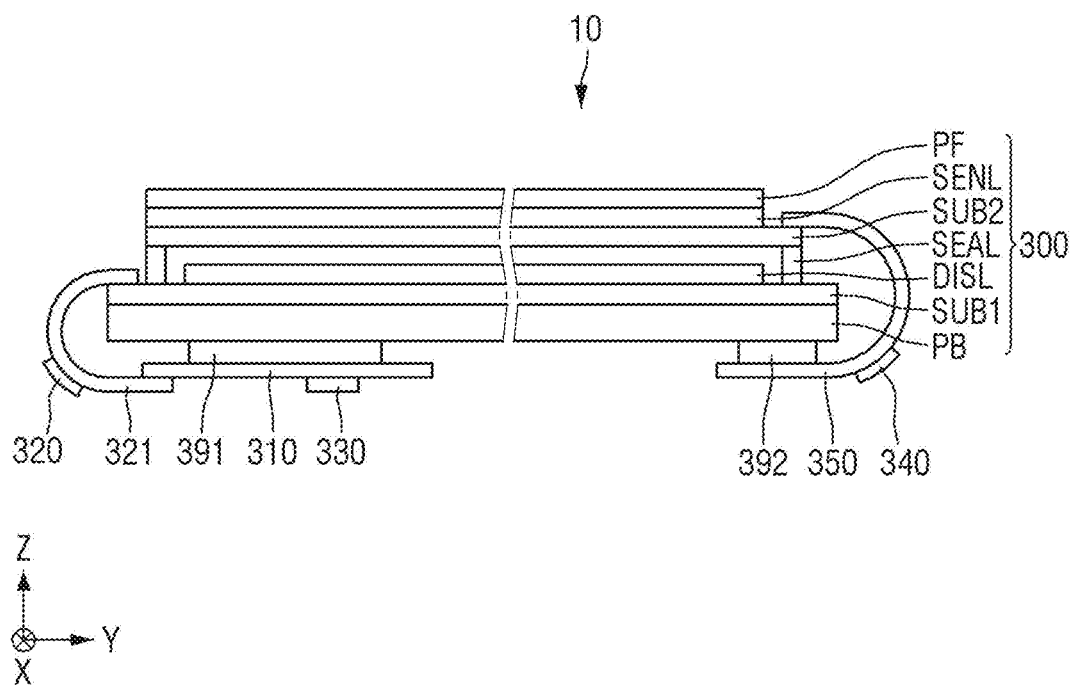
FIG. 3 is a cross-sectional view of another exemplary embodiment of the display device of FIG. 1.

FIG. 3 is a cross-sectional view of an exemplary embodiment of the display device of FIG. 1.

Referring to FIG. 3, the display panel 300 may include a first substrate SUB1, a display layer DISL, an adhesive member SEAL, a second substrate SUB2, a sensor electrode layer SENL, a polarizing film PF, and a panel bottom cover PB.

The adhesive member SEAL may bond the first substrate SUB1 with the second substrate SUB2. The adhesive member SEAL may be disposed on edges of the first substrate SUB1 and the second substrate SUB2 to surround the display layer DISL. The adhesive member SEAL may be, but is not limited to, a frit adhesive layer, an ultraviolet curable resin, or a thermosetting resin.

The second substrate SUB2 may be made of an insulating material such as glass, quartz and a polymer resin. The second substrate SUB2 may be a rigid substrate or a flexible substrate that can be bent, folded, rolled, and so on. The second substrate SUB2 may be a plastic film.

The sensor electrode layer SENL may be disposed on the second substrate SUB2. The sensor electrode layer SENL may include sensor electrodes and antenna patterns. The sensor electrode layer SENL may be a layer for sensing a touch using the sensor electrodes and transmitting and receiving a radio frequency signal using the antenna patterns.

The polarizing film PF may be disposed on the sensor electrode layer SENL. The polarizing film PF may include a first base member, a linear polarizer, a retardation film such as a $\lambda/4$ (quarter-wave) plate, and a second base member. The first base member, the retardation film, the linear polarizer and the second base member may be sequentially disposed on the sensor electrode layer SENL.

Alternatively, the sensor electrode layer SENL and the polarizing film PF may be integrally formed. For example, the sensor electrode layer SENL may be disposed on the first base member of the polarizing film PF. In such case, the first base member, the sensor electrode layer SENL, the retardation film, the linear polarizer, and the second base member may be sequentially stacked on the second substrate SUB2.

The antenna circuit board 350 may be attached on the upper surface of the second substrate SUB2 using a low-resistance, high-reliability material such as an anisotropic conductive film and a self assembly anisotropic conductive paste (SAP). The antenna circuit board 350 may be bent so that it is located under the display panel 300. The antenna circuit board 350 may be attached on the lower surface of the panel bottom cover PB by an adhesive layer 392. The adhesive layers 391 and 392 may be pressure sensitive adhesives.

The sensor electrode layer SENL may be disposed on the display layer DISL as shown in FIG. 2 or may be disposed on the second substrate SUB2 as shown in FIG. 3. Hereinafter, for convenience of illustration, the sensor electrode layer SENL is disposed on the display layer DISL.

Figure 4:
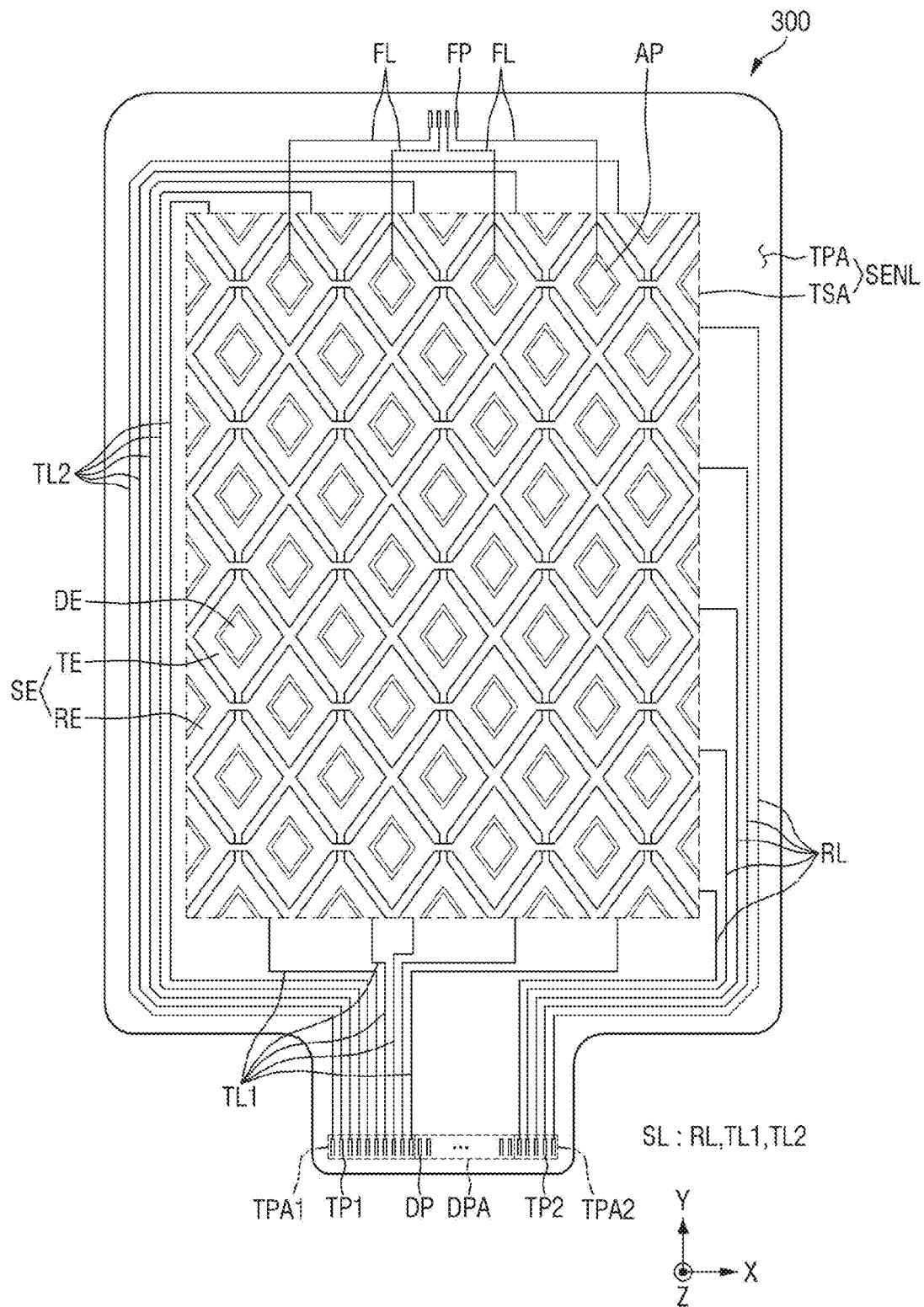
FIG. 4 is a layout view of a first exemplary embodiment of a sensor electrode layer of the display device of FIG. 1.
Figure 5:
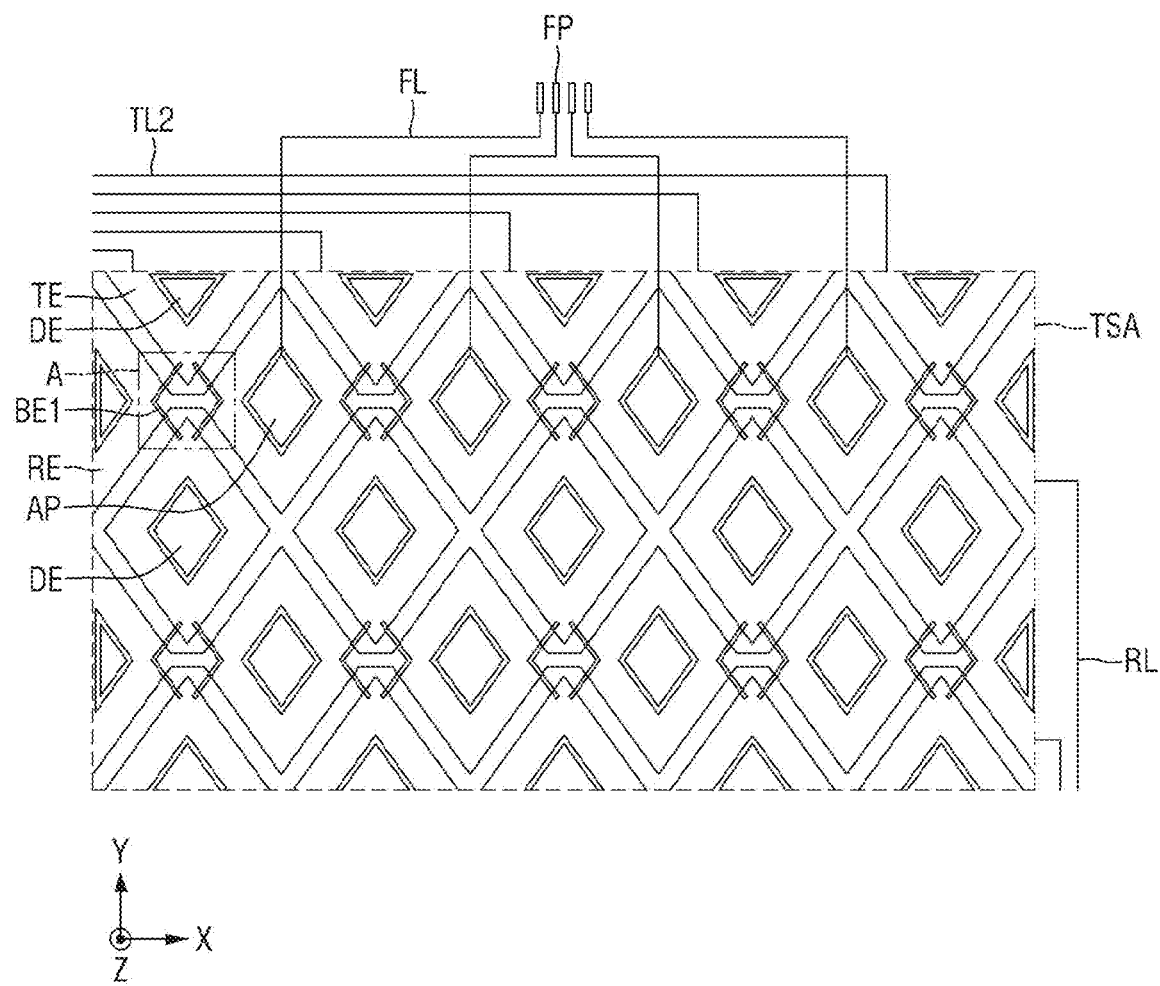
FIG. 5 is a layout view of a first exemplary embodiment of driving electrodes, sensing electrodes, dummy electrodes, and antenna patterns shown in FIG. 4.

FIG. 4 is a layout view of a first exemplary embodiment of a sensor electrode layer of the display device of FIG. 1. FIG. 5 is a layout view of a first exemplary embodiment of driving electrodes, sensing electrodes, dummy electrodes, and antenna patterns shown in FIG. 4.

In the exemplary embodiment shown in FIGS. 4 and 5, the sensor electrodes SE of the sensor electrode layer SENL include two kinds of electrodes, e.g., the driving electrodes TE and the sensing electrodes RE, the mutual capacitive sensing is carried out, i.e., driving signals are applied to the driving electrodes TE and then the voltages charged at the mutual capacitances can be sensed through the sensing electrodes RE. It is, however, to be understood that the embodiments are not limited thereto.

For convenience of illustration, FIGS. 4 and 5 show only sensor electrodes TE and RE, dummy patterns DE, antenna patterns AP, sensor lines TL1, TL2 and RL, antenna feeding lines FL, sensor pads TP1 and TP2, and antenna pads FP.

Referring to FIGS. 4 and 5, the sensor electrode layer SENL includes a touch sensor area TSA for sensing a user's touch, and a touch peripheral area TPA disposed around the touch sensor area TSA. The touch sensor area TSA may overlap the display area DA of the display layer DISL, and the touch sensor peripheral area TPA may overlap the non-display area NDA of the display layer DISL.

The touch sensor area TSA may include sensor electrodes SE, dummy patterns DE, and antenna patterns AP. The sensor electrodes SE may be electrodes for forming mutual capacitance to sense a touch of an object or a person. The antenna patterns AP may be patterns for transmitting and receiving radio frequency signals.

The sensor electrodes SE may include driving electrodes TE and sensing electrodes RE. The sensing electrodes RE may be defined as first sensor electrodes and the driving electrodes TE may be defined as second sensor electrodes. In such case, the sensing lines RL may be defined as the first sensor lines, while the first driving lines TL1 and the second driving lines TL2 may be defined as the second sensor lines. Alternatively, the driving electrodes TE may be defined as first sensor electrodes, while the sensing electrodes RE may be defined as second sensor electrodes. In such case, the first driving lines TL1 and the second driving lines TL2 may be defined as the first sensor lines, and the sensing lines RL may be defined as the second sensor lines.

Referring to FIG. 4, the sensing electrodes RE may extend along the first direction (x-axis direction) and be arranged in the second direction (y-axis direction). Accordingly, the sensing electrodes RE may be electrically connected to one another in the first direction (x-axis direction). The sensing electrodes RE may be connected to one another in the first direction (x-axis direction). The sensing electrodes RE adjacent to one another in the second direction (y-axis direction) may be electrically separated from one another.

Referring to FIG. 4, the driving electrodes TE may extend along the second direction (y-axis direction) and be arranged in the first direction (x-axis direction). Accordingly, the driving electrodes TE adjacent to one another in the first direction (x-axis direction) may be electrically separated from one another. The driving electrodes TE may be electrically connected to one another in the second direction (y-axis direction). The driving electrodes TE adjacent to one another in the second direction (y-axis direction) may be connected through first connectors BE1 shown in FIG. 5.

The first connectors BE1 may be bent at least once. In FIG. 5, the first connectors BE1 have the shape of angle brackets "<" or ">", but the shape of the first connectors BE1 when viewed from the top is not limited thereto. Since the driving electrodes TE adjacent to each other in the second direction (y-axis direction) are connected by the plurality of first connectors BE1, even if any of the first connectors BE1 is disconnected, the driving electrodes TE can still be stably connected with each other. Although two adjacent ones of the driving electrodes TE are connected by two first connectors BE1 in the exemplary embodiment shown in FIG. 5, but the number of first connectors BE1 is not limited thereto.

The driving electrodes TE and the sensing electrodes RE can be electrically separated from each other at their intersections by virtue of the first connectors BE1. Accordingly, mutual capacitance can be formed between the driving electrodes TE and the sensing electrodes RE.

Referring to FIGS. 4 and 5, each of the antenna patterns AP may be surrounded by the respective sensing electrode RE. Each of the antenna patterns AP may be electrically separated from the respective sensing electrode RE. Each of the antenna patterns AP may be spaced apart from the respective sensing electrode RE. The antenna patterns AP may be disposed adjacent to one side of the touch sensor area TSA. For example, as shown in FIG. 4, antenna patterns AP may be disposed adjacent to the upper side of the touch sensor area TSA.

Each of the antenna patterns AP may work as an independent antenna under the control of the antenna driver circuit 340. Alternatively, the antenna patterns AP may serve as one array antenna under the control of the antenna driver circuit 340.

Each of the dummy patterns DE may be surrounded by the driving electrode TE or the sensing electrode RE. Each of the dummy patterns DE may be electrically separated from the driving electrode TE or the sensing electrode RE. Each of the dummy patterns DE may be spaced apart from the driving electrode TE or the sensing electrode RE. Each of the dummy patterns DE may be electrically floating.

The length of the driving electrode TE in the first direction (x-axis direction) and the length in the second direction (y-axis direction) may range approximately from 3 mm to 5 mm. The length of the driving electrode TE the first direction (x-axis direction) refers to the distance from the left end to the right end of the driving electrode TE. The length of the driving electrode TE the second direction (y-axis direction) refers to the distance from the upper end to the lower end of the driving electrode TE. The length of the sensing electrode RE in the first direction (x-axis direction) and the length in the second direction (y-axis direction) may also range approximately from 3 mm to 5 mm.

In order for the antenna patterns AP to transmit and receive radio frequency signals of ultra-high frequency (e.g., millimeter wave (mmWave)) for 5G mobile communications, the length of the antenna pattern AP in the first direction (x-axis direction) and the length in the second direction (y-axis direction) may range approximately from 2.5 mm to 4.5 mm. The length of the dummy electrode DE in the first direction (x-axis direction) and the length in the second direction (y-axis direction) may also range approximately from 2.5 mm to 4.5 mm.

In FIGS. 4 and 5, the lengths of the antenna pattern AP in the first direction (x-axis direction) and the second direction (y-axis direction) are substantially equal to the lengths of the dummy pattern DE in the first direction (x-axis direction) and the second direction (y-axis direction). It is, however, to be understood that the embodiments are not limited thereto. For example, the lengths of the antenna pattern AP in the first direction (x-axis direction) and the second direction (y-axis direction) may be different from the lengths of the dummy pattern DE in the first direction (x-axis direction) and the second direction (y-axis direction).

In FIG. 4, the driving electrodes TE, the sensing electrodes RE, the antenna patterns AP and the dummy patterns DE each have a generally diamond shape when viewed from the top, but the embodiments are not limited thereto. For example, each of the driving electrodes TE, the sensing electrodes RE, the antenna patterns AP and the dummy patterns DE may have other quadrangular shapes besides a diamond, other polygonal shapes besides a quadrangular shape, such as a circle or an ellipse when viewed from the top.

The sensor lines TL1, TL2 and RL and the antenna feed lines FL may be disposed in the sensor peripheral area TPA. The sensor lines TL1, TL2 and RL may include sensing lines RL connected to the sensing electrodes RE, and first driving lines TL1 and second driving lines TL2 connected to the driving electrodes TE. The sensing lines RL may be defined as the first sensor lines, while the first driving lines TL1 and the second driving lines TL2 may be defined as the second sensor lines.

The sensing electrodes RE disposed on one side of the touch sensor area TSA may be connected to the sensing lines RL, respectively. For example, some of the sensing electrodes RE electrically connected in the first direction (x-axis direction) that are disposed at the right end may be connected to the sensing lines RL as shown in FIG. 4. The sensing lines RL may be connected to second sensor pads TP2, respectively. Thus, the touch driver circuit 330 may be electrically connected to the sensing electrodes RE.

The driving electrodes TE disposed on one side of the touch sensor area TSA may be connected to the first driving lines TL1, respectively, while the driving electrodes TE disposed on the other side of the touch sensor area TSA may be connected to the second driving lines TL2. For example, some of the driving electrodes TE electrically connected to one another in the second direction (y-axis direction) on the lowermost side may be connected to the first driving line TL1, while some of the driving electrodes TE disposed on the uppermost side may be connected to the second driving line TL2, as shown in FIG. 4. The second driving lines TL2 may be connected to the driving electrodes TE on the upper side of the touch sensor area TSA via the left outer side of the touch sensor area TSA.

The first driving lines TL1 and the second driving lines TL2 may be connected to the first sensor pads TP1, respectively. Thus, the touch driver circuit 330 may be electrically connected to the driving electrodes TE. The driving electrodes TE are connected to the driving lines TL1 and TL2 on both sides of the touch sensor area TSA, and receive the touch driving signals. Therefore, it is possible to prevent a difference between the touch driving signals applied to the driving electrodes TE disposed on the lower side of the touch sensor area TSA and the touch driving signals applied to the driving electrodes TE disposed on the upper side of the touch sensor area TSA which occurs due to the RC delay of the touch driving signals.

The antenna feed lines FL may be connected to the antenna patterns AP, respectively. The antenna feed lines FL may be connected to the antenna pads AP, respectively. Therefore, the antenna driver circuit 340 may be electrically connected to the antenna patterns AP. In addition, at least one second driving line TL2 is disposed between the touch sensor area TSA and the antenna pads FP, and thus each of the antenna feed lines FL may intersect at least one second driving line TL2.

The first sensor pad area TPA1 in which the first sensor pads TP1 are disposed may be disposed on one side of the display pad area DP in which the display pads DPA are disposed. The second sensor pad area TPA2 in which the second sensor pads TP1 are disposed may be disposed on the other side of the display pad area DPA. The display pads DP may be connected to data lines DL of the display panel 300.

The display pad area DPA, the first sensor pad area TPA1 and the second sensor pad area TPA2 may be disposed under the display panel 300. The display circuit board 310 may be disposed on the display pads DP, the first sensor pads TP1, and the second sensor pads TP2 as shown in FIG. 1. The display pads DP, the first sensor pads TP1 and the second sensor pads TP2 may be electrically connected to the display circuit board 310 using a low-resistance, high-reliability material such as an anisotropic conductive film or an SAP. Therefore, the display pads DP, the first sensor pads TP1 and the second sensor pads TP2 may be electrically connected to the touch driver circuit 330 disposed on the display circuit board 310.

An antenna pad area FPA in which the antenna pads FP are disposed may be disposed on the upper side of the display panel 300. The antenna circuit board 350 may be disposed on the antenna pads FP as shown in FIG. 1. The antenna pads FP may be electrically connected to the antenna circuit board 350 using a low-resistance, high-reliability material such as an anisotropic conductive film and an SAP.

As shown in FIGS. 4 and 5, the touch sensor area TSA includes the antenna patterns AP, in addition to the driving electrodes TE and the sensing electrodes RE. Therefore, it is possible to sense a touch of an object or a person using the mutual capacitance between the driving electrodes TE and the sensing electrodes RE, and it is also possible to transmit and receive radio frequency signals using the antenna patterns AP.

Although four antenna patterns AP are depicted in the exemplary embodiment shown in FIG. 4 for convenience of illustration, the number of the antenna patterns AP is not limited to four. The number of the antenna patterns AP may be determined depending on the performance of the antenna required for the display device 10.

Figure 6:
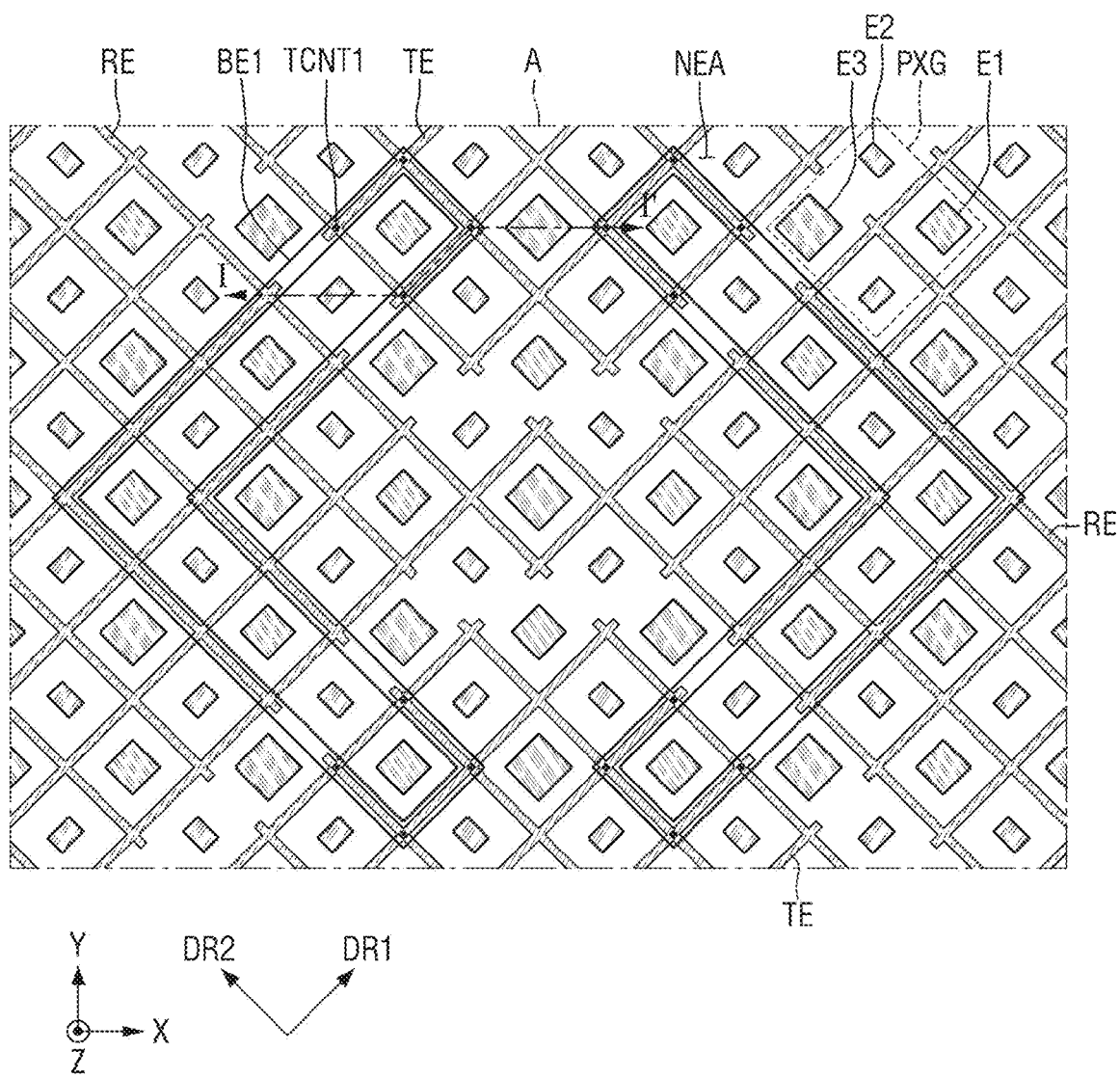
FIG. 6 is a layout view of an exemplary embodiment of the driving electrodes, the sensing electrodes and the first connectors of FIG. 5.
Figure 7:
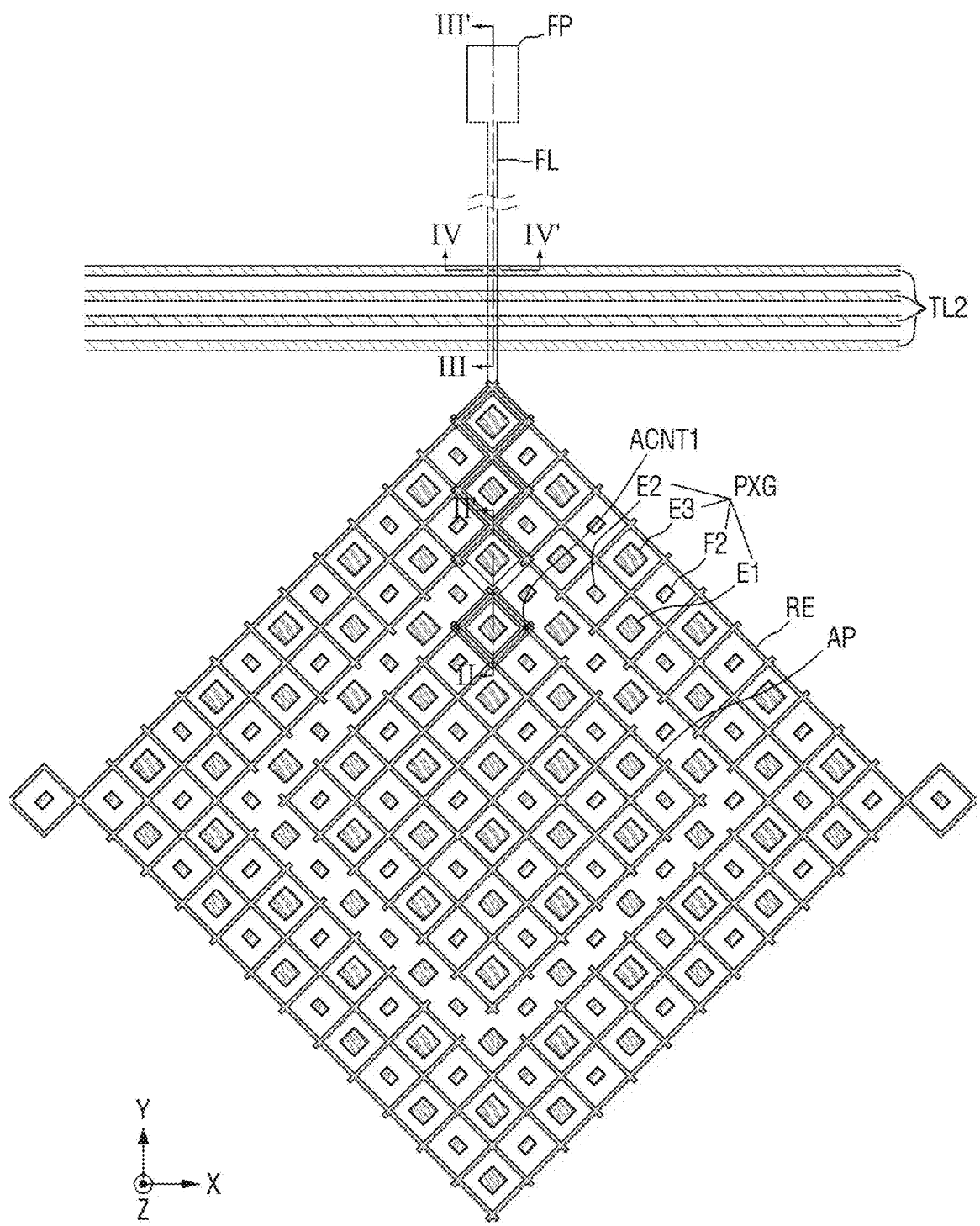
FIG. 7 is a layout view of a first exemplary embodiment of the sensing electrodes, the antenna patterns, the antenna feed lines, the second driving lines, and feed pads of FIG. 5.

FIG. 6 is a layout view of an exemplary embodiment of the driving electrodes, the sensing electrodes and the first connectors of FIG. 5. FIG. 7 is a layout view of a first exemplary embodiment of the sensing electrodes, the antenna patterns, the antenna feed lines, the second driving lines, and feed pads of FIG. 5.

In the exemplary embodiment shown in FIGS. 6 and 7, each of the driving electrodes TE, the sensing electrodes RE, the first connectors BE1, the antenna patterns AP and the antenna feed lines FL may be formed in a mesh pattern. Further, the dummy patterns DE shown in FIG. 5 may also be formed in a mesh pattern.

Referring to FIGS. 6 and 7, the driving electrodes TE, the sensing electrodes RE, the antenna patterns AP and the dummy patterns DE are disposed on the same layer, and accordingly they may be spaced apart from one another. That is, there may be a gap between the driving electrode TE and the sensing electrode RE and between the sensing electrode RE and the antenna pattern AP. In addition, a gap may also be formed between the driving electrode TE and the dummy pattern DE and between the sensing electrode RE and the dummy pattern DE.

The first connectors BE1 may be disposed on a different layer from the driving electrodes TE and the sensing electrodes RE. The first connectors BE1 may overlap the driving electrodes TE adjacent one another in the second direction (y-axis direction) in the third direction (z-axis direction). The first connectors BE1 may overlap the sensing electrodes RE in the third direction (z-axis direction). One side of each of the first connectors BE1 may be connected to one of the driving electrodes TE adjacent to one another in the second direction (y-axis direction) through a first touch contact hole TCNT1. The other side of each of the first connectors BE1 may be connected to another one of the driving electrodes TE adjacent to one another in the second direction (y-axis direction) through the first touch contact hole TCNT1.

Referring to FIG. 7, the antenna feed lines FL may be disposed on a layer different from the antenna patterns AP. The antenna feed lines FL may overlap the antenna patterns AP in the third direction (z-axis direction). The antenna feed lines FL may be connected to the antenna patterns AP through first antenna contact holes ACNT1.

The antenna feed lines FL traverse the sensing electrodes RE. Therefore, the antenna feed lines FL may overlap the sensing electrodes RE in the third direction (z-axis direction).

In addition, at least one second driving line TL2 is disposed between the touch sensor area TSA and the antenna pads FP. At least one second driving line TL2 disposed between the touch sensor area TSA and the antenna pads FP is extended in the first direction (x-axis direction), and the antenna feed lines FL extend in the second direction (y-axis direction). Therefore, the antenna feed lines FL may cross at least one second driving line TL2.

As mentioned above, each of the driving electrodes TE, the sensing electrodes RE, the first connectors BE1, the antenna patterns AP and the antenna feed lines FL may be formed in a mesh pattern when viewed from the top. In addition, the dummy patterns DE of FIG. 5 may also be formed in a mesh pattern when viewed from the top. Accordingly, each of the driving electrodes TE, the sensing electrodes RE, the first connectors BE1, the antenna feed lines FL and the dummy patterns DE may not overlap the emission areas E1, E2 and E3 formed in the display area DA of the display layer DISL shown in FIGS. 3 and 4. Therefore, it is possible to prevent the luminance of the light from being reduced which may occur when the light emitted from the emission areas E1, E2 and E3 is covered by the driving electrodes TE, the sensing electrodes RE, the first connectors BE1, the antenna patterns AP, the antenna feed lines FL and the dummy patterns DE.

Alternatively, each of the driving electrodes TE, the sensing electrodes RE, the first connectors BE1, the antenna patterns AP and the antenna feed lines FL may be formed in a generally planar shape when viewed from the top, instead of a mesh pattern. In order to prevent the luminance of light emitted from the emission areas E1, E2 and E3 from being reduced by the driving electrodes TE, the sensing electrodes RE, the first connectors BE1, the antenna patterns AP, the antenna feed lines FL, and the dummy patterns DE, the driving electrodes TE, the sensing electrodes RE, the first connectors BE1, the antenna patterns AP, the antenna feed lines FL and the dummy patterns DE may be made of a transparent conductive material that can transmit light, such as ITO and IZO.

The emission areas E1, E2 and E3 may include first emission areas E1 emitting light of a first color, second emission areas E2 emitting light of a second color, and third emission areas E3 emitting light of a third color. For example, the first color may be red, the second color may be green, and the third color may be blue.

Each of the first emission areas E1, the second emission areas E2 and the third emission areas E3 may have, but is not limited to, a diamond shape or a rectangular shape when viewed from the top. Each of the first emission areas E1, the second emission areas E2 and the third emission areas E3 may have other polygonal shape than a quadrangular shape, a circular shape or an elliptical shape when viewed from the top. In addition, although the area of the third emission areas E3 is the largest while the area of the second emission areas E2 is the smallest in the exemplary embodiment shown in FIGS. 6 and 7, the embodiments are not limited thereto.

Referring to FIGS. 6 and 7, one first emission area E1, two second emission areas E2 and one third emission area E3 may be defined as a single emission group PXG for representing black-and-white or grayscale. That is, the black-and-white or grayscale may be represented by a combination of light emitted from one first emission area E1, light emitted from two second emission areas E2, and light emitted from one third emission area E3.

The second emission area E2 may be disposed in odd rows. The second emission area E2 may be arranged side by side in each of the odd rows in the first direction (x-axis direction). For every two adjacent, second emission areas E2 arranged in the first direction (x-axis direction) in each of the odd rows, one may have longer sides in the first direction DR1 and shorter sides in the other direction DR2, while the other may have longer sides in the other direction DR2 and shorter sides in the direction DR1. The direction DR1 may refer to the direction between the first direction (x-axis direction) and the second direction (y-axis direction), and the direction DR2 may refer to the direction intersecting the direction DR1.

The first emission area E1 and the third emission area E3 may be arranged in even rows. The first emission areas E1 and the third emission areas E3 may be arranged side by side in each of the even rows in the first direction (x-axis direction). The first emission areas E1 and the third emission areas E3 may be arranged alternately in each of the even rows.

The second emission areas E2 may be disposed in odd columns. The second emission areas E2 may be arranged side by side in each of the odd columns in the second direction (y-axis direction). For every two adjacent, second emission areas E2 arranged in the second direction (y-axis direction) in each of the odd columns, one may have longer sides in the first direction DR1 and shorter sides in the other direction DR2, while the other may have longer sides in the other direction DR2 and shorter sides in the direction DR1.

The first emission areas E1 and the third emission areas E3 may be arranged in even columns. The first emission area E1 and the third emission area E3 may be arranged side by side in each of the even columns in the second direction (y-axis direction). The first emission areas E1 and the third emission areas E3 may be arranged alternately in each of the even columns.

As shown in FIGS. 4, 5 and 7, the antenna patterns AP are disposed adjacent to one side of the touch sensor area TSA, and the antenna pads FP are also adjacent to the touch peripheral area TPA adjacent to the side of the touch sensor area TSA, to connect the antenna patterns AP with the antenna pads FP through the antenna feed lines FL, respectively. Accordingly, the antenna patterns AP and the antenna pads FP are disposed adjacent to one side of the touch sensor area TAS, and thus the distance from the antenna patterns AP to the antenna driver circuit 340 of FIG. 1 can be reduced. In addition, it is possible to reduce the loss of radio frequency signals.

In addition, since the touch sensor area TSA includes the antenna patterns AP, the antenna patterns AP can be formed together with the driving electrodes TE, the sensing electrodes RE and dummy patterns DE are formed. Therefore, no additional process for forming the antenna patterns AP is required.

In addition, since the antenna patterns AP are formed in the touch sensor area TSA instead of some dummy patterns DE, a high degree of design freedom for the number and size of the antenna patterns is achieved.

Figure 8:
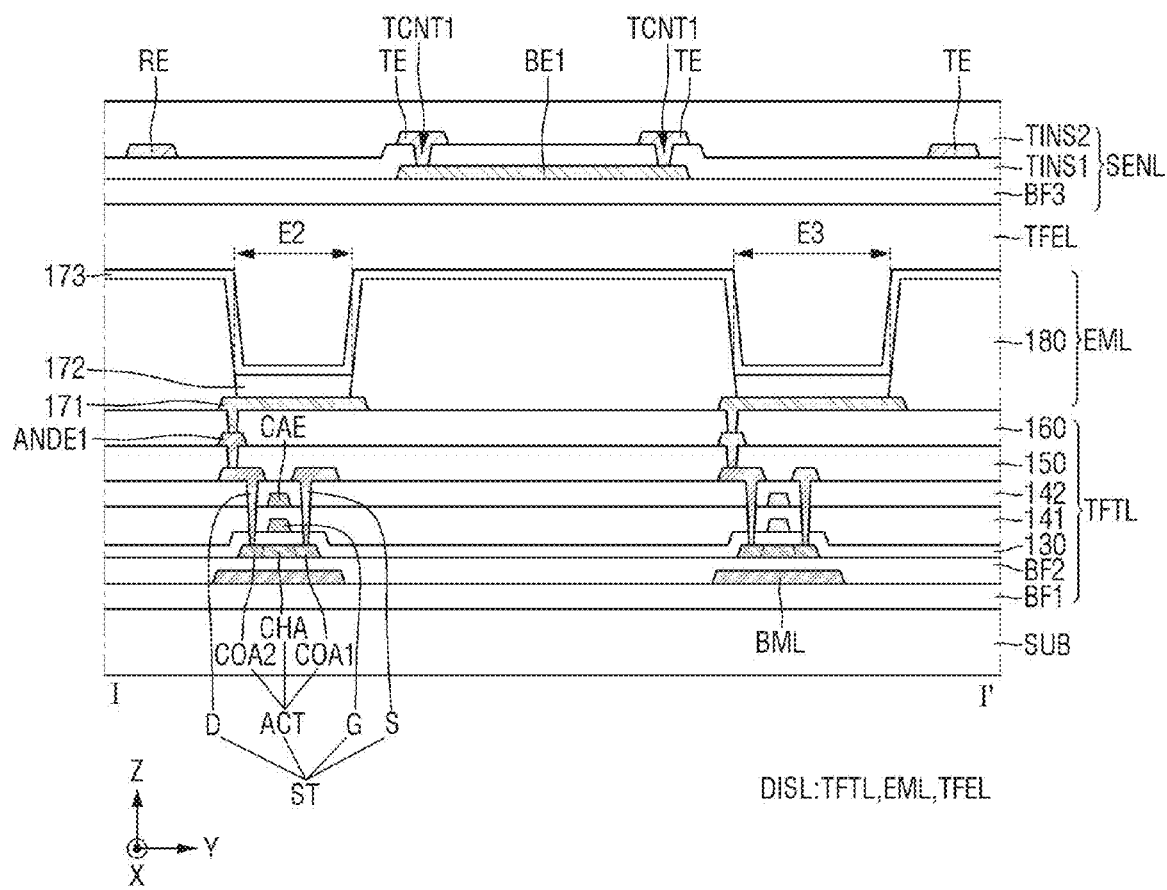
FIG. 8 is a cross-sectional view of an exemplary embodiment taken along line I-I' of FIG. 6.
Figure 9:
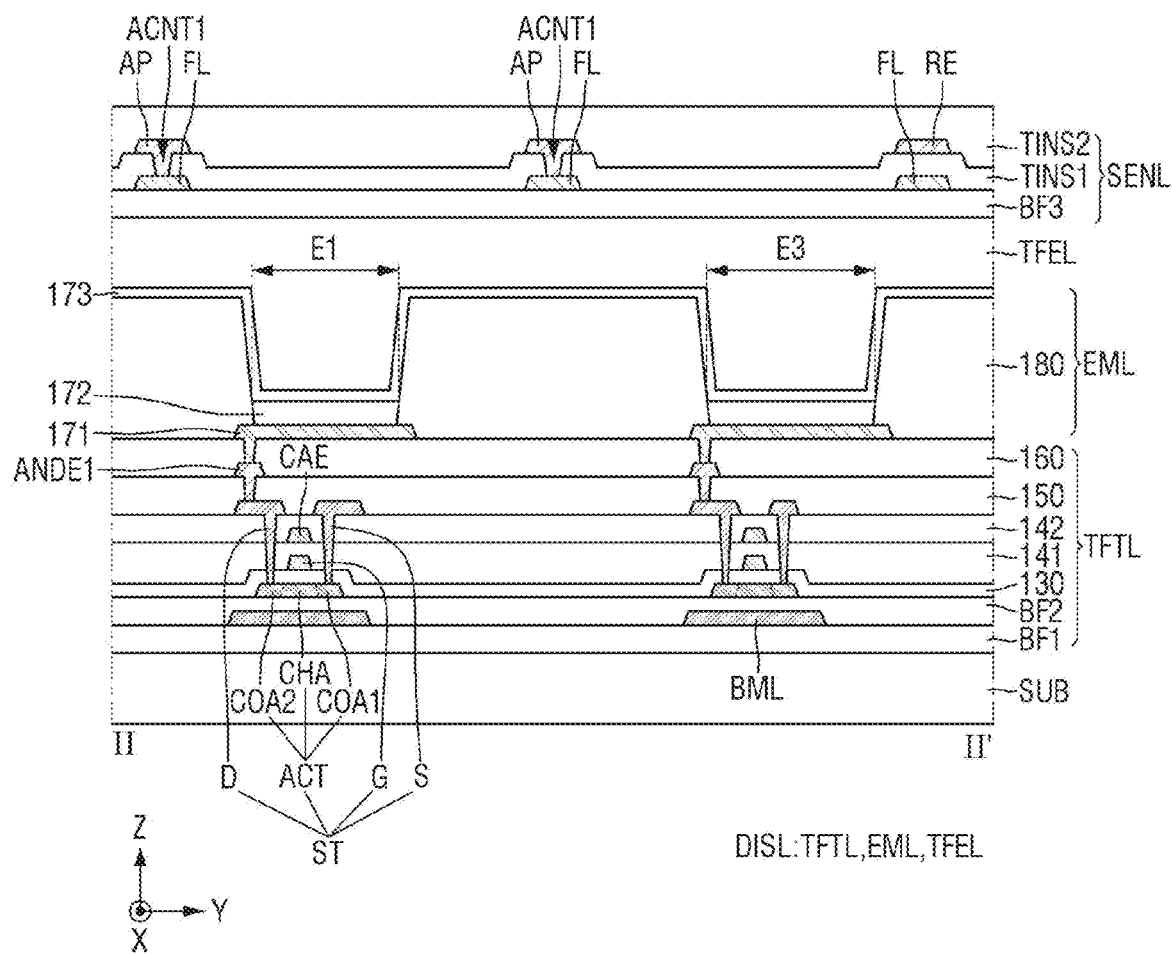
FIG. 9 is a cross-sectional view of an exemplary embodiment taken along line II-II' of FIG. 7.

FIG. 8 is a cross-sectional view of an exemplary embodiment taken along line I-I' of FIG. 6. FIG. 9 is a cross-sectional view of an exemplary embodiment taken along line II-II' of FIG. 7.

Referring to FIGS. 8 and 9, a display layer DISL including a thin-film transistor layer TFTL, an emission material layer EML, and an encapsulation layer TFEL may be disposed on a substrate SUB, and a sensor electrode layer SENL including sensor electrodes SE may be disposed on the display layer DISL.

A first buffer layer BF may be disposed on one surface of the substrate SUB, and a second buffer layer BF2 may be disposed on the first buffer layer BF1. The first and second buffer layers BF1 and BF2 may be disposed on the surface of the substrate SUB in order to protect the thin-film transistors of the thin-film transistor layer TFTL and an emissive layer 172 of the emission material layer EML from moisture that is likely to permeate through the substrate SUB. The buffer layers BF may include multiple inorganic layers stacked on one another alternately. For example, each of the first and second buffer layers BF1 and BF2 may be made up of multiple layers in which one or more inorganic layers of a silicon nitride layer, a silicon oxynitride layer, a silicon oxide layer, a titanium oxide layer and an aluminum oxide layer are alternately stacked on one another. The first buffer layer BF1 and/or the second buffer layer BF2 may be eliminated.

A first light-blocking layer BML may be disposed on the first buffer layer BF1. The first light-blocking layer BML may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof. Alternatively, the first light-blocking layer BML may be an organic layer including a black pigment.

An active layer ACT of a thin-film transistor ST may be disposed on the second buffer layer BF2. The active layer ACT may include polycrystalline silicon, single crystal silicon, low-temperature polycrystalline silicon, amorphous silicon, or an oxide semiconductor. When the active layer ACT includes a material such as polycrystalline silicon and oxide semiconductor, the ion-doped regions of the active layer ACT may be conductive regions having conductivity.

The active layer ACT may overlap with the first light-blocking layer BML in the third direction (z-axis direction). Since light incident through the substrate SUB can be blocked by the first light-blocking layer BML, it is possible to prevent leakage current from flowing into the active layer ACT by the light incident through the substrate SUB.

The gate insulating layer 130 may be formed on the active layer ACT of the thin-film transistor ST. The gate insulating layer 130 may be formed of an inorganic layer, for example, a silicon nitride layer, a silicon oxynitride layer, a silicon oxide layer, a titanium oxide layer, or an aluminum oxide layer.

The gate electrode G of the thin-film transistor ST may be disposed on the gate insulating layer 130. The gate electrode G of the thin-film transistor ST may overlap the active layer ACT in the third direction (z-axis direction). A part of the active layer ACT overlapping the gate electrode G in the third direction (z-axis direction) may be a channel region CHA. The gate electrode G may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

A first interlayer dielectric layer 141 may be disposed on the gate electrode G. The first interlayer dielectric layer 141 may be formed of an inorganic layer, for example, a silicon nitride layer, a silicon oxynitride layer, a silicon oxide layer, a titanium oxide layer, or an aluminum oxide layer. The first interlayer dielectric layer 141 may include a number of inorganic layers.

A capacitor electrode CAE may be disposed on the first interlayer dielectric layer 141. The capacitor electrode CAE may overlap the gate electrode G in the third direction (z-axis direction). It may overlap the first electrode RCE1 of the sensing capacitor RC1. The capacitor electrode CAE may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

A second interlayer dielectric layer 142 may be disposed over the capacitor electrode CAE. The second interlayer dielectric layer 142 may be formed of an inorganic layer, for example, a silicon nitride layer, a silicon oxynitride layer, a silicon oxide layer, a titanium oxide layer, or an aluminum oxide layer. The second interlayer dielectric layer 142 may include a plurality of inorganic layers.

A first electrode S and a second electrode D of the thin-film transistor ST may be disposed on the second interlayer dielectric layer 142. The first electrode S and the second electrode D may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

The first electrode S of the thin-film transistor ST may be connected to a first conductive area COA1 disposed on a side of the channel region CHA of the active layer ACT through a contact hole penetrating through the gate insulating layer 130, the first interlayer dielectric layer 141 and the second interlayer dielectric layer 142. The second electrode D of the thin-film transistor ST may be connected to a second conductive area COA2 disposed on the other side of the channel region CHA of the active layer ACT through a contact hole penetrating through the gate insulating layer 130, the first interlayer dielectric layer 141 and the second interlayer dielectric layer 142.

A first organic layer 150 may be disposed on the first electrode S and the second electrode D to provide a flat surface over the thin-film transistors. The first organic layer 150 may be formed as an organic layer such as an acryl resin, an epoxy resin, a phenolic resin, a polyamide resin and a polyimide resin.

The first connection electrode ANDE1 may be disposed on the first organic layer 150. The first connection electrode ANDE1 may be connected to the second electrode D of the thin-film transistor ST through a contact hole penetrating through the first organic layer 150. The first connection electrode ANDE1 may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

The second organic layer 160 may be disposed on the first connection electrode ANDE1. The second organic layer 160 may be formed as an organic layer such as an acryl resin, an epoxy resin, a phenolic resin, a polyamide resin and a polyimide resin.

In the exemplary embodiment shown in FIGS. 8 and 9, the thin-film transistor ST is implemented as a top-gate transistor in which the gate electrode G is located above the active layer ACT. It is, however, to be understood that the embodiments are not limited thereto. That is, the thin-film transistor ST may be implemented as a bottom-gate transistor in which the gate electrode G is located below the active layer ACT, or as a double-gate transistor in which the gate electrodes G are disposed above and below the active layer ACT.

The emission material layer EML is disposed on the thin-film transistor layer TFTL. The emission material layer EML may include light-emitting elements 170 and a bank 180.

Each of the light-emitting elements 170 may include a first light-emitting electrode 171, an emissive layer 172, and a second light-emitting electrode 173. In each of the emission areas E1, E2 and E3, the first light-emitting electrode 171, the emissive layer 172 and the second light-emitting electrode 173 are stacked on one another sequentially, so that holes from the first light-emitting electrode 171 and electrons from the second light-emitting electrode 173 are combined with each other in the emissive layer 172 to emit light. In such case, the first light-emitting electrode 171 may be an anode electrode, and the second light-emitting electrode 173 may be a cathode electrode.

The first light-emitting electrode 171 may be formed on the second organic layer 160. The first light-emitting electrode 171 may be connected to the first connection electrode ANDE1 through a contact hole penetrating through the second organic layer 160.

In the top-emission structure where light exits from the emissive layer 172 toward the second light-emitting electrode 173, the first light-emitting electrode 171 may be made up of a single layer of molybdenum (Mo), titanium (Ti), copper (Cu) or aluminum (Al), or may be made up of a stack structure of aluminum and titanium (Ti/Al/Ti), a stack structure of aluminum and ITO (ITO/Al/ITO), an APC alloy and a stack structure of APC alloy and ITO (ITO/APC/ITO) in order to increase the reflectivity. The APC alloy is an alloy of silver (Ag), palladium (Pd) and copper (Cu).

The bank 180 serves to define each of the emission areas E1, E2 and E3 of the display pixels. To this end, the bank 180 may be formed to expose a part of the first light-emitting electrode 171 on the second organic layer 160. The bank 180 may be formed to cover the edge of the first light-emitting electrode 171. The bank 180 may be disposed in a contact hole penetrating through the second organic layer 160. Accordingly, the contact hole penetrating through the second organic layer 160 may be filled with the bank 180. The bank 180 may be formed of an organic layer such as an acryl resin, an epoxy resin, a phenolic resin, a polyamide resin and a polyimide resin.

The emissive layer 172 is formed on the first light-emitting electrode 171. The emissive layer 172 may include an organic material and emit light of a certain color. For example, the emissive layer 172 may include a hole transporting layer, an organic material layer, and an electron transporting layer. The organic material layer may include a host and a dopant. The organic material layer may include a material that emits a predetermined light. For example, and the organic material layer may be formed using a phosphor or a fluorescent material.

For example, the organic material layer of the emissive layer 172 in the first emission area E1 that emits light of the first color may be a phosphor that includes a host material including carbazole biphenyl (CBP) or mCP(1,3-bis(carbazol-9-yl), and a dopant including at least one selected from the group consisting of: PIQIr(acac)(bis(1-phenylisoquinoline) acetylacetonate iridium), PQIr(acac)(bis(1-phenylquinoline) acetylacetonate iridium), PQIr(tris(1-phenylquinoline)iridium) and PtOEP(octaethylporphyrin platinum). Alternatively, the organic material layer of the emissive layer 172 of the first emission area E1 may be, but is not limited to, a fluorescent material including PBD: Eu(DBM)3(Phen) or perylene.

The organic material layer of the emissive layer 172 of the second emission area E2, which emits light of the second color, may be a phosphor that includes a host material including CBP or mCP, and a dopant material including ir(ppy)3(fac tris(2-phenylpyridine) iridium). Alternatively, the organic material layer of the emissive layer 172 of the second emission area E2 emitting light of the second color may be, but is not limited to, a fluorescent material including Alq3(tris(8-hydroxyquinolino)aluminum).

The organic material layer of the emissive layer 172 of the third emission area E3, which emits light of the third color, may be, but is not limited to, a phosphor that includes a host material including CBP or mCP, and a dopant material including (4,6-F2ppy)2Irpic or L2BD111.

The second light-emitting electrode 173 is formed on the emissive layer 172. The second light-emitting electrode 173 may be formed to cover the emissive layer 172. The second light-emitting electrode 173 may be a common layer formed across the display pixels. A capping layer may be formed on the second light-emitting electrode 173.

In the top-emission structure, the second light-emitting electrode 173 may be formed of a transparent conductive material (TCP) such as ITO and IZO that can transmit light, or a semi-transmissive conductive material such as magnesium (Mg), silver (Ag) and an alloy of magnesium (Mg) and silver (Ag). When the second light-emitting electrode 173 is formed of a semi-transmissive conductive material, the light extraction efficiency can be increased by using microcavities.

The emissive layer 172 may be disposed on the upper surface of the first light-emitting electrode 171 and the inclined surfaces of the bank 180. The second light-emitting electrode 173 may be disposed on the upper surface of the emissive layer 172 and the inclined surfaces of the bank 180.

The encapsulation layer TFEL may be formed on the emission material layer EML. The encapsulation layer TFEL may include at least one inorganic layer to prevent permeation of oxygen or moisture into the light-emitting element layer EML. In addition, the encapsulation layer TFEL may include at least one organic layer to protect the light-emitting element layer EML from foreign substances such as dust. The inorganic layer may be made up of multiple layers in which one or more inorganic layers of a silicon nitride layer, a silicon oxynitride layer, a silicon oxide layer, a titanium oxide layer and an aluminum oxide layer are alternately stacked on one another. The organic layer may be an acryl resin, an epoxy resin, a phenolic resin, a polyamide resin or a polyimide resin.

Alternatively, as shown in FIG. 3, a substrate may be disposed on the emission material layer EML instead of the encapsulation layer TFEL, so that the space between the emission material layer EML and the substrate may be empty, i.e., vacuous or may be filled with a filling film. The filler film may be an epoxy filler film or a silicon filler film.

The sensor electrode layer SENL is disposed on the encapsulation layer TFEL. The sensor electrode layer SENL may include light blocking films LBFs and sensor electrodes SE.

The third buffer layer BF3 may be disposed on the encapsulation layer TFEL. The third buffer layer BF3 may be a layer having insulating and optical properties. The third buffer layer BF3 may include at least one inorganic layer. For example, the third buffer layer BF3 may be made up of multiple layers in which one or more inorganic layers of a silicon nitride layer, a silicon oxynitride layer, a silicon oxide layer, a titanium oxide layer and an aluminum oxide layer are alternately stacked on one another. The third buffer layer BF3 may be formed by a lamination process using a soft material, spin coating using a solution material, a slit die coating process, or a deposition process. The third buffer layer BF3 may be eliminated.

The first connectors BE1 and the antenna feed lines FL may be disposed on the third buffer layer BF3. The first connectors BE1 and the antenna feed lines FL may be made up of a single layer of molybdenum (Mo), titanium (Ti), copper (Cu) or aluminum (Al), or may be made up of a stack structure of aluminum and titanium (Ti/Al/Ti), a stack structure of aluminum and ITO (ITO/Al/ITO), an APC alloy and a stack structure of an APC alloy and ITO (ITO/APC/ITO).

The first sensor insulating layer TINS1 may be disposed on the first connectors BE1 and the antenna feed lines FL. The first sensor insulating layer TINS1 may be a layer having insulating and optical functions. The first sensor insulating layer TINS1 may be formed of an inorganic layer, for example, a silicon nitride layer, a silicon oxynitride layer, a silicon oxide layer, a titanium oxide layer, or an aluminum oxide layer. The first sensor insulating layer TINS1 may be formed by a lamination process using a soft material, spin coating using a solution material, a slot-die coating process, or a deposition process.

The driving electrodes TE, the sensing electrodes RE and the antenna patterns AP may be disposed on the first sensor insulating layer TINS1. The driving electrodes TE, the sensing electrodes RE and the antenna patterns AP do not overlap the emission areas E1, E2 and E3. The driving electrodes TE, the sensing electrodes RE and the antenna patterns AP may be made up of a single layer of molybdenum (Mo), titanium (Ti), copper (Cu) or aluminum (Al), or may be made up of a stack structure of aluminum and titanium (Ti/Al/Ti), a stack structure of aluminum and ITO (ITO/Al/ITO), an APC alloy and a stack structure of an APC alloy and ITO (ITO/APC/ITO).

The second sensor insulating layer TINS2 may be disposed over the driving electrodes TE, the sensing electrodes RE, and the antenna patterns AP. The second sensor insulating layer TINS2 may be a layer having insulating and optical properties. The second sensor insulating layer TINS2 may include at least one of an inorganic layer and an organic layer. The inorganic layer may be a silicon nitride layer, a silicon oxynitride layer, a silicon oxide layer, a titanium oxide layer, or an aluminum oxide layer. The organic layer may be an acryl resin, an epoxy resin, a phenolic resin, a polyamide resin and a polyimide resin. The second sensor insulating layer TINS2 may be formed by a lamination process using a soft material, spin coating using a solution material, a slot-die coating process, or a deposition process.

As shown in FIGS. 8 and 9, the driving electrodes TE, the sensing electrodes RE and the antenna patterns AP may be disposed on the same layer and may be made of the same material. In addition, the first connectors BE1 and the antenna feed lines FL may be disposed on the same layer and may be made of the same material. Therefore, no additional process for forming the antenna patterns AP and the antenna feed lines FL.

Figure 10:
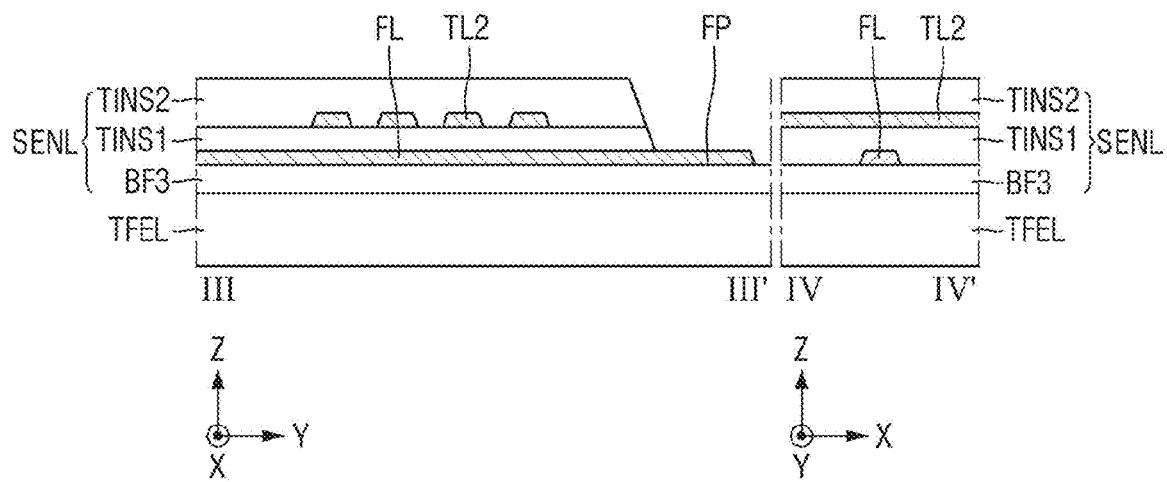
FIG. 10 is a cross-sectional view of a first exemplary embodiment taken along lines III-III' and IV-IV' of FIG. 7.

FIG. 10 is a cross-sectional view of a first exemplary embodiment taken along lines III-III' and IV-IV' of FIG. 7.

In FIG. 10, the substrate SUB and the thin-film transistor layer TFTL are not shown for convenience of illustration. It is apparent to those skilled in the art that the encapsulation layer TFEL of FIG. 10 may be replaced with the second substrate SUB2 when the sensor electrode layer SENL is disposed on the second substrate SUB2 as shown in FIG. 3.

Referring to FIG. 10, the antenna feed line FL may be disposed on the third buffer layer BF3 and may be covered by the first sensor insulating layer TINS1. The antenna feed line FL may be connected to the antenna pad FP disposed on the third buffer layer BF3.

The antenna pad FP may not be covered by the first sensor insulating layer TINS1 and the second sensor insulating layer TINS2 but may be exposed. Accordingly, the antenna pad FP may be electrically connected to a bump of an antenna circuit board 350 using a low-resistance, high-reliability material such as an anisotropic conductive film and SAP.

Each of the second driving lines TL2 may include a second driving line on a first layer disposed on the third buffer layer BF3 and a second driving line on a second layer disposed on the first sensor insulating layer TINS1 in order to reduce the resistance in the other regions than the region where they intersect the antenna feed lines FL. However, the second driving lines TL2 intersecting the antenna feed lines FL may be disposed only on the first sensor insulating layer TINS1. Accordingly, the antenna feed line FL does not meet or overlap the second driving lines TL2 to be connected to the antenna pad FP and the antenna pattern AP.

Figure 11:
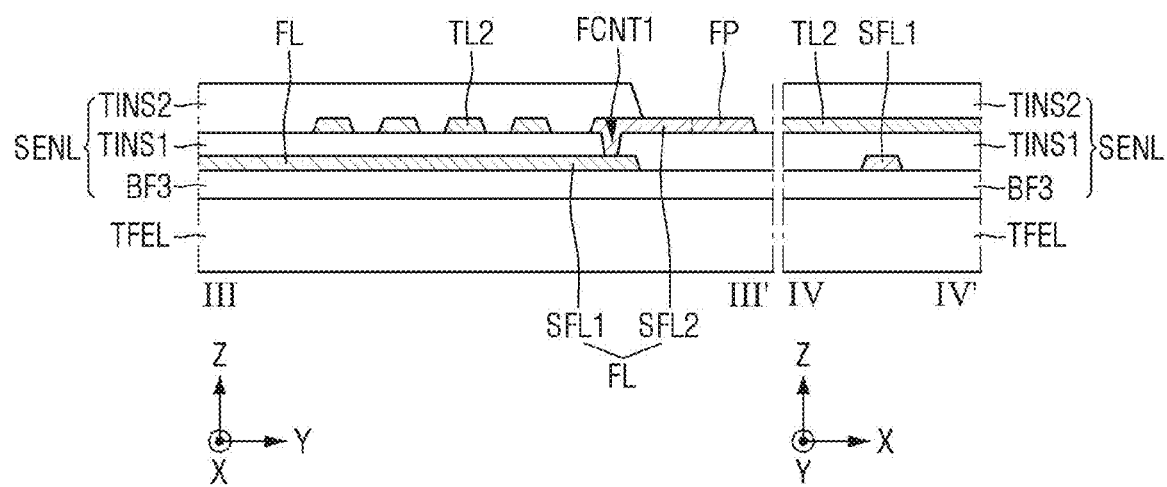
FIG. 11 is a cross-sectional view of a second exemplary embodiment taken along lines III-III' and IV-IV' of FIG. 7.

FIG. 11 is a cross-sectional view of a second exemplary embodiment taken along lines III-III' and IV-IV' of FIG. 7.

The exemplary embodiment of FIG. 11 is different from the exemplary embodiment of FIG. 10 in that an antenna feed line FL includes a first subsidiary antenna feed line SFL1 and a second subsidiary antenna feed line SFL2.

Referring to FIG. 11, the first subsidiary antenna feed line SFL1 may be disposed on a third buffer layer BF3 and may be covered by the first sensor insulating layer TINS1. The second subsidiary antenna feed line SFL2 may be disposed on the first sensor insulating layer TINS1. The second subsidiary antenna feed line SFL2 may be connected to the first subsidiary antenna feed line SFL1 through a first feed contact hole FCNT1 penetrating through the first sensor insulating layer TINS1. The first feed contact hole FCNT1 may be disposed between one of the second driving lines TL2 and the antenna pad FP.

The second subsidiary antenna feed line SFL2 may be connected to the antenna pad FP disposed on the first sensor insulating layer TINS1. The antenna pad FP may not be covered by the second sensor insulating layer TINS2 but may be exposed. Alternatively, in order to suppress the antenna pad FP from corroding or cracking, at least a part of the antenna pad FP may be covered by the second sensor insulating layer TINS2. Accordingly, the antenna pad FP may be electrically connected to a bump of the antenna circuit board 350 using a low-resistance, high-reliability material such as an anisotropic conductive film and an SAP.

Incidentally, when the antenna pad FP is disposed on the third buffer layer BF3, it must be exposed without being covered by the first sensor insulating layer TINS1 and the second sensor insulating layer TINS2. In contrast, when the antenna pad FP is disposed on the first sensor insulating layer TINS1, it must be exposed without being covered by the second sensor insulating layer TINS2. In other words, it is not necessary to remove the first sensor insulating layer TINS1 to expose the antenna pad FP. Therefore, when the antenna pad FP is disposed on the first sensor insulating layer TINS1, the length of the touch peripheral area TPA in the second direction (y-axis direction) may become shorter than the length when it is disposed on the third buffer layer BF3. In this manner, it is possible to reduce the non-display area of the display device 10.

The second driving lines TL2 intersecting the first subsidiary antenna feed line SFL1 may be disposed on the first sensor insulating layer TINS1. Accordingly, the antenna feed line FL may extend around the second driving lines TL2 to be connected to the antenna pad FP and the antenna pattern AP.

Figure 12:
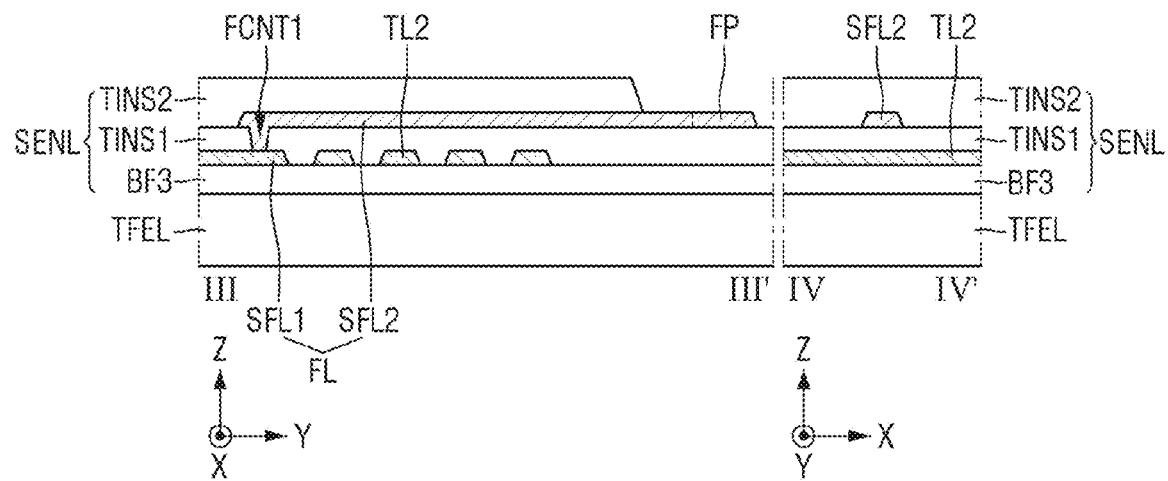
FIG. 12 is a cross-sectional view of a third exemplary embodiment taken along lines III-III' and IV-IV' of FIG. 7.

FIG. 12 is a cross-sectional view of a third exemplary embodiment taken along lines III-III' and IV-IV' of FIG. 7.

The exemplary embodiment of FIG. 12 is different from the exemplary embodiment of FIG. 11 in that a second subsidiary antenna feed line SFL2 intersects second driving lines TL2.

Referring to FIG. 12, the second driving lines TL2 intersecting the second subsidiary antenna feed line SFL2 may be disposed on the first sensor insulating layer TINS1. Accordingly, the antenna feed line FL may extend around the second driving lines TL2 to be connected to the antenna pad FP and the antenna pattern AP. The first feed contact hole FCNT1 may be disposed between one of the second driving lines TL2 and the antenna pattern AP.

Figure 13:
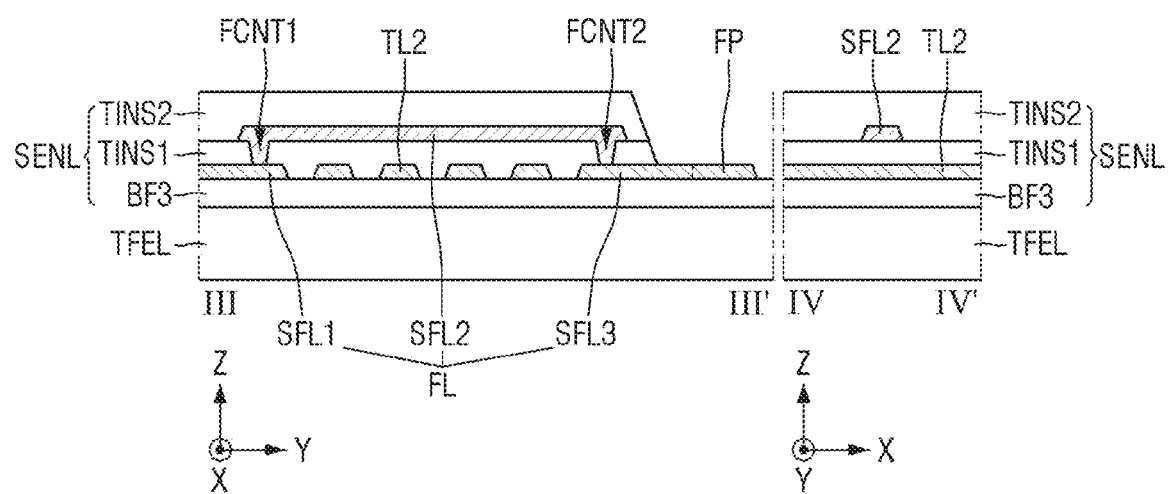
FIG. 13 is a cross-sectional view showing of a fourth exemplary embodiment taken along lines III-III' and IV-IV' of FIG. 7.

FIG. 13 is a cross-sectional view of a fourth exemplary embodiment taken along lines III-III' and IV-IV' of FIG. 7.

The exemplary embodiment of FIG. 13 is different from the exemplary embodiment of FIG. 10 in that an antenna feed line FL includes a first subsidiary antenna feed line SFL1, a second subsidiary antenna feed line SFL2 and a third subsidiary antenna feed line SFL3.

Referring to FIG. 13, the first subsidiary antenna feed line SFL1 and the third subsidiary antenna feed line SFL3 may be disposed on a third buffer layer BF3 and may be covered by the first sensor insulating layer TINS1. The second subsidiary antenna feed line SFL2 may be disposed on the first sensor insulating layer TINS1. The second subsidiary antenna feed line SFL2 may be connected to the first subsidiary antenna feed line SFL1 through a first feed contact hole FCNT1 penetrating through the first sensor insulating layer TINS1. The first feed contact hole FCNT1 may be disposed between one of the second driving lines TL2 and the antenna pattern AP. The second subsidiary antenna feed line SFL2 may be connected to the first subsidiary antenna feed line SFL1 through a second feed contact hole FCNT2 penetrating through the first sensor insulating layer TINS1. The second feed contact hole FCNT2 may be disposed between one of the second driving lines TL2 and the antenna pad FP.

The third subsidiary antenna feed line SFL3 may be connected to the antenna pad FP disposed on the third buffer layer BF3. The antenna pad FP may not be covered by the first sensor insulating layer TINS1 and the second sensor insulating layer TINS2 but may be exposed. Accordingly, the antenna pad FP may be electrically connected to a bump of the antenna circuit board 350 using a low-resistance, high-reliability material such as an anisotropic conductive film and an SAP.

The second driving lines TL2 intersecting the second subsidiary antenna feed line SFL2 may be disposed on the third buffer layer BF3 and may be covered by the first sensor insulating layer TINS1. Accordingly, the antenna feed line FL may extend around the second driving lines TL2 to be connected to the antenna pad FP and the antenna pattern AP.

Figure 14:
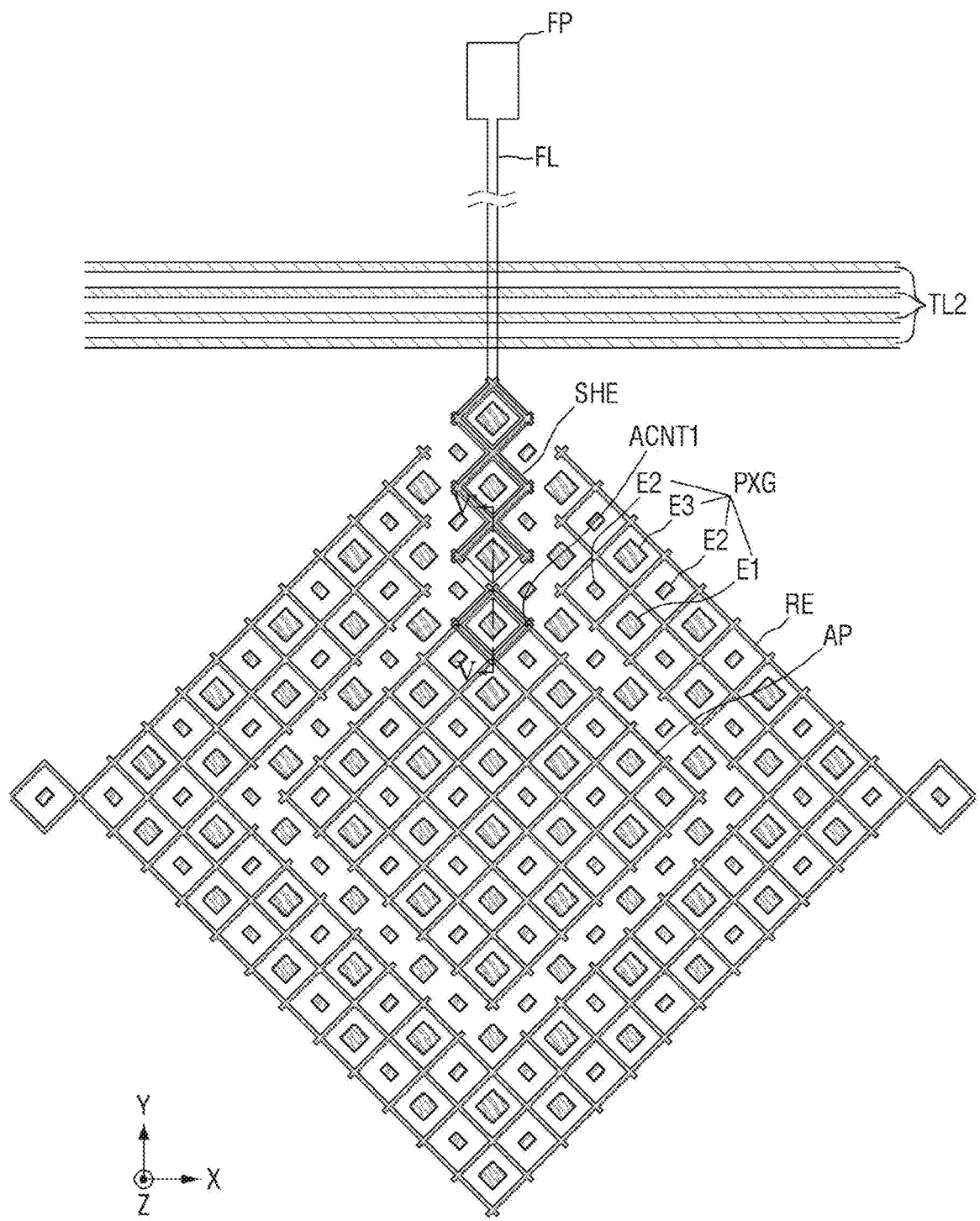
FIG. 14 is a layout view of a second exemplary embodiment of the sensing electrodes, the antenna patterns, the antenna feed lines, the second driving lines, and feed pads of FIG. 5.
Figure 15:
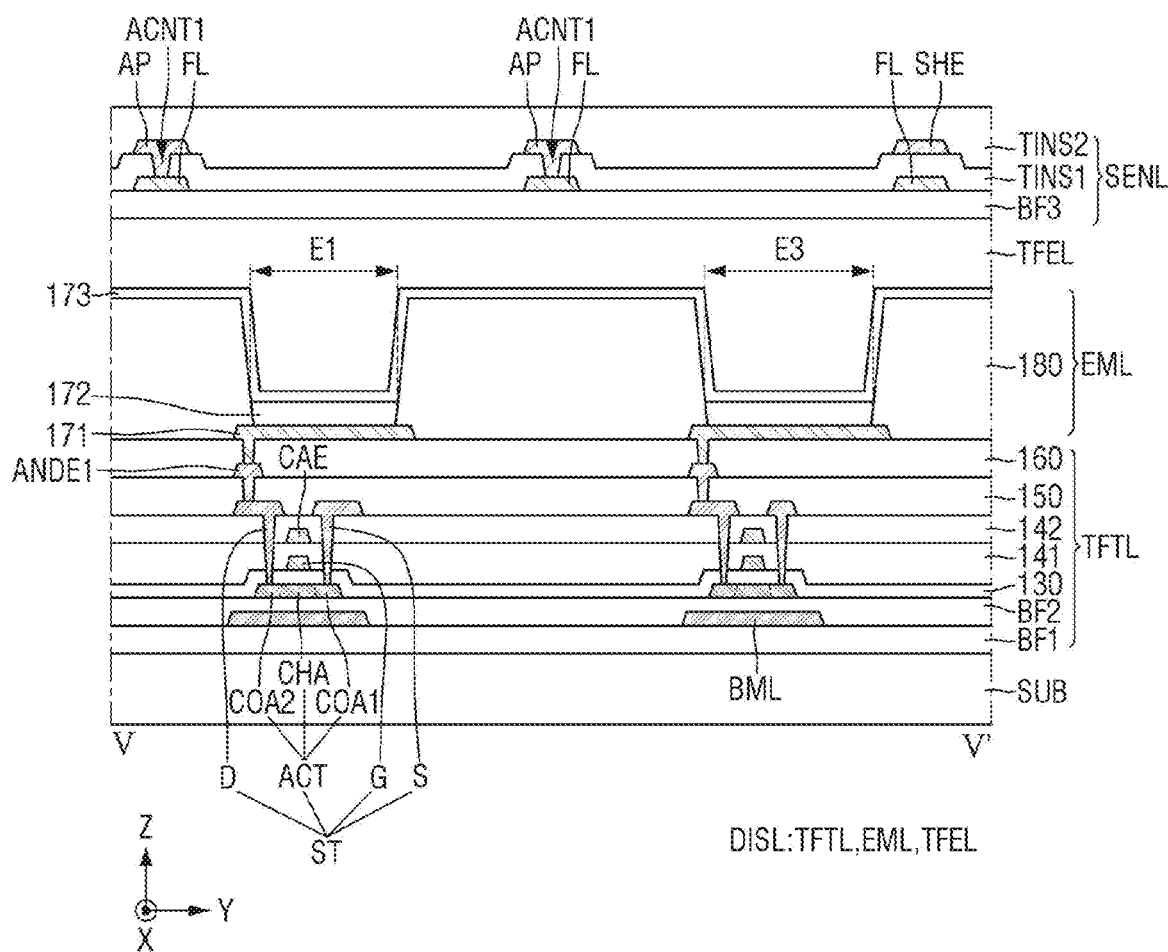
FIG. 15 is a cross-sectional view of an exemplary embodiment taken along line V-V' of FIG. 14.

FIG. 14 is a layout view of a second exemplary embodiment of the sensing electrodes, the antenna patterns, the antenna feed lines, the second driving lines, and feed pads of FIG. 5. FIG. 15 is a cross-sectional view of an exemplary embodiment taken along line V-V' of FIG. 14.

The exemplary embodiment of FIGS. 14 and 15 is different from the exemplary embodiment of FIGS. 7 and 9 in that a blocking member, which may be in the form or a shielding electrode SHE, that overlaps an antenna feed line FL in the third direction (z-axis direction) is added to block electric fields caused by radio frequency signals applied to the antenna feed lines.

Referring to FIGS. 14 and 15, a shielding electrode SHE, a sensing electrode RE and an antenna pattern AP are disposed on the same layer, and accordingly they may be spaced apart from one another. In other words, there may be a gap between the shielding electrode SHE and the sensing electrode RE and between the shielding electrode SHE and the antenna pattern AP.

The shielding electrode SHE may be disposed on a different layer from the antenna feed line FL. The shielding electrode SHE may be disposed on the first sensor insulating layer TINS1. The shielding electrode SHE may be electrically separated from the antenna feed line FL. The shielding electrode SHE may be spaced apart from the antenna feed line FL. The shielding electrode SHE may be electrically floating or a ground voltage may be applied to the shielding electrode SHE.

The shielding electrode SHE may be formed in a mesh pattern when viewed from the top. Accordingly, the shielding electrode SHE may not overlap the emission areas E1, E2, and E3. Therefore, the light emitted from the emission areas E1, E2 and E3 is covered by the shielding electrode SHE, and thus it is possible to prevent the luminance of the light from being reduced.

As shown in FIGS. 14 and 15, the shielding electrode SHE overlaps the antenna feed line FL in the third direction (z-axis direction), and thus the electric field caused by radio frequency signals applied to the antenna feed lines FL can be blocked. In this manner, it is possible to reduce the affect of the electric field of the antenna feed line FL upon the sensing electrode RE. The width of the shielding electrode SHE overlapping the antenna feed line FL in the third direction (z-axis direction) may be substantially equal to or greater than the width of the antenna feed line FL.

Figure 16:
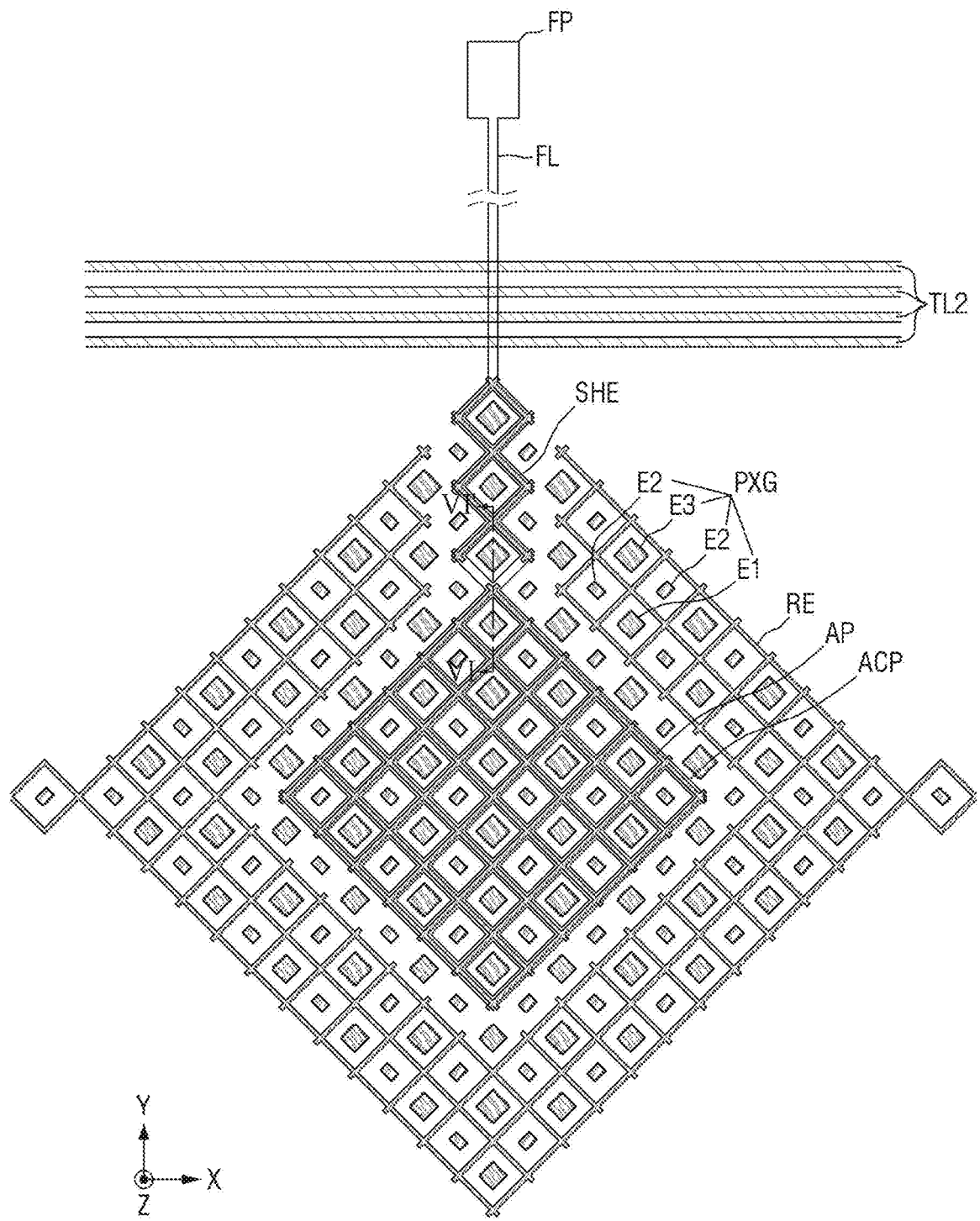
FIG. 16 is a layout view of a third exemplary embodiment of the sensing electrodes, the antenna patterns, the antenna feed lines, the second driving lines, and feed pads of FIG. 5.
Figure 17:
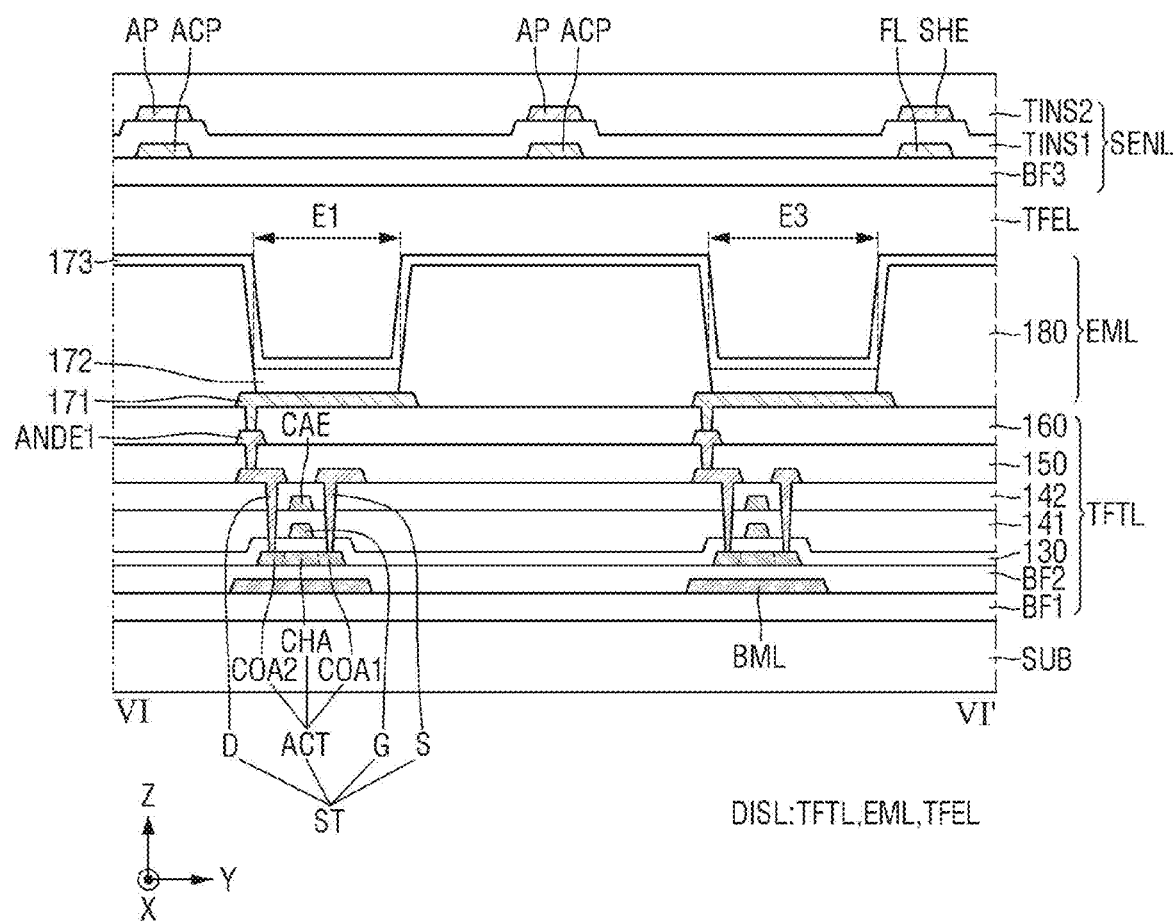
FIG. 17 is a cross-sectional view of an exemplary embodiment taken along line VI-VI' of FIG. 16.

FIG. 16 is a layout view of a third exemplary embodiment of the sensing electrodes, the antenna patterns, the antenna feed lines, the second driving lines, and feed pads of FIG. 5. FIG. 17 is a cross-sectional view of an exemplary embodiment taken along line VI-VI' of FIG. 16.

The exemplary embodiment of FIGS. 16 and 17 is different from the exemplary embodiment of FIGS. 14 and 15 in that an antenna feed line FL is not connected to an antenna pattern AP through a first antenna contact hole ACNT1 but is connected to a capacitor electrode pattern ACP.

Referring to FIGS. 16 and 17, the antenna feed line FL may be disposed on the same layer as the capacitor electrode pattern ACP. The capacitor electrode pattern ACP may be disposed on the third buffer layer BF3.

The capacitor electrode pattern ACP may overlap the antenna pattern AP in the third direction (z-axis direction). Since the first sensor insulating layer TINS1 having a predetermined dielectric constant is disposed between the capacitor electrode pattern ACP and the antenna pattern AP, an electrostatic capacitance may be formed between the capacitor electrode pattern ACP and the antenna pattern AP. The magnitude of the capacitance may increase with the area where the capacitor electrode pattern ACP overlaps the antenna pattern AP.

The capacitor electrode pattern ACP may be formed in a mesh pattern when viewed from the top. Accordingly, the capacitor electrode pattern ACP may not overlap the emission areas E1, E2 and E3. Therefore, it is possible to prevent the luminance of the light from being reduced which may occur when the light emitted from the emission areas E1, E2 and E3 is covered by the capacitor electrode pattern ACP.

Due to the capacitance formed between the capacitor electrode pattern ACP and the antenna pattern AP, the radio frequency signals received by the antenna pattern AP may be coupled to the capacitor electrode pattern ACP. In addition, the radio frequency signal supplied to the capacitor electrode pattern ACP may be coupled to the antenna pattern AP.

As shown in FIGS. 16 and 17, even though the capacitor electrode pattern ACP and the antenna pattern AP are not directly connected, they can transmit and receive radio frequency signals as they are electrically connected by the capacitance formed between them.

Figure 18:
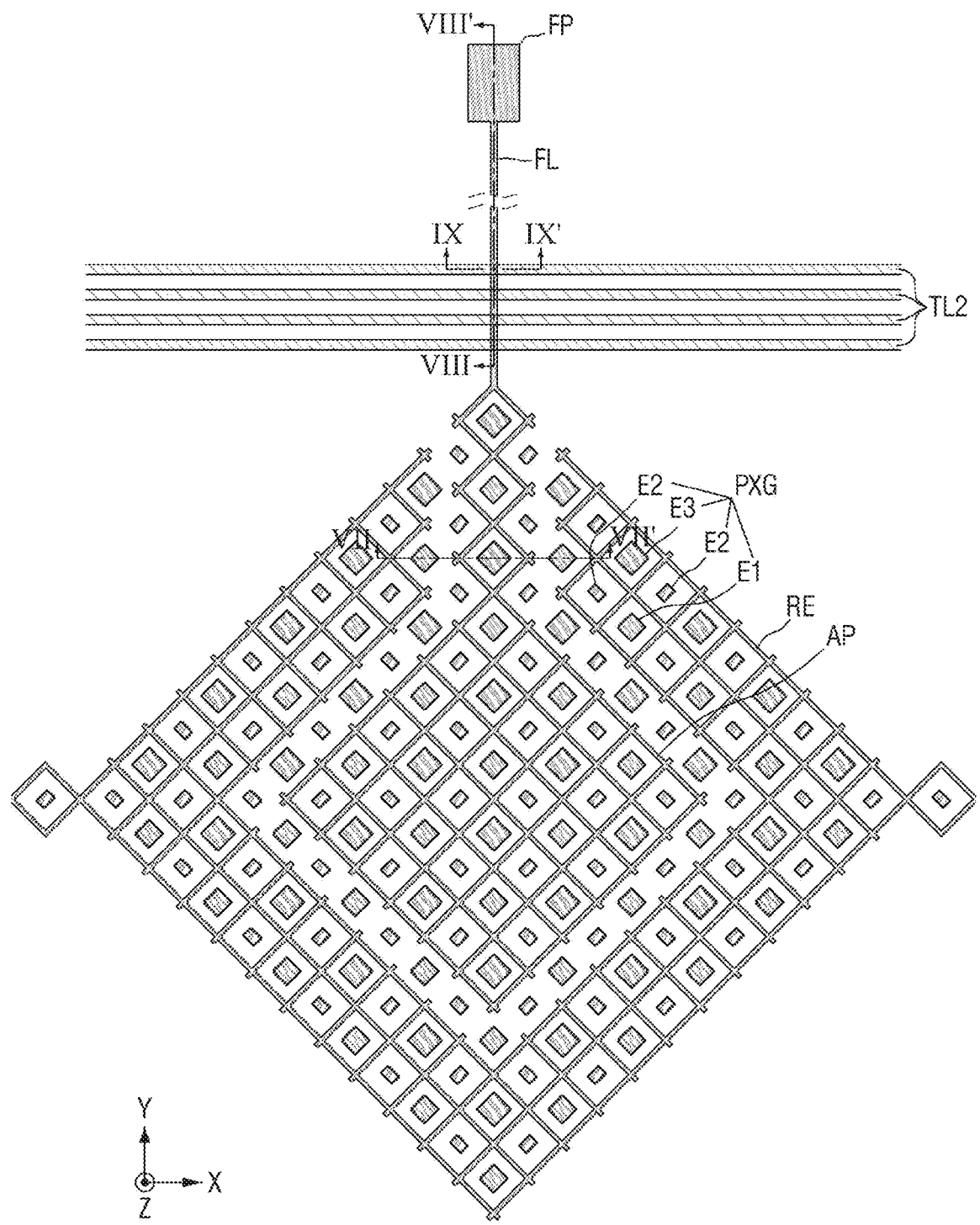
FIG. 18 is a layout view of a fourth exemplary embodiment of the sensing electrodes, the antenna patterns, the antenna feed lines, the second driving lines, and feed pads of FIG. 5.
Figure 19:
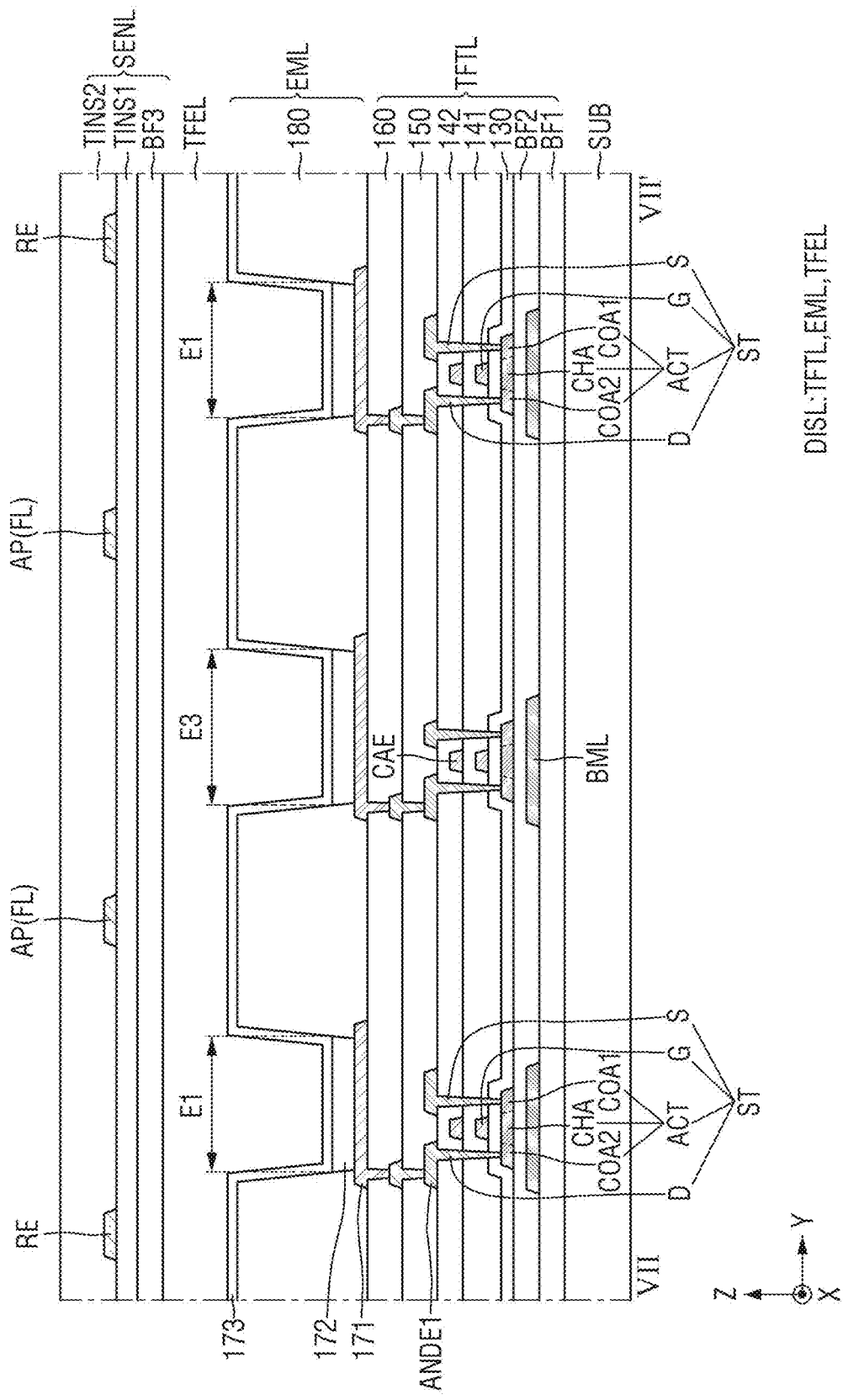
FIG. 19 is a cross-sectional view of an exemplary embodiment taken along line VII-VII' of FIG. 18.

FIG. 18 is a layout view of a fourth exemplary embodiment of the sensing electrodes, the antenna patterns, the antenna feed lines, the second driving lines, and feed pads of FIG. 5. FIG. 19 is a cross-sectional view of an exemplary embodiment taken along line VII-VII' of FIG. 18.

The exemplary embodiment of FIGS. 18 and 19 is different from the exemplary embodiment of FIGS. 7 and 9 in that an antenna pattern AP and an antenna feed line FL are disposed on the same layer and connected to each other directly, rather than the antenna pattern AP being connected to the antenna feed line FL through the first antenna contact hole ACNT1.

Referring to FIGS. 18 and 19, the antenna feed line FL may extend from the antenna pattern AP. The antenna pattern AP and the antenna feed line FL may be disposed on the same layer. For example, the antenna pattern AP and the antenna feed line FL may be disposed on the first sensor insulating layer TINS1.

In addition, the antenna feed line FL may be disposed on the same layer as the sensing electrode RE. The antenna feed line FL and the sensing electrode RE may be electrically separated from each other and are spaced apart from each other. In other words, a gap may be formed between the antenna feed line FL and the sensing electrode RE.

As shown in FIGS. 18 and 19, since the antenna pattern AP and the antenna feed line FL are directly connected without passing through the contact holes, it is possible to prevent loss of radio frequency signals due to the contact resistance in the contact holes. In this manner, when the display device 10 is employed by a portable electronic device including a battery such as a mobile phone, a smart phone and a tablet PC, it is possible to prevent that the battery lifetime is reduced due to loss of radio frequency signals.

Figure 20:
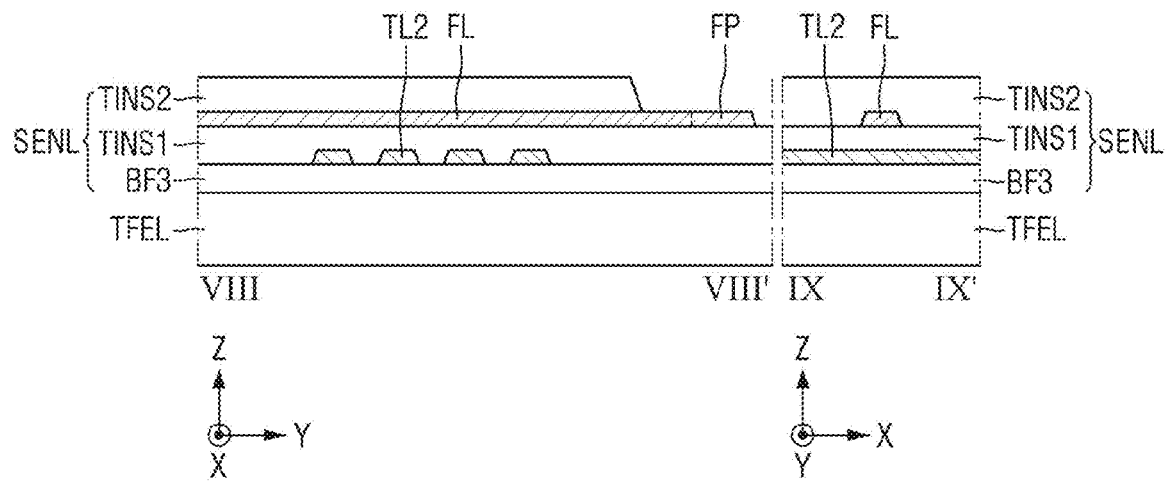
FIG. 20 is a cross-sectional view of a first exemplary embodiment taken along lines VIII-VIII' and IX-IX' of FIG. 18.

FIG. 20 is a cross-sectional view of a first exemplary embodiment taken along lines VIII-VIII' and IX-IX' of FIG. 18.

In FIG. 20, the substrate SUB and the thin-film transistor layer TFTL are not shown for convenience of illustration. It is apparent to those skilled in the art that the encapsulation layer TFEL of FIG. 20 may be replaced with the second substrate SUB2 when the sensor electrode layer SENL is disposed on the second substrate SUB2 as shown in FIG. 3.

Referring to FIG. 20, the antenna feed line FL may be disposed on the first sensor insulating layer TINS1 and may be connected to the antenna pad FP disposed on the first sensor insulating layer TINS1. The antenna pad FP may not be covered by the second sensor insulating layer TINS2 but may be exposed. Accordingly, the antenna pad FP may be electrically connected to a bump of the antenna circuit board 350 using a low-resistance, high-reliability material such as an anisotropic conductive film and an SAP.

The second driving lines TL2 intersecting the antenna feed line FL may be disposed on the third buffer layer BF3 and may be covered by the first sensor insulating layer TINS1. Accordingly, the antenna feed line FL may extend around the second driving lines TL2 to be connected to the antenna pad FP and the antenna pattern AP.

Each of the second driving lines TL2 may include a second driving line on a first layer disposed on the third buffer layer BF3 and a second driving line on a second layer disposed on the first sensor insulating layer TINS1 in order to reduce the resistance in the other regions than the region where they intersect the antenna feed lines FL.

Figure 21:
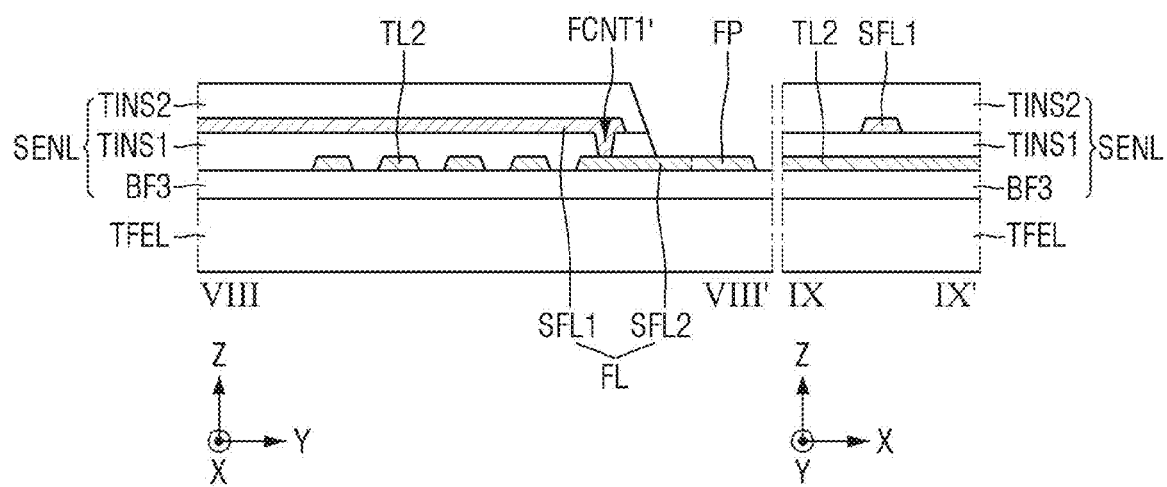
FIG. 21 is a cross-sectional view of a second exemplary embodiment taken along lines VIII-VIII' and IX-IX' of FIG. 18.

FIG. 21 is a cross-sectional view of a second exemplary embodiment taken along lines VIII-VIII' and IX-IX' of FIG. 18.

The exemplary embodiment of FIG. 21 is different from the exemplary embodiment of FIG. 20 in that an antenna feed line FL includes a first subsidiary antenna feed line SFL1 and a second subsidiary antenna feed line SFL2.

Referring to FIG. 21, the first subsidiary antenna feed line SFL1 may be disposed on the first sensor insulating layer TINS1. The second subsidiary antenna feed line SFL2 may be disposed on the third buffer layer BF3 and may be covered by the first sensor insulating layer TINS1. The first subsidiary antenna feed line SFL1 may be connected to the second subsidiary antenna feed line SFL2 through a first feed contact hole FCNT1' penetrating through the first sensor insulating layer TINS1. The first feed contact hole FCNT1' may be disposed between one of the second driving lines TL2 and the antenna pad FP.

The second subsidiary antenna feed line SFL2 may be connected to the antenna pad FP disposed on the third buffer layer BF3. The antenna pad FP may not be covered by the first sensor insulating layer TINS1 and the second sensor insulating layer TINS2 but may be exposed. Accordingly, the antenna pad FP may be electrically connected to a bump of the antenna circuit board 350 using a low-resistance, high-reliability material such as an anisotropic conductive film and an SAP.

Incidentally, when the antenna pad FP is disposed on the third buffer layer BF3, it must be exposed without being covered by the first sensor insulating layer TINS1 and the second sensor insulating layer TINS2. In contrast, when the antenna pad FP is disposed on the first sensor insulating layer TINS1, it must be exposed without being covered by the second sensor insulating layer TINS2. In other words, it is not necessary to remove the first sensor insulating layer TINS1 to expose the antenna pad FP. Therefore, when the antenna pad FP is disposed on the first sensor insulating layer TINS1, the length of the touch peripheral area TPA in the second direction (y-axis direction) may become shorter than the length when it is disposed on the third buffer layer BF3. In this manner, it is possible to reduce the non-display area of the display device 10.

It may be disposed on the third buffer layer BF3 intersecting the first subsidiary antenna feed line SFL1 and may be covered by the first sensor insulating layer TINS1. Accordingly, the antenna feed line FL may extend around the second driving lines TL2 to be connected to the antenna pad FP and the antenna pattern AP.

Figure 22:
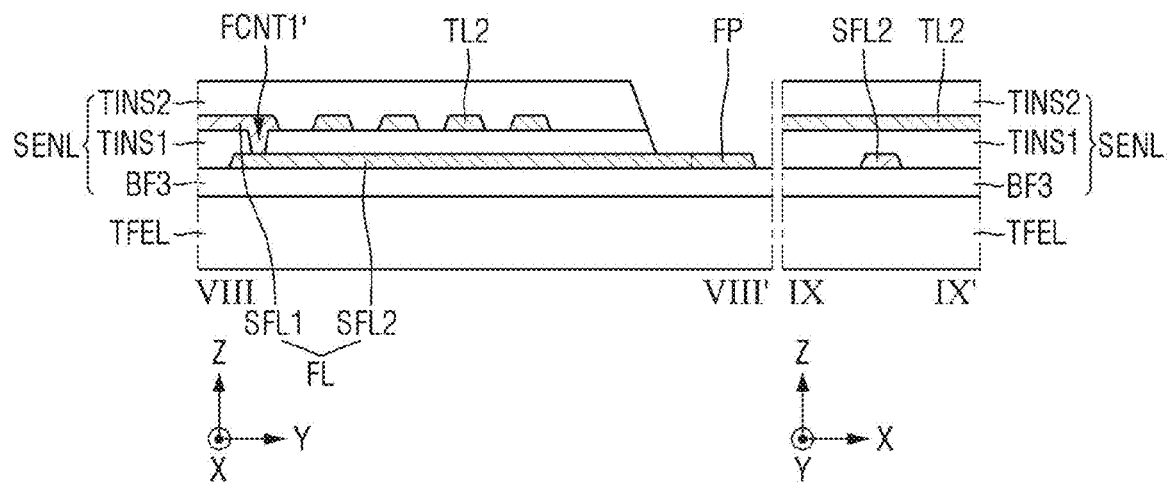
FIG. 22 is a cross-sectional view of a third exemplary embodiment taken along lines VIII-VIII' and IX-IX' of FIG. 18.

FIG. 22 is a cross-sectional view of a third exemplary embodiment taken along lines VIII-VIII' and IX-IX' of FIG. 18.

The exemplary embodiment of FIG. 22 is different from the exemplary embodiment of FIG. 11 in that a second subsidiary antenna feed line SFL2 intersects second driving lines TL2.

Referring to FIG. 22, the second driving lines TL2 intersecting the second subsidiary antenna feed line SFL2 may be disposed on the first sensor insulating layer TINS1. Accordingly, the antenna feed line FL may extend around the second driving lines TL2 to be connected to the antenna pad FP and the antenna pattern AP. The first feed contact hole FCNT1' may be disposed between one of the second driving lines TL2 and the antenna pattern AP.

Figure 23:
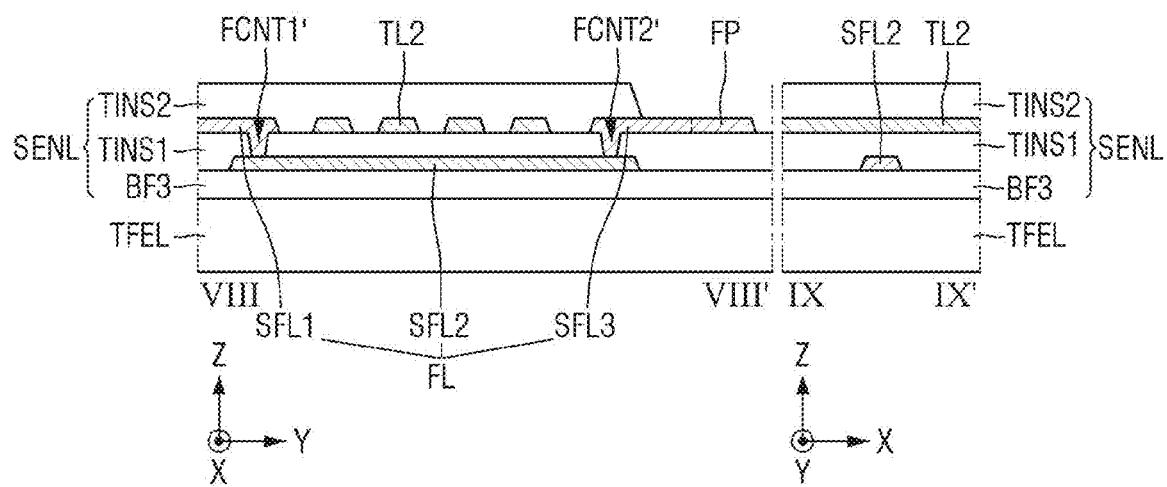
FIG. 23 is a cross-sectional view of a fourth exemplary embodiment taken along lines VIII-VIII' and IX-IX' of FIG. 18.

FIG. 23 is a cross-sectional view of a fourth exemplary embodiment taken along lines VIII-VIII' and IX-IX' of FIG. 18.

The exemplary embodiment of FIG. 23 is different from the exemplary embodiment of FIG. 20 in that an antenna feed line FL includes a first subsidiary antenna feed line SFL1, a second subsidiary antenna feed line SFL2 and a third subsidiary antenna feed line SFL3.

Referring to FIG. 23, the first subsidiary antenna feed line SFL1 and the third subsidiary antenna feed line SFL3 may be disposed on the first sensor insulating layer TINS1. The second subsidiary antenna feed line SFL2 may be disposed on the third buffer layer BF3 and may be covered by the first sensor insulating layer TINS1. The first subsidiary antenna feed line SFL1 may be connected to the second subsidiary antenna feed line SFL2 through a first feed contact hole FCNT1' penetrating through the first sensor insulating layer TINS1. The first feed contact hole FCNT1' may be disposed between one of the second driving lines TL2 and the antenna pattern AP. The third subsidiary antenna feed line SFL3 may be connected to the second subsidiary antenna feed line SFL2 through a second feed contact hole FCNT2' penetrating through the first sensor insulating layer TINS1. The second feed contact hole FCNT2' may be disposed between one of the second driving lines TL2 and the antenna pad FP.

The third subsidiary antenna feed line SFL3 may be connected to the antenna pad FP disposed on the first sensor insulating layer TINS1. The antenna pad FP may not be covered by the second sensor insulating layer TINS2 but may be exposed. Accordingly, the antenna pad FP may be electrically connected to a bump of the antenna circuit board 350 using a low-resistance, high-reliability material such as an anisotropic conductive film and an SAP.

The second driving lines TL2 intersecting the second subsidiary antenna feed line SFL2 may be disposed on the first sensor insulating layer TINS1. Accordingly, the antenna feed line FL may extend around the second driving lines TL2 to be connected to the antenna pad FP and the antenna pattern AP.

Figure 24:
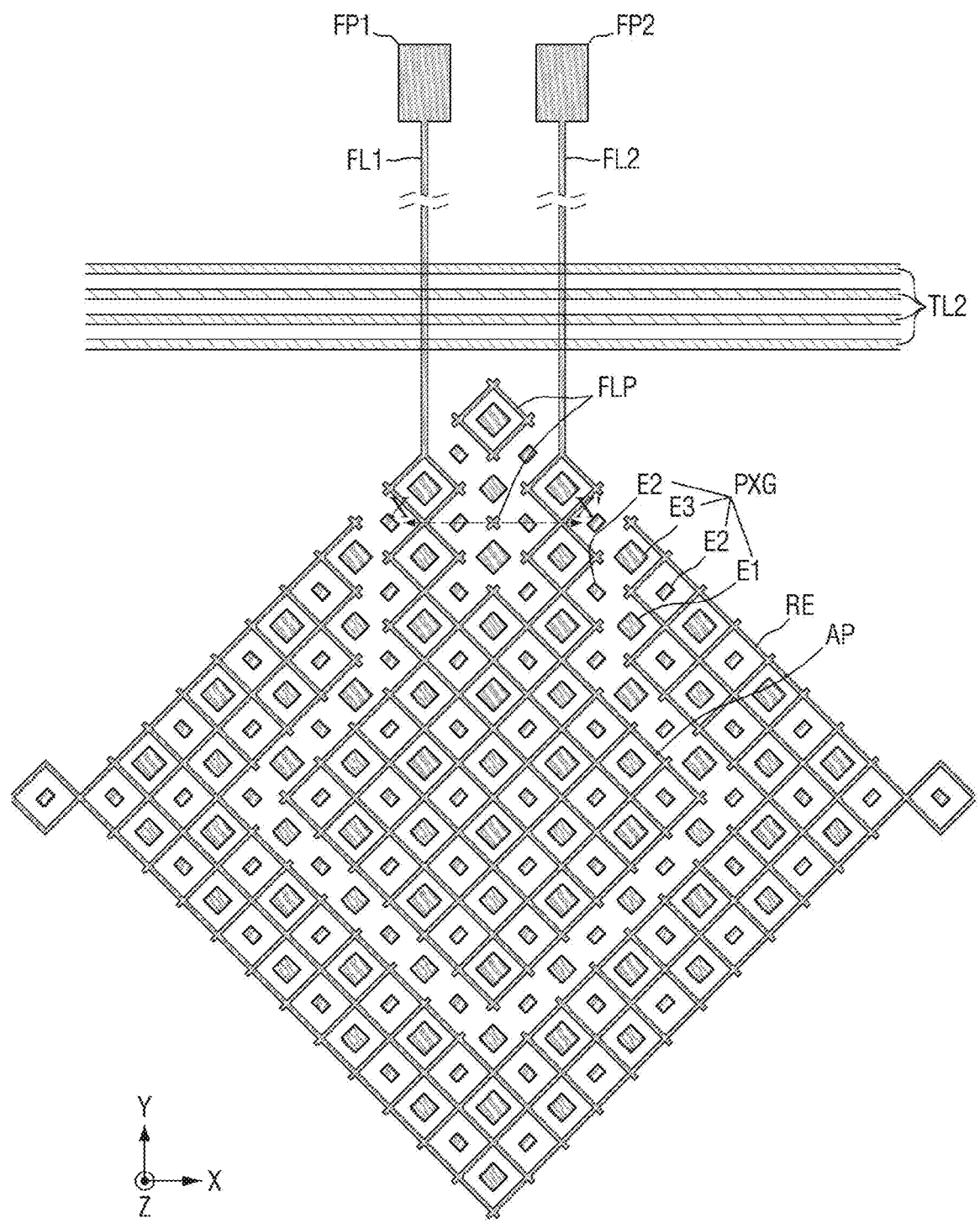
FIG. 24 is a layout view of a fifth exemplary embodiment of the sensing electrodes, the antenna patterns, the antenna feed lines, the second driving lines, and feed pads of FIG. 5.
Figure 25:
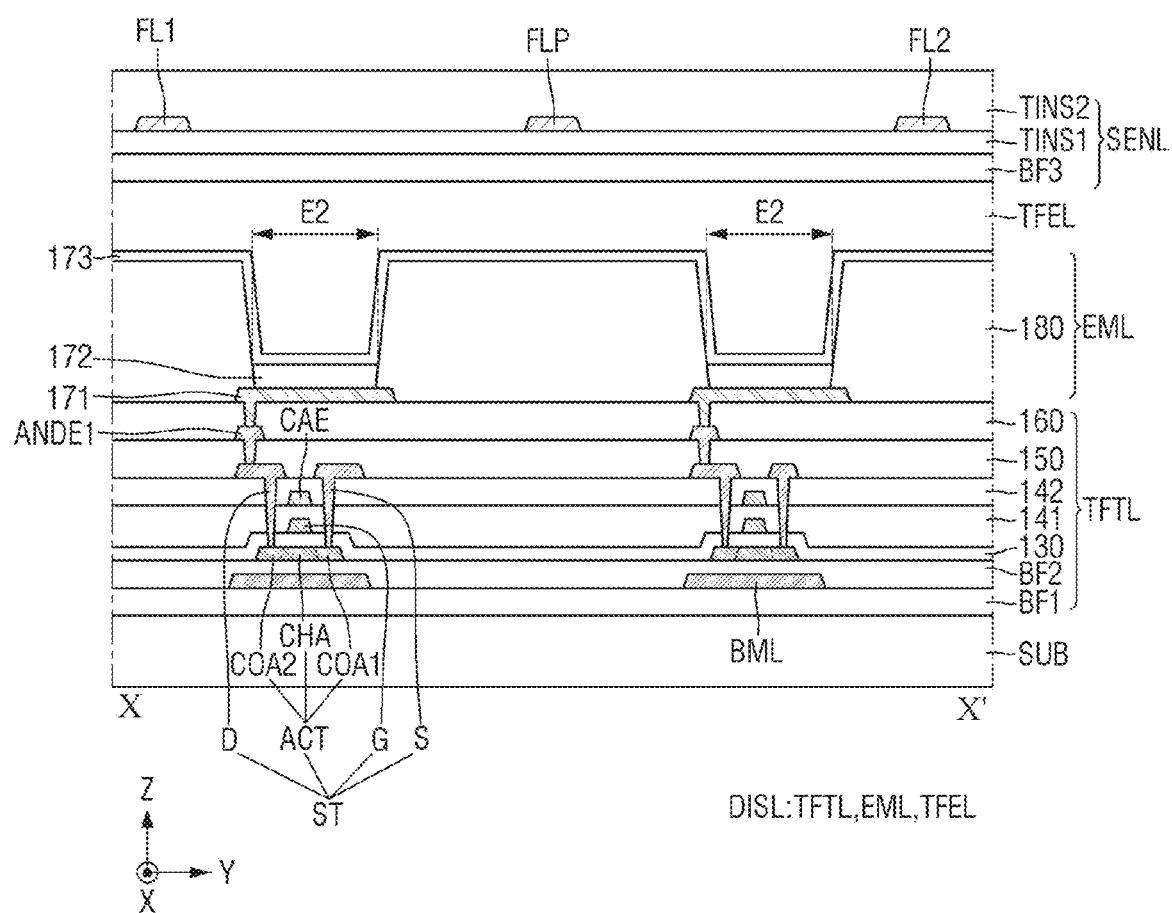
FIG. 25 is a cross-sectional view of an exemplary embodiment, taken along line X-X' of FIG. 24.

FIG. 24 is a layout view of a fifth exemplary embodiment of the sensing electrodes, the antenna patterns, the antenna feed lines, the second driving lines, and feed pads of FIG. 5. FIG. 25 is a cross-sectional view of an exemplary embodiment taken along line X-X' of FIG. 24.

The exemplary embodiment of FIGS. 24 and 25 is different from the exemplary embodiment of FIGS. 18 and 19 in that two antenna feed lines FL1 and FL2 are connected to an antenna pattern AP.

Referring to FIGS. 24 and 25, each of a first antenna feed line FL1 and a second antenna feed line FL2 may extend from the antenna pattern AP. The first antenna feed line FL1, the second antenna feed line FL2, and the antenna pattern AP may be disposed on the same layer. For example, the first antenna feed line FL1, the second antenna feed line FL2, and the antenna pattern AP may be disposed on the first sensor insulating layer TINS1.

The first antenna feed line FL1, the second antenna feed line FL2 and the sensing electrode RE may be disposed on the same layer. The first antenna feed line FL1 and the sensing electrode RE may be electrically separated from each other and are spaced apart from each other. In other words, a gap may be formed between the first antenna feed line FL1 and the sensing electrode RE. The second antenna feed line FL2 and the sensing electrode RE may be electrically separated from each other and are spaced apart from each other. In other words, a gap may be formed between the second antenna feed line FL2 and the sensing electrode RE.

The first antenna feed line FL1 and the second antenna feed line FL2 may be electrically separated from each other and are spaced apart from each other. In other words, a gap may be formed between the first antenna feed line FL1 and the second antenna feed line FL2. A floating pattern FLP which is electrically floating may be disposed between the first antenna feed line FL1 and the second antenna feed line FL2. No voltage may be applied to the floating pattern FLP. The floating pattern FLP may be eliminated.

The first antenna feed line FL1 may be connected to a first antenna pad FP1, and the second antenna feed line FL2 may be connected to a second antenna pad FP2. Therefore, the antenna pattern AP may transmit and receive radio frequency signals of a first polarized wave through the first antenna feed line FL1 and may transmit and receive radio frequency signals of a second polarized wave through the second antenna feed line FL2. One of the first polarized wave and the second polarized wave may have a polarization plane of the E-plane, and the other may have a polarization plane of the H-plane. For example, the first polarized wave may be an electromagnetic wave having polarization plane horizontal to the ground, and the second polarized wave may be an electromagnetic wave having polarization plane perpendicular to the ground.

As shown in FIGS. 24 and 25, when the antenna pattern AP is connected to the first antenna feed line FL1 and the second antenna feed line FL2, a radio frequency signal of a first polarized wave may be transmitted and received via the first antenna feed line FL1, and a radio frequency signal of a second polarized wave may be transmitted and received via the second antenna feed line FL2. That is, two radio frequency signals of polarized waves may be transmitted and received using a single antenna pattern AP.

Figure 26:
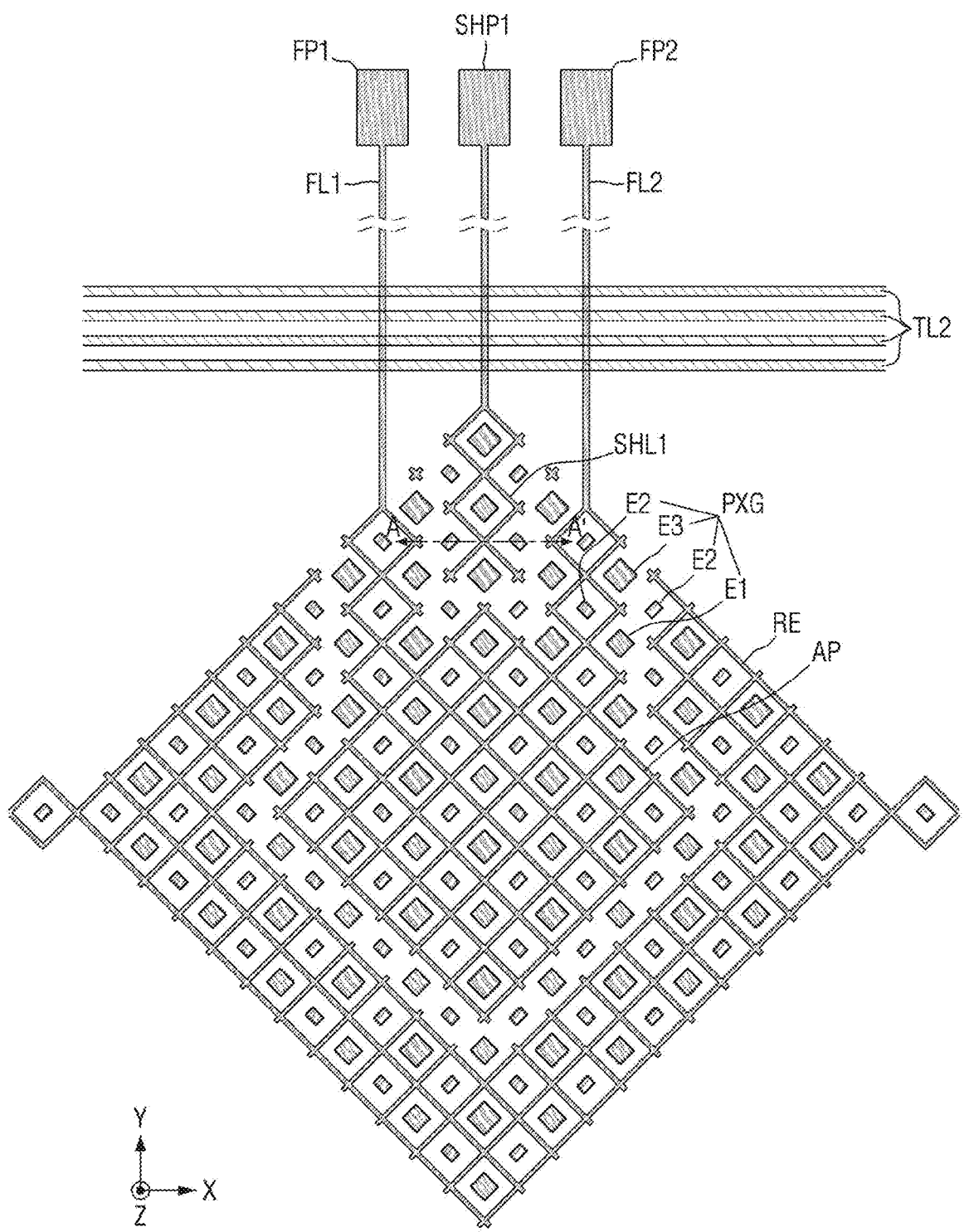
FIG. 26 is a layout view of a sixth exemplary embodiment of the sensing electrodes, the antenna patterns, the antenna feed lines, the second driving lines, and feed pads of FIG. 5.
Figure 27:
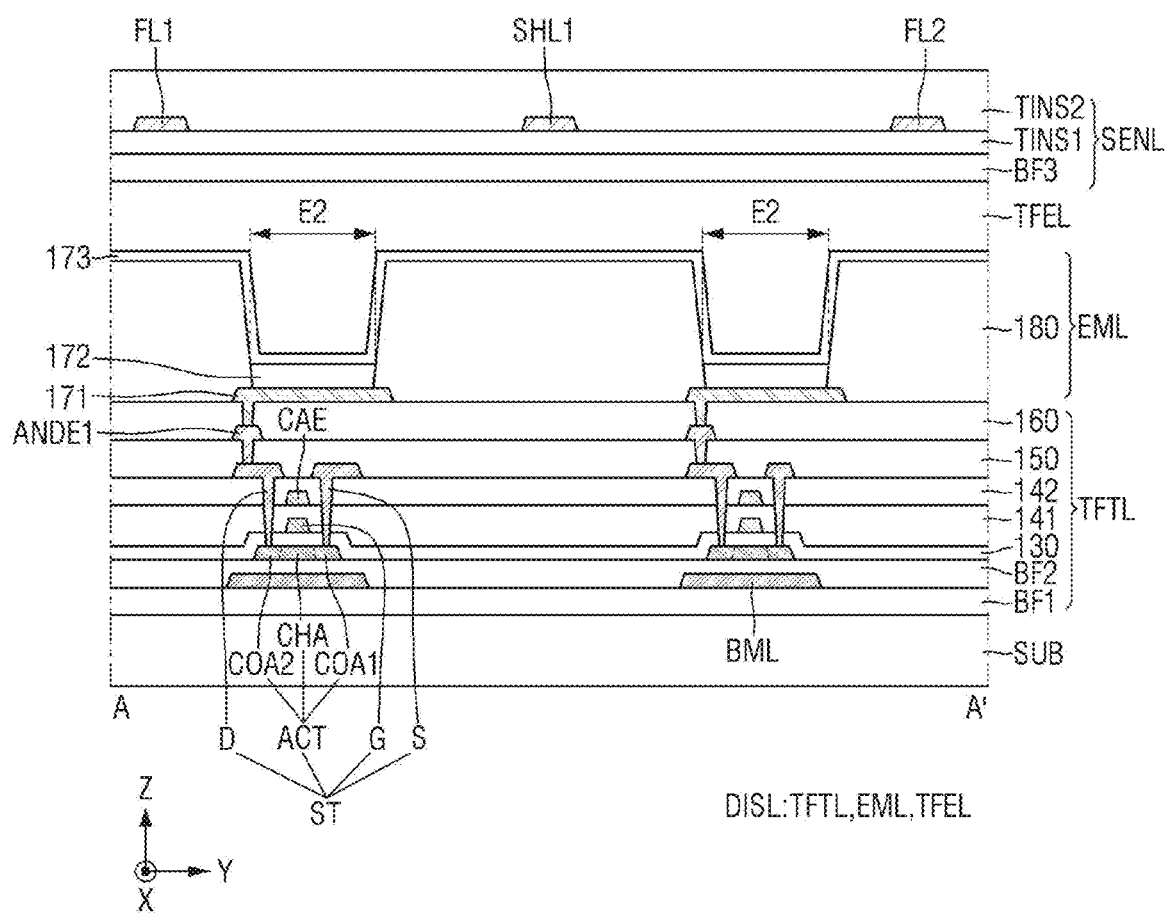
FIG. 27 is a cross-sectional view of a first exemplary embodiment taken along line A-A' of FIG. 27.

FIG. 26 is a layout view of a sixth exemplary embodiment of the sensing electrodes, the antenna patterns, the antenna feed lines, the second driving lines, and feed pads of FIG. 5. FIG. 27 is a cross-sectional view of a first exemplary embodiment taken along line A-A' of FIG. 27.

The exemplary embodiment of FIGS. 26 and 27 is different from the exemplary embodiment of FIGS. 24 and 25 in that a first shielding line SHL1 is disposed between the first antenna feed line FL1 and the second antenna feed line FL2.

Referring to FIGS. 26 and 27, the first antenna feed line FL1 and the first shielding line SHL1 are electrically separated from each other and may be spaced apart from each other. In other words, a gap may be formed between the first antenna feed line FL1 and the first shielding line SHL1.

The second antenna feed line FL2 and the sensing electrode RE may be electrically separated from each other and are spaced apart from each other. In other words, a gap may be formed between the second antenna feed line FL2 and the first shielding line SHL1.

The first shielding line SHL1 may be electrically separated from the antenna pattern AP. The first shielding line SHL1 may be spaced apart from the antenna pattern AP.

The first shielding line SHL1 may be disposed between the first antenna feed line FL1 and the second antenna feed line FL2 in the first direction (x-axis direction). The first shielding line SHL1 may extend in the second direction (y-axis direction). The first shielding line SHL1 may cross the at least one second driving line TL2. The first shielding line SHL1 may be connected to a shielding pad SHP. The first shielding line SHL1 may receive a ground voltage through the shielding pad SHP. The shielding pad SHP may be electrically connected to a bump of the antenna circuit board 350 using a low-resistance, high-reliability material such as an anisotropic conductive film and an SAP.

The first antenna feed line FL1, the second antenna feed line FL2, and the first shielding line SHL1 may be disposed on the same layer, as shown in FIG. 27. For example, the first antenna feed line FL1, the second antenna feed line FL2 and the first shielding line SHL1 may be disposed on the first sensor insulating layer TINS1.

Since the first shielding line SHL1 is disposed between the first antenna feed line FL1 and the second antenna feed line FL, it is possible to block the first antenna feed line FL1 and the second antenna feed line FL2 from being affected by the first shielding line SHL1.

Figure 28:
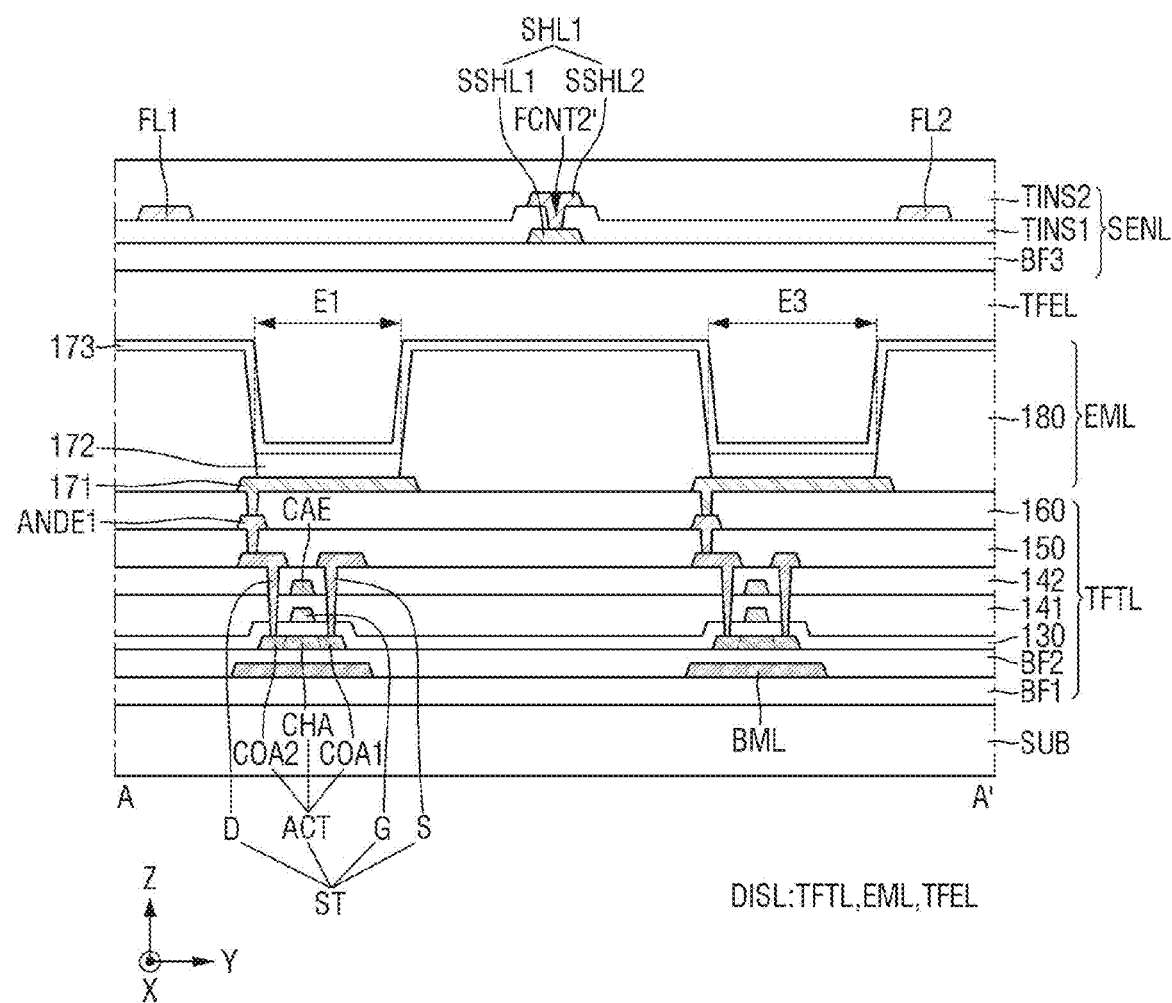
FIG. 28 is a cross-sectional view of a second exemplary embodiment taken along line A-A' of FIG. 27.

Alternatively, FIG. 28 is a cross-sectional view of a second exemplary embodiment taken along line A-A' of FIG. 27. As shown in FIG. 28, the first shielding line SHL1 may include a first subsidiary shielding line SSHL1 disposed on the third buffer layer BF3, and a second subsidiary shielding line SSHL2 disposed on the first sensor insulating layer TINS1. In such case, it is possible to further block the electric field under the first antenna feed line FL1 and the second antenna feed line FL2 by the first shielding line SHL1.

Figure 29:
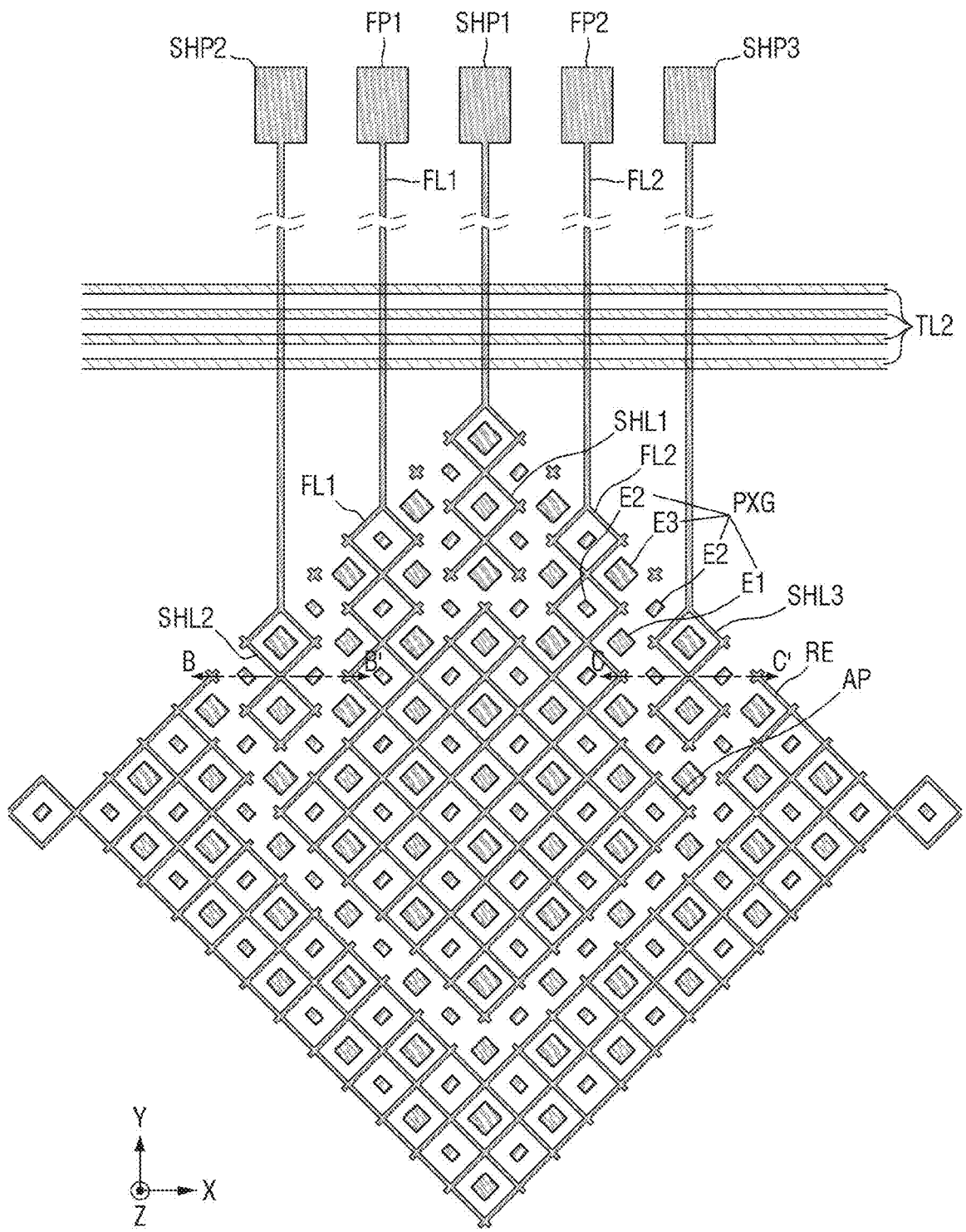
FIG. 29 is a layout view of a seventh exemplary embodiment of the sensing electrodes, the antenna patterns, the antenna feed lines, the second driving lines, and feed pads of FIG. 5.
Figure 30:
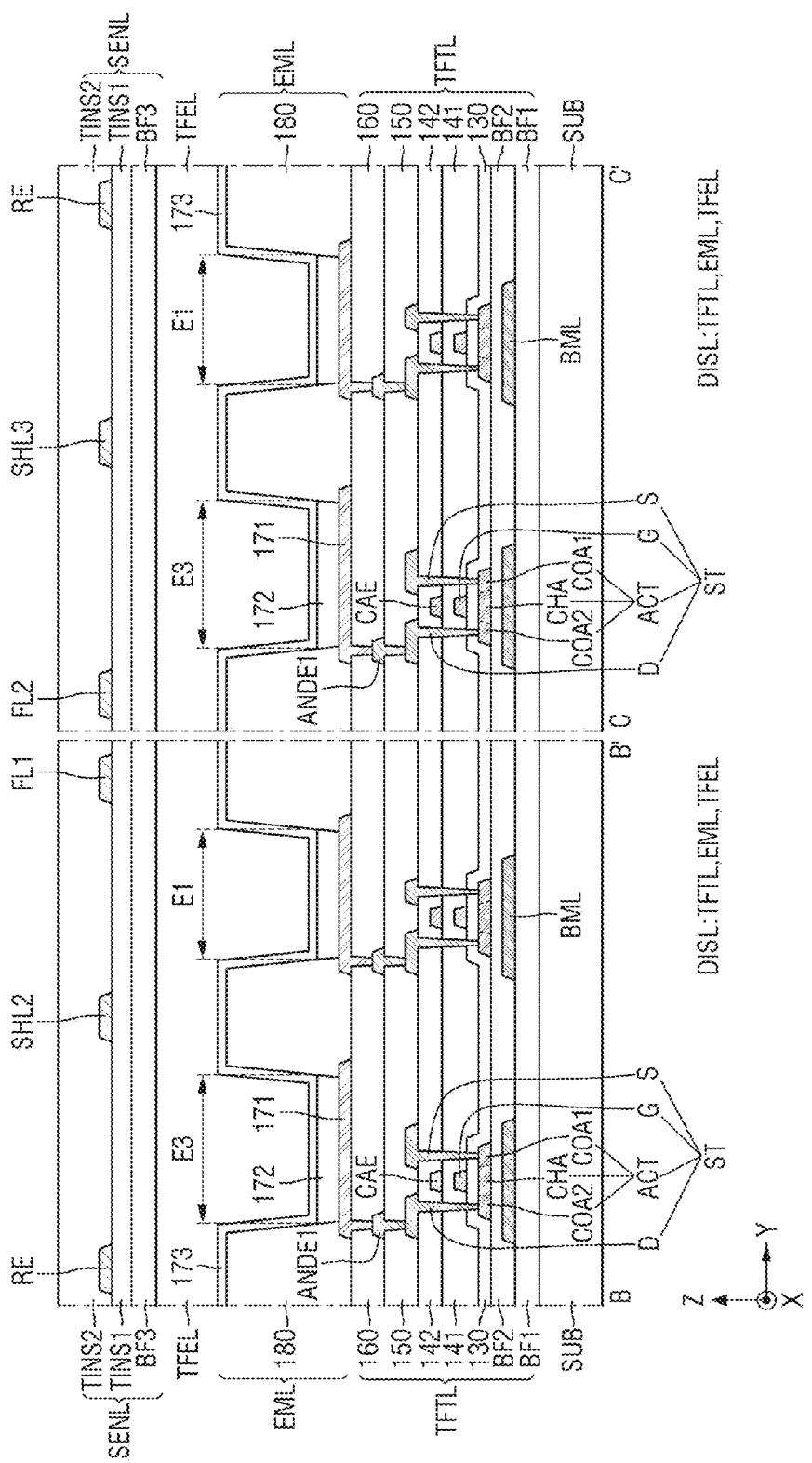
FIG. 30 is a cross-sectional view of a first exemplary embodiment taken along line B-B' of FIG. 29.

FIG. 29 is a layout view of a seventh exemplary embodiment of the sensing electrodes, the antenna patterns, the antenna feed lines, the second driving lines, and feed pads of FIG. 5. FIG. 30 is a cross-sectional view of a first exemplary embodiment taken along line B-B' of FIG. 29.

The exemplary embodiment of FIGS. 29 and 30 is different from the exemplary embodiment of FIGS. 26 and 27 in that a second shielding line SHL2 is added between a first antenna feed line FL1 and a sensing electrode RE, and a third shielding line SHL3 is added between a second antenna feed line FL2 and a sensing electrode RE.

Referring to FIGS. 29 and 30, the first antenna feed line FL1 and the second shielding line SHL2 are electrically separated from each other and may be spaced apart from each other. In other words, a gap may be formed between the first antenna feed line FL1 and the second shielding line SHL2. In addition, the sensing electrode RE and the second shielding line SHL2 may be electrically separated from each other and are spaced apart from each other. In other words, a gap may be formed between the sensing electrode RE and the second shielding line SHL2.

The second antenna feed line FL2 and the third shielding line SHL3 may be electrically separated from each other and are spaced apart from each other. In other words, a gap may be formed between the second antenna feed line FL2 and the third shielding line SHL3. In addition, the sensing electrode RE and the third shielding line SHL3 may be electrically separated from each other and are spaced apart from each other. In other words, a gap may be formed between the sensing electrode RE and the third shielding line SHL3.

Each of the second shielding line SHL2 and the third shielding line SHL3 may be electrically separated from the antenna pattern AP. Each of the second shielding line SHL2 and the third shielding line SHL3 may be spaced apart from the antenna pattern AP.

The second shielding line SHL2 may be disposed between the first antenna feed line FL1 and the sensing electrode RE in the first direction (x-axis direction). The third shielding line SHL3 may be disposed between the second antenna feed line FL2 and the sensing electrode RE in the first direction (x-axis direction).

Each of the second shielding line SHL2 and the third shielding line SHL3 may extend in the second direction (y-axis direction). Each of the second shielding line SHL2 and the third shielding line SHL3 may cross at least one second driving line TL2. The second shielding line SHL2 may be connected to a second shielding pad SHP2. The second shielding line SHL2 may receive a ground voltage through the second shielding pad SHP2. The third shielding line SHL3 may be connected to a third shielding pad SHP3. The third shielding line SHL3 may receive a ground voltage through the third shielding pad SHP3. Each of the second shielding pad SHP and the third shielding pad SHP3 may be electrically connected to a bump of the antenna circuit board 350 using a low-resistance, high-reliability material such as an anisotropic conductive film and an SAP.

The first antenna feed line FL1, the second antenna feed line FL2, the second shielding line SHL2, the third shielding line SHL3 and the sensing electrode RE may be disposed on the same layer as shown in FIG. 30. For example, the first antenna feed line FL1, the second antenna feed line FL2, the second shielding line SHL2, the third shielding line SHL3 and the sensing electrode RE may be disposed on the first sensor insulating layer TINS1.

Since the second shielding line SHL2 is disposed between the first antenna feed line FL1 and the sensing electrode RE, it is possible to block the first antenna feed line FL1 and the sensing electrode RE from being affected by the second shielding line SHL2. Since the third shielding line SHL3 is disposed between the second antenna feed line FL2 and the sensing electrode RE, it is possible to block the second antenna feed line FL2 and the sensing electrode RE from being affected by the third shielding line SHL3.

Figure 31:
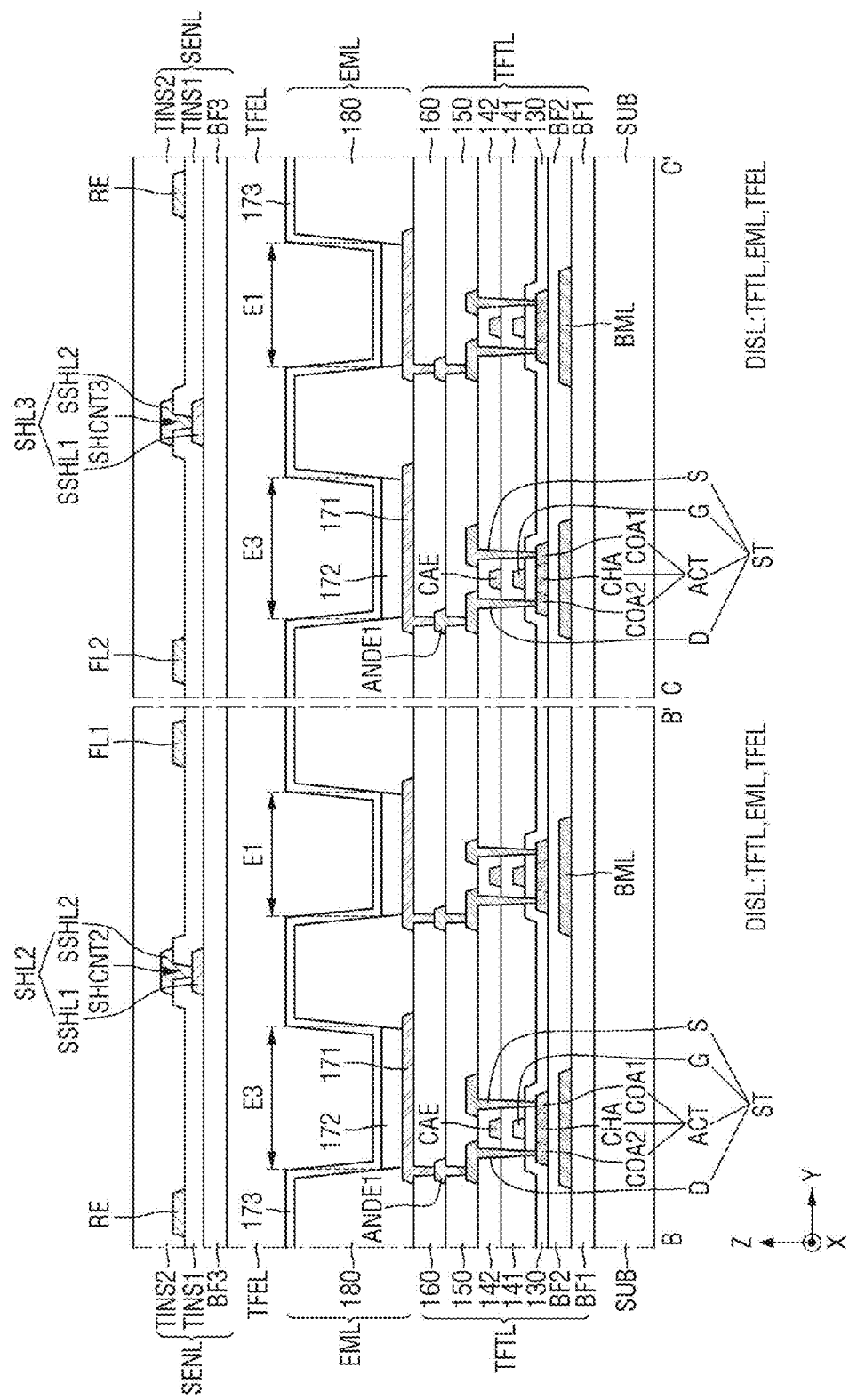
FIG. 31 is a cross-sectional view of a second exemplary embodiment taken along line B-B' of FIG. 29.

Alternatively, FIG. 31 is a cross-sectional view of a second exemplary embodiment taken along line B-B' of FIG. 29. As shown in FIG. 31, each of the second shielding line SHL2 and the third shielding line SHL3 may include a first subsidiary shielding line SSHL1 disposed on the third buffer layer BF3 and a second subsidiary shielding line SSHL2 disposed on the first sensor insulating layer TITIN1. In such case, it is possible to further block the electric field under the first antenna feed line FL1 and the sensing electrode RE by the second shielding line SHL2. In addition, it is possible to further block the electric field under the second antenna feed line FL2 and the sensing electrode RE by the third shielding line SHL3.

Figure 32A:
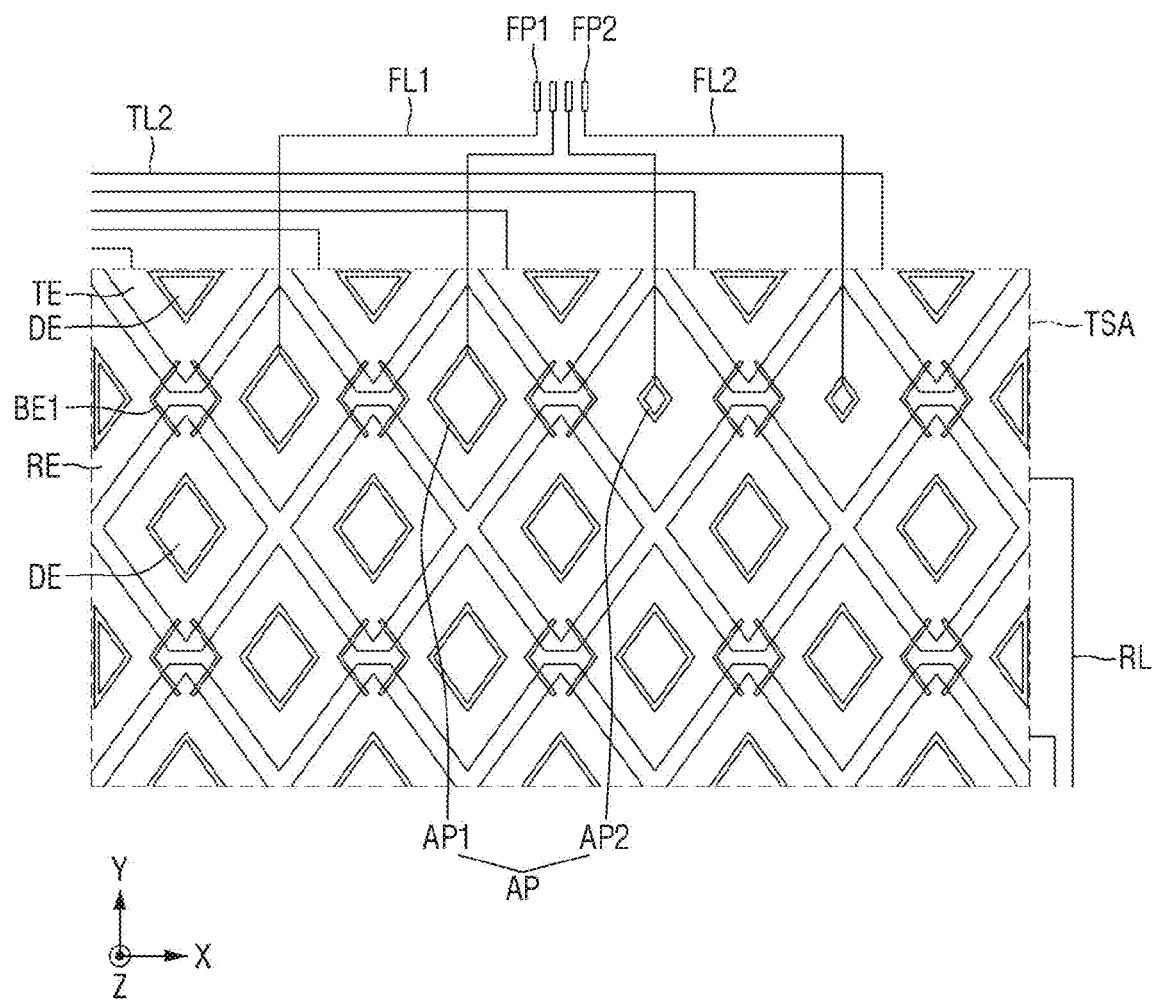
FIG. 32A is a layout view of a second exemplary embodiment of driving electrodes, sensing electrodes, dummy electrodes, and antenna patterns shown in FIG. 4.

FIG. 32A is a layout view of a second exemplary embodiment of driving electrodes, sensing electrodes, dummy electrodes, and antenna patterns shown in FIG. 4.

The exemplary embodiment of FIG. 32A is different from the exemplary embodiment of FIG. 5 in that antenna patterns AP include first antenna patterns AP1 and second antenna patterns AP2, and the area of the first antenna patterns AP1 is different from the area of the second antenna patterns AP2.

Referring to FIG. 32A, each of the first antenna patterns AP1 may be connected to a first antenna pad FP1 through a first antenna feed line FL1. Each of the second antenna patterns AP2 may be connected to a second antenna pad FP2 through a second antenna feed line FL2. The first antenna patterns AP1 and the second antenna patterns AP2 may be electrically separated from each other.

The area of the first antenna patterns AP1 may be different from the area of the second antenna patterns AP2. The area of the first antenna patterns AP1 and the area of the second antenna pattern AP2 may depend on the frequency of the radio frequency signals. For example, the higher the frequency of the radio frequency signals is, the smaller the area of the antenna pattern for transmitting and receiving radio frequency signals is. Therefore, as shown in FIG. 32A, if the area of the first antenna patterns AP1 is larger than the area of the second antenna patterns AP2, the frequency of the radio frequency signals transmitted and received by the first antenna pattern AP1 may be smaller than the frequency of the radio frequency signals transmitted and received by the second antenna pattern AP2. In order for the first antenna patterns AP1 and the second antenna patterns AP2 to transmit and receive radio frequency signals of ultra-high frequency (e.g., millimeter wave (mmWave)) for 5G mobile communications, the length of the first antenna pattern AP1 in the first direction (x-axis direction) and the length in the second direction (y-axis direction) and the length of the second antenna pattern AP2 in the first direction (x-axis direction) and the length in the second direction (y-axis direction) may range approximately from about 2.5 mm to about 4.5 mm.

Since the area of the first antenna patterns AP1 is larger than the area of the second antenna patterns AP2, the area of the sensing electrode RE surrounding the first antenna pattern AP1 may be smaller than the area of the sensing electrode RE surrounding the second antenna pattern AP2.

As shown in FIG. 32A, a first radio frequency signal of a first frequency may be transmitted and received via the first antenna patterns AP1 connected to the first antenna feed lines FL1, and a second radio frequency signal of a second frequency may be transmitted and received via the sensor antenna patterns AP2 connected to the second antenna feed lines FL2. That is, the display device 10 includes the plurality of antenna patterns AP1 and AP2 having different areas to thereby transmit and receive a plurality of radio frequency signals having different frequencies.

Figure 32B:
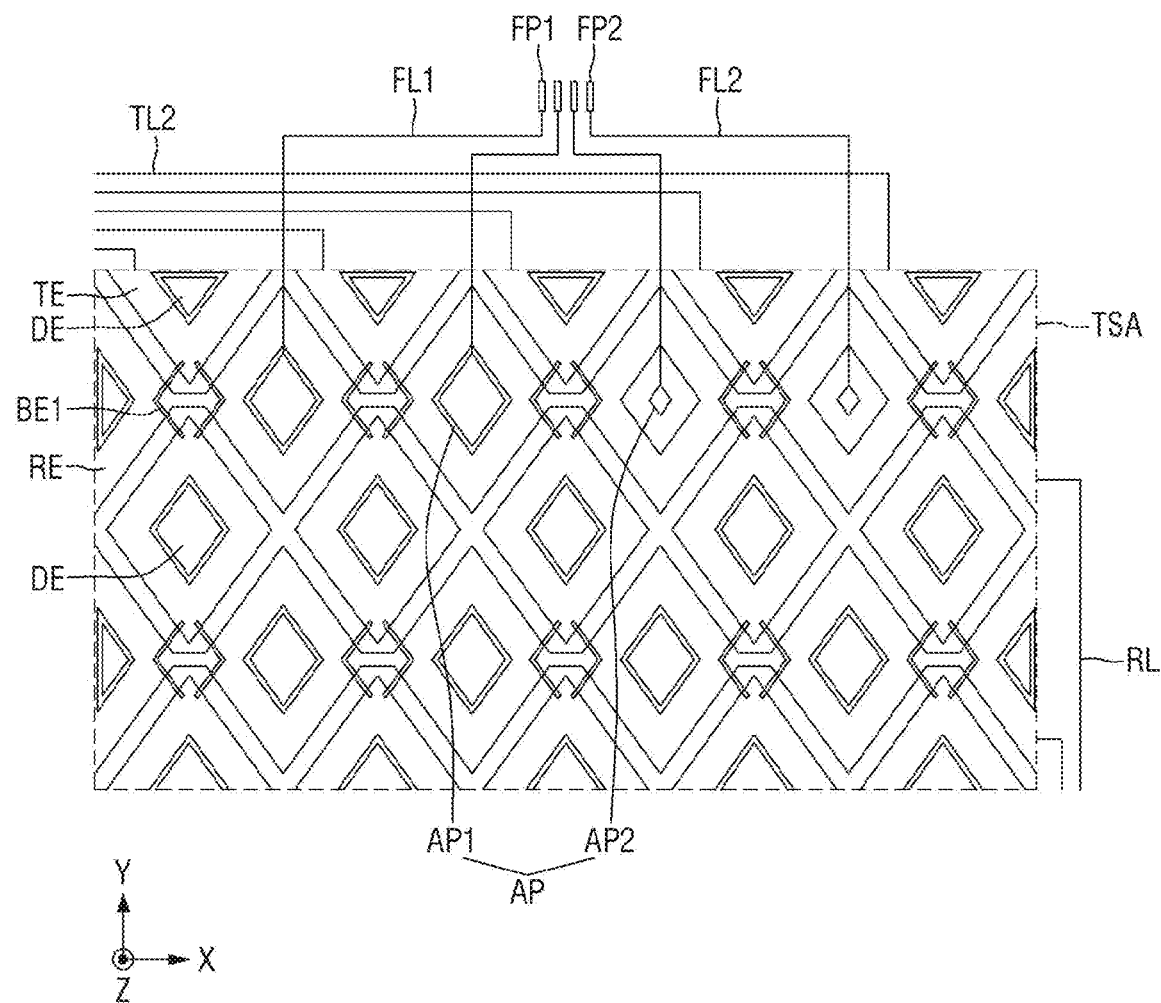
FIG. 32B is a layout view of a third exemplary embodiment of driving electrodes, sensing electrodes, dummy electrodes, and antenna patterns shown in FIG. 4.

FIG. 32B is a layout view of a third exemplary embodiment of driving electrodes, sensing electrodes, dummy electrodes, and antenna patterns shown in FIG. 4.

The exemplary embodiment of FIG. 32B is different from the exemplary embodiment of FIG. 32A in that the area of the sensing electrodes RE surrounding the first antenna patterns AP1 is substantially equal to the area of the sensing electrodes RE surrounding the second antenna pattern AP2 even though the area of the first antenna patterns AP1 is larger than the area of the second antenna patterns AP2; and, therefore, the redundant description will be omitted.

Figure 33:
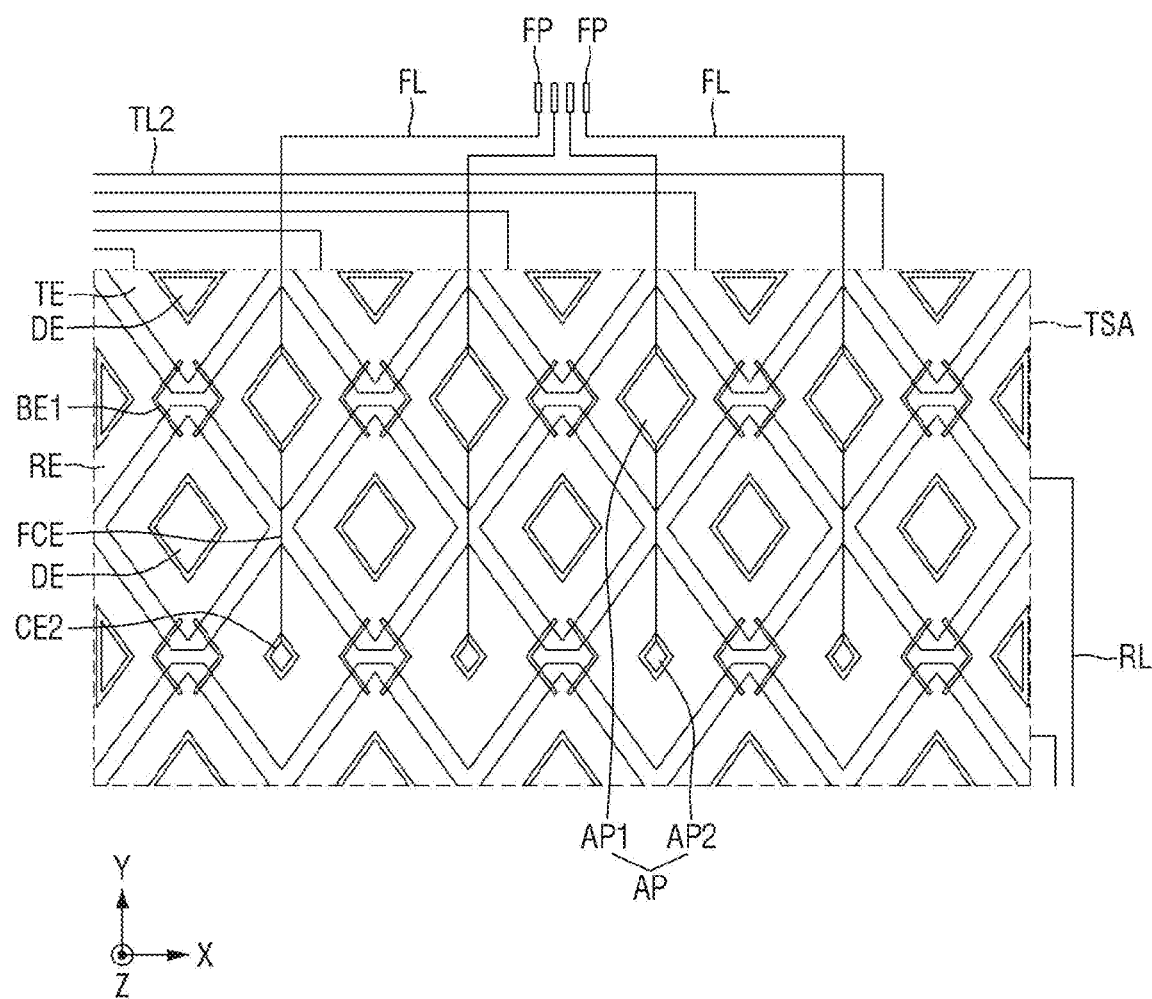
FIG. 33 is a layout view of a fourth exemplary embodiment of driving electrodes, sensing electrodes, dummy electrodes, and antenna patterns shown in FIG. 4.

FIG. 33 is a layout view of a fourth exemplary embodiment of driving electrodes, sensing electrodes, dummy electrodes, and antenna patterns shown in FIG. 4.

The exemplary embodiment of FIG. 33 is different from the exemplary embodiment of FIG. 5 in that antenna patterns AP include first antenna patterns AP1 and second antenna patterns AP2, and the area of the first antenna patterns AP1 is different from the area of the second antenna patterns AP2.

Referring to FIG. 33, each of the first antenna patterns AP1 may be connected to an antenna pad FP through an antenna feed line FL. The second antenna patterns AP2 may be connected to the first antenna patterns AP1 through the antenna connection electrodes FCE. One of the first antenna patterns AP1 may be electrically connected to one of the second antenna patterns AP2. That is, one of the first antenna patterns AP1 and one of the second antenna patterns AP2 may be connected to the antenna pads FP through the antenna feed lines FL.

The antenna connection electrodes FCE may extend in the second direction (y-axis direction). The antenna connection electrodes FCE may be electrically separated from the sensing electrodes RE. For example, the antenna connection electrodes FCE may be disposed on a different layer from the sensing electrodes RE surrounding the first antenna patterns AP1 and may be disposed on the same layer as the sensing electrodes RE surrounding the second antenna patterns AP2. In such case, the antenna connection electrodes FCE may overlap the sensing electrodes RE surrounding first antenna patterns AP1 in the third direction (z-axis direction) and may be spaced apart from the sensing electrodes RE surrounding the second antenna patterns AP2.

Alternatively, the antenna connection electrodes FCE may be disposed on the same layer as the sensing electrodes RE surrounding the first antenna patterns AP1 and may be disposed on a different layer from the sensing electrodes RE surrounding the second antenna patterns AP2. In such case, the antenna connection electrodes FCE may be spaced apart from the sensing electrodes RE surrounding first antenna patterns AP1 and may overlap the sensing electrodes RE surrounding the second antenna patterns AP2 in the third direction (z-axis direction).

Alternatively, the antenna connection electrodes FCE may be disposed on the same layer as the sensing electrodes RE surrounding the first antenna patterns AP1 and the sensing electrodes RE surrounding the second antenna patterns AP2. In such case, the antenna connection electrodes FCE may be spaced apart from the sensing electrodes RE surrounding the first antenna patterns AP1 and the sensing electrodes RE surrounding the second antenna patterns AP2.

Alternatively, the antenna connection electrodes FCE may be disposed on a different layer from the sensing electrodes RE surrounding the first antenna patterns AP1 and the sensing electrodes RE surrounding the second antenna patterns AP2. In such case, the antenna connection electrodes FCE may overlap the sensing electrodes RE surrounding first antenna patterns AP1 and the sensing electrodes RE surrounding the second antenna patterns AP2 in the third direction (z-axis direction).

The area of the first antenna patterns AP1 may be different from the area of the second antenna patterns AP2. The area of the first antenna patterns AP1 and the area of the second antenna pattern AP2 may depend on the frequency of the radio frequency signals. For example, the higher the frequency of the radio frequency signals is, the smaller the area of the antenna pattern for transmitting and receiving radio frequency signals is. Therefore, as shown in FIG. 32, if the area of the first antenna patterns AP1 is larger than the area of the second antenna patterns AP2, the frequency of the radio frequency signals transmitted and received by the first antenna pattern AP1 may be smaller than the frequency of the radio frequency signals transmitted and received by the second antenna pattern AP2.

In order for the first antenna patterns AP1 and the second antenna patterns AP2 to transmit and receive radio frequency signals of ultra-high frequency (e.g., millimeter wave (mmWave)) for 5G mobile communications, the length of the first antenna pattern AP1 in the first direction (x-axis direction) and the length in the second direction (y-axis direction) and the length of the second antenna pattern AP2 in the first direction (x-axis direction) and the length in the second direction (y-axis direction) may range approximately from about 2.5 mm to about 4.5 mm.

As shown in FIG. 33, as the first antenna patterns AP1 are connected to the second antenna patterns AP2 through the connection electrodes FCE and the first antenna patterns AP1 are connected to the antenna pads FP through the antenna feed lines FL, a first radio frequency signal of a first frequency transmitted and received by the first antenna patterns AP1 as well as a second radio frequency signal of a second frequency transmitted and received by the second antenna patterns AP2 can be transmitted to the antenna pads FP through the antenna feed lines FL. That is, the display device 10 includes the plurality of antenna patterns AP1 and AP2 having different areas to thereby transmit and receive a plurality of radio frequency signals having different frequencies FIG. 34 is a layout view of a fifth exemplary embodiment of driving electrodes, sensing electrodes, dummy electrodes, and antenna patterns shown in FIG. 4.

Figure 34:
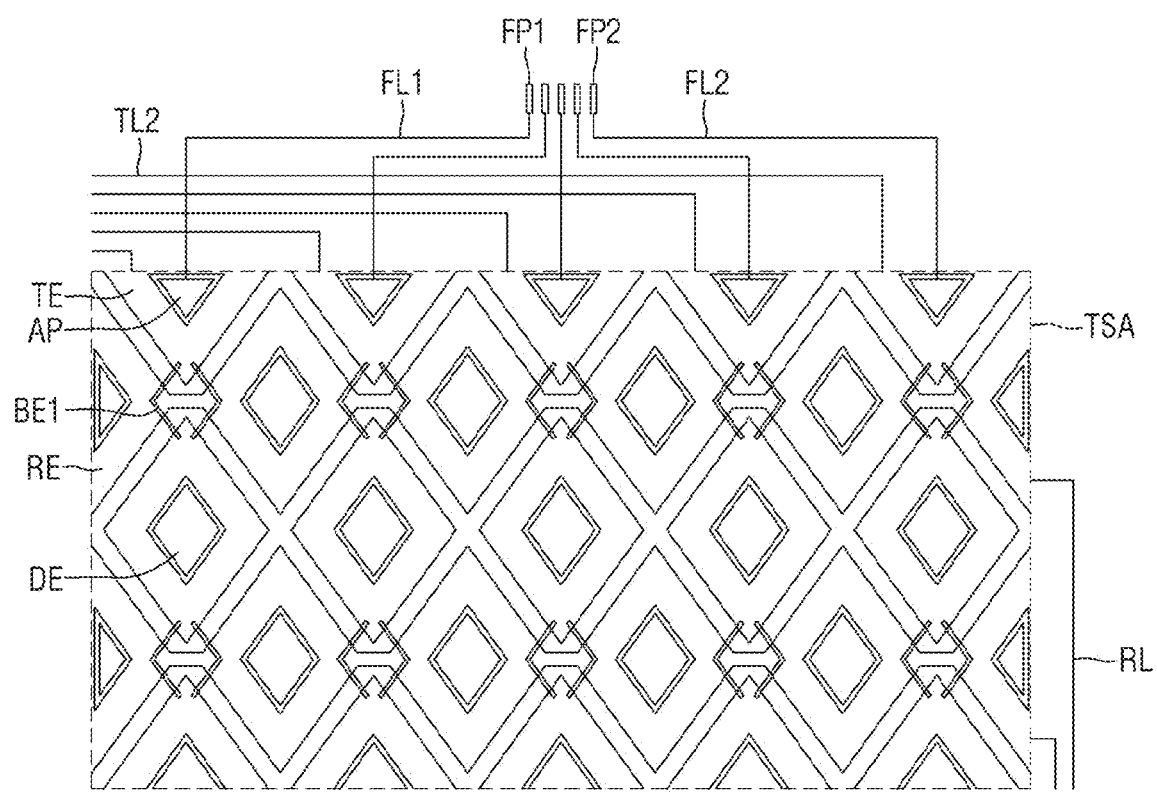
FIG. 34 is a layout view of a fifth exemplary embodiment of driving electrodes, sensing electrodes, dummy electrodes, and antenna patterns shown in FIG. 4.

The exemplary embodiment of FIG. 34 is different from the exemplary embodiment of FIG. 5 in that each of the antenna patterns AP is surrounded by a driving electrode TE instead of a sensing electrode RE.

Referring to FIG. 34, each of the antenna patterns AP may be electrically separated from the respective driving electrode TE. Each of the antenna patterns AP may be spaced apart from the respective driving electrode TE. The antenna patterns AP may be disposed adjacent to one side of the touch sensor area TSA. For example, as shown in FIG. 34, antenna patterns AP may be disposed adjacent to the upper side of the touch sensor area TSA.

Each of the antenna patterns AP may work as an independent antenna by the antenna driver circuit 340. Alternatively, the antenna patterns AP may serve as one array antenna by the antenna driver circuit 340.

In order for the antenna patterns AP to transmit and receive radio frequency signals of ultra-high frequency (e.g., millimeter wave (mmWave)) for 5G mobile communications, the length of the antenna pattern AP in the first direction (x-axis direction) and the length in the second direction (y-axis direction) may range approximately from 2.5 mm to 4.5 mm. The length of the antenna patterns AP in the first direction (x-axis direction) may be larger than the length in the second direction (y-axis direction).

Although each of the antenna patterns AP has a triangular shape when viewed from the top in the example shown in FIG. 34, the embodiments are not limited thereto. For example, each of the antenna patterns AP may have other quadrangular shape than a diamond shape, other polygonal shape than a quadrangular shape, a circular shape or an elliptical shape when viewed from the top.

Figure 35:
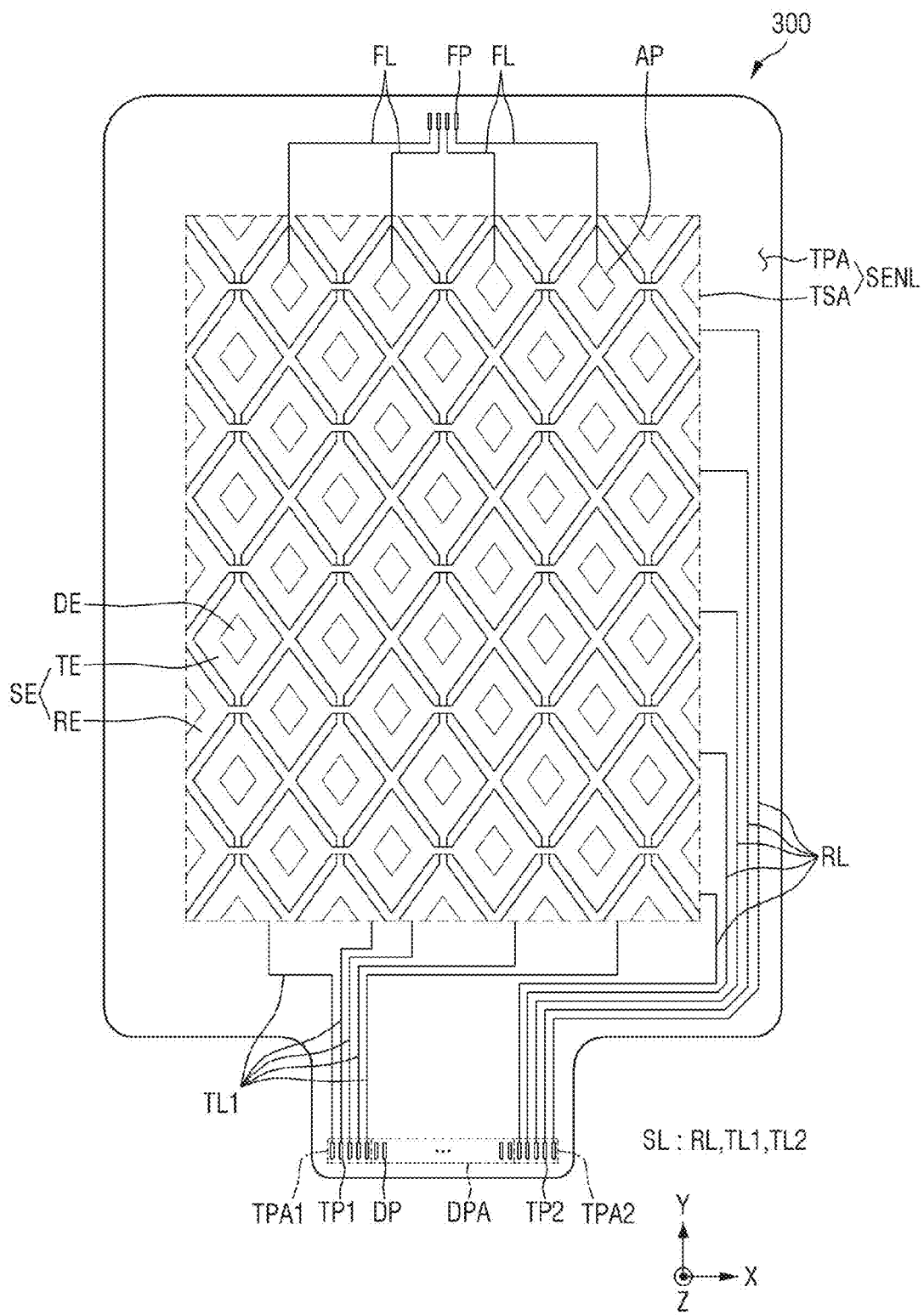
FIG. 35 is a layout view of a second exemplary embodiment of a sensor electrode layer of the display device of FIG. 1.

FIG. 35 is a layout view of a second exemplary embodiment of a sensor electrode layer of the display device of FIG. 1.

The exemplary embodiment of FIG. 35 is different from the exemplary embodiment of FIG. 4 in that second driving lines TL2 are eliminated. When the second driving lines TL2 are eliminated as in the example shown in FIG. 35, the antenna feed lines FL do not cross the second driving lines TL2. Accordingly, it is not necessary design the antenna feed lines FL so that they extend around the second driving lines TL2.

Figure 36:
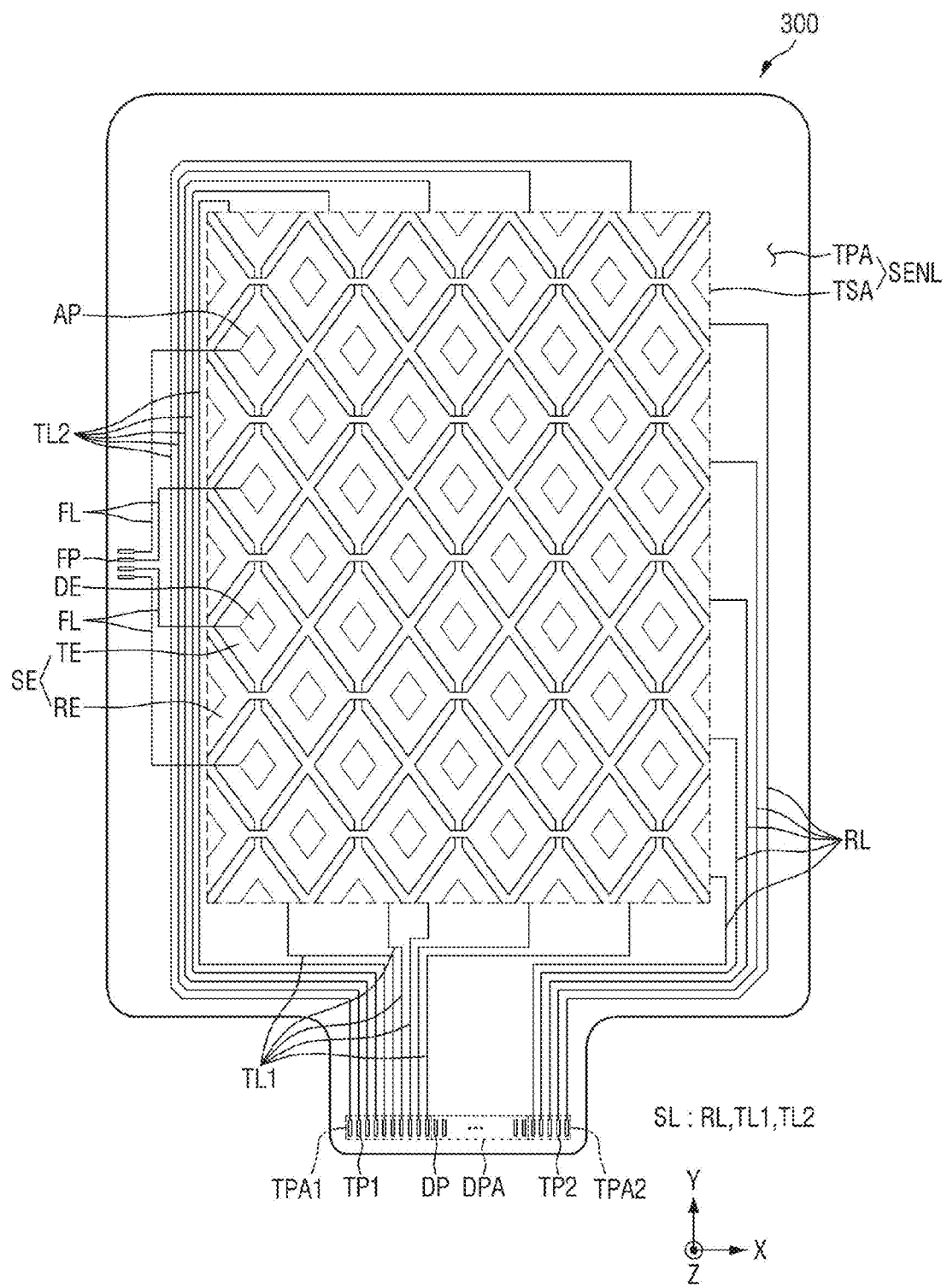
FIG. 36 is a layout view of a third exemplary embodiment of a sensor electrode layer of the display device of FIG. 1.

FIG. 36 is a layout view of a third exemplary embodiment of a sensor electrode layer of the display device of FIG. 1.

The exemplary embodiment of FIG. 36 is different from the exemplary embodiment of FIG. 4 in that antenna patterns AP are disposed adjacent to the left side of a touch sensor area TSA.

Referring to FIG. 36, the antenna pads FP may be disposed in a touch peripheral area TPA adjacent to the left side of the touch sensor area TSA. An antenna circuit board 350 may be disposed on the antenna pads FP. The antenna pads FP may be electrically connected to the antenna circuit board 350 using a low-resistance, high-reliability material such as an anisotropic conductive film and an SAP.

The antenna patterns AP may be connected to the antenna pads FP through antenna feed lines FL, respectively. The antenna feed lines FL may cross the second driving lines TL.

As shown in FIG. 36, the antenna patterns AP and the antenna pads FP are disposed adjacent to the left side of the touch sensor area TSA, and thus the distance from the antenna patterns AP to the antenna driver circuit 340 can be reduced. As a result, it is possible to reduce the loss of radio frequency signals.

Figure 37:
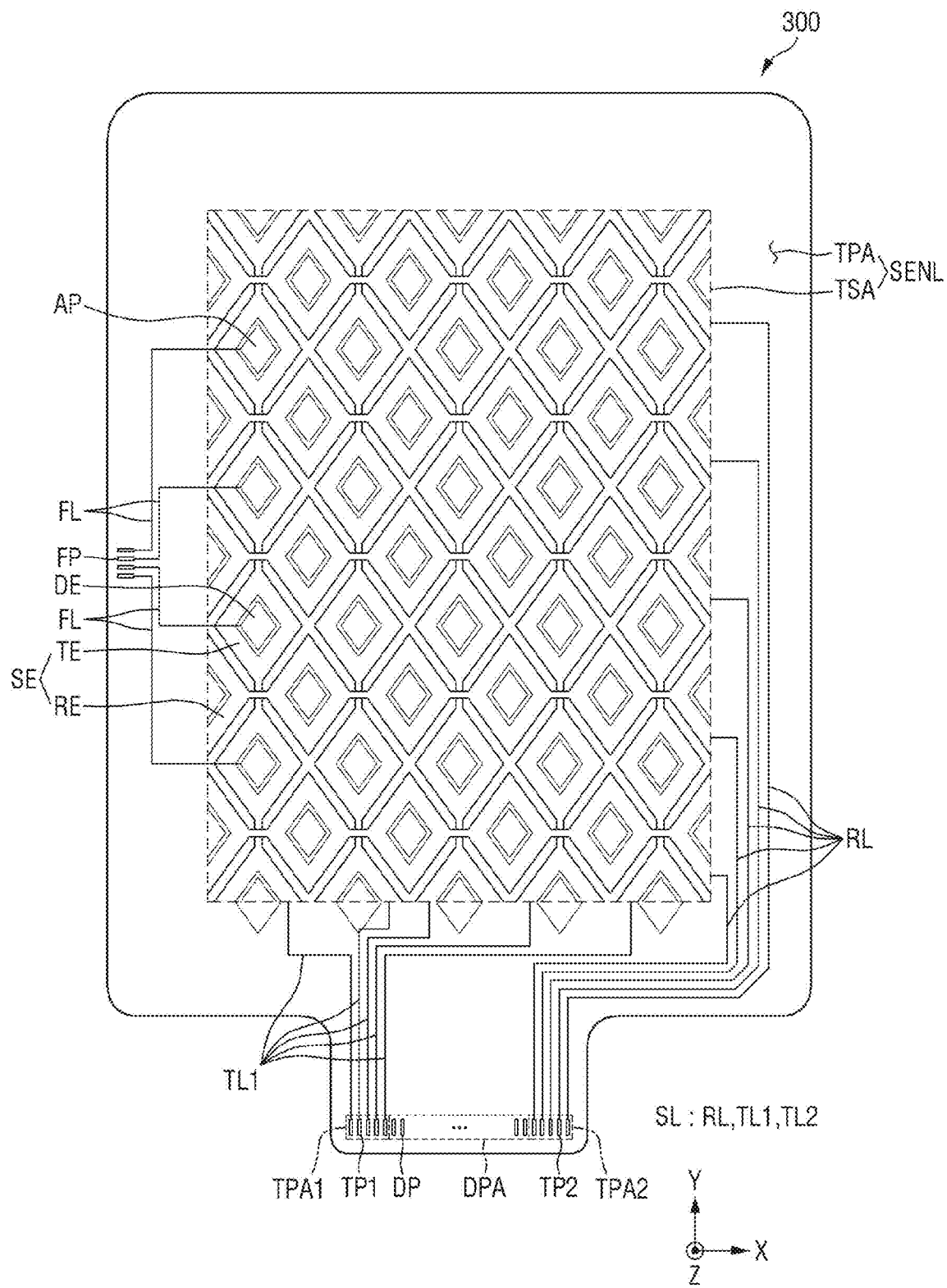
FIG. 37 is a layout view of a fourth exemplary embodiment of a sensor electrode layer of the display device of FIG. 1.

FIG. 37 is a layout view of a fourth exemplary embodiment of a sensor electrode layer of the display device of FIG. 1.

The exemplary embodiment of FIG. 37 is different from the exemplary embodiment of FIG. 36 in that second driving lines TL2 are eliminated. When the second driving lines TL2 are eliminated as in the example shown in FIG. 37, the antenna feed lines FL do not cross the second driving lines TL2. Accordingly, it is not necessary design the antenna feed lines FL so that they do not meet or overlap the second driving lines TL2.

Figure 38:
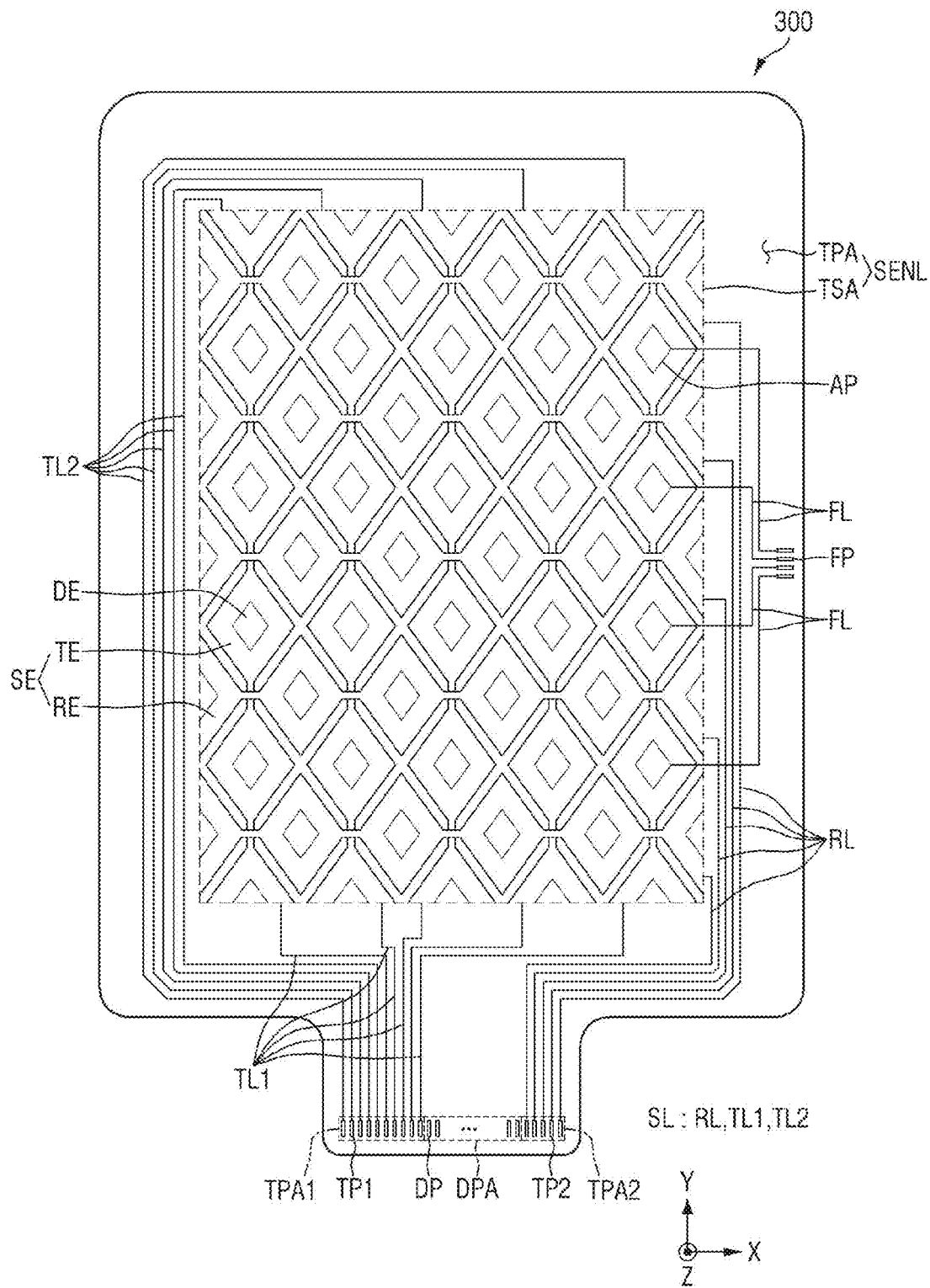
FIG. 38 is a layout view of a fifth exemplary embodiment of a sensor electrode layer of the display device of FIG. 1.

FIG. 38 is a layout view of a fifth exemplary embodiment of a sensor electrode layer of a display device of FIG. 1.

The exemplary embodiment of FIG. 38 is different from the exemplary embodiment of FIG. 4 in that antenna patterns AP are disposed adjacent to the right side of a touch sensor area TSA.

Referring to FIG. 38, the antenna pads FP may be disposed in a touch peripheral area TPA adjacent to the right side of the touch sensor area TSA. An antenna circuit board 350 may be disposed on the antenna pads FP. The antenna pads FP may be electrically connected to the antenna circuit board 350 using a low-resistance, high-reliability material such as an anisotropic conductive film and an SAP.

The antenna patterns AP may be connected to the antenna pads FP through antenna feed lines FL, respectively. The antenna feed lines FL may cross at least one sensing lines RL.

As shown in FIG. 38, the antenna patterns AP and the antenna pads FP are disposed adjacent to the right side of the touch sensor area TSA, and thus the distance from the antenna patterns AP to the antenna driver circuit 340 can be reduced. As a result, it is possible to reduce the loss of radio frequency signals.

Figure 39:
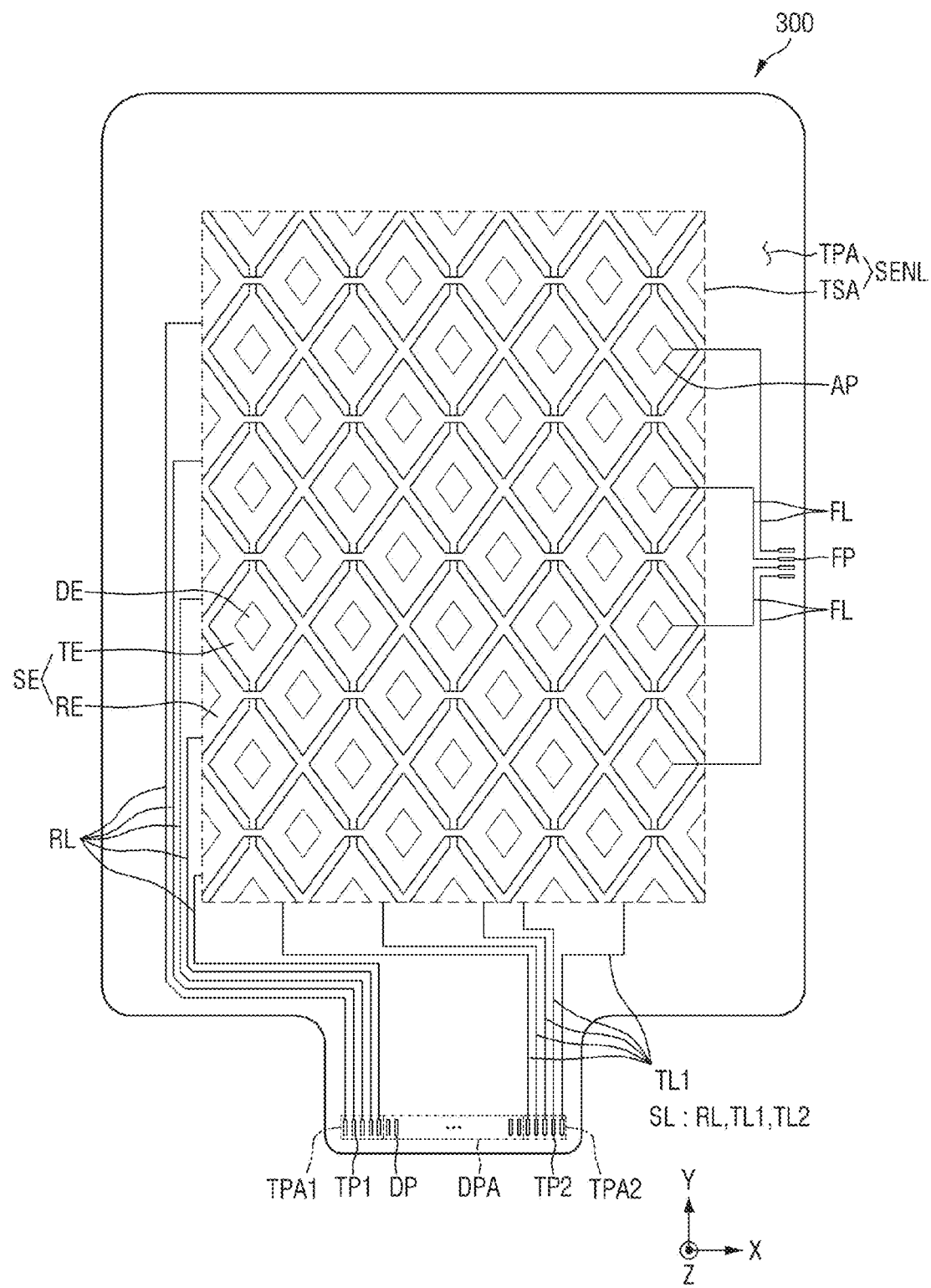
FIG. 39 is a layout view of a sixth exemplary embodiment of a sensor electrode layer of the display device of FIG. 1.

FIG. 39 is a layout view of a sixth exemplary embodiment of a sensor electrode layer of the display device of FIG. 1.

The exemplary embodiment of FIG. 39 is different from the exemplary embodiment of FIG. 38 in that second driving lines TL2 are eliminated, and sensing lines RL are disposed on the left side of a touch sensor area TSA. As shown in FIG. 39, when the second driving lines TL2 are eliminated and the sensing lines RL are disposed on the left side of the touch sensor area TSA, the antenna feed lines FL do not cross at least one sensing line RL. Accordingly, it is not necessary design the antenna feed lines FL so that they do not meet or overlap the sensing lines RL.

Figure 40:
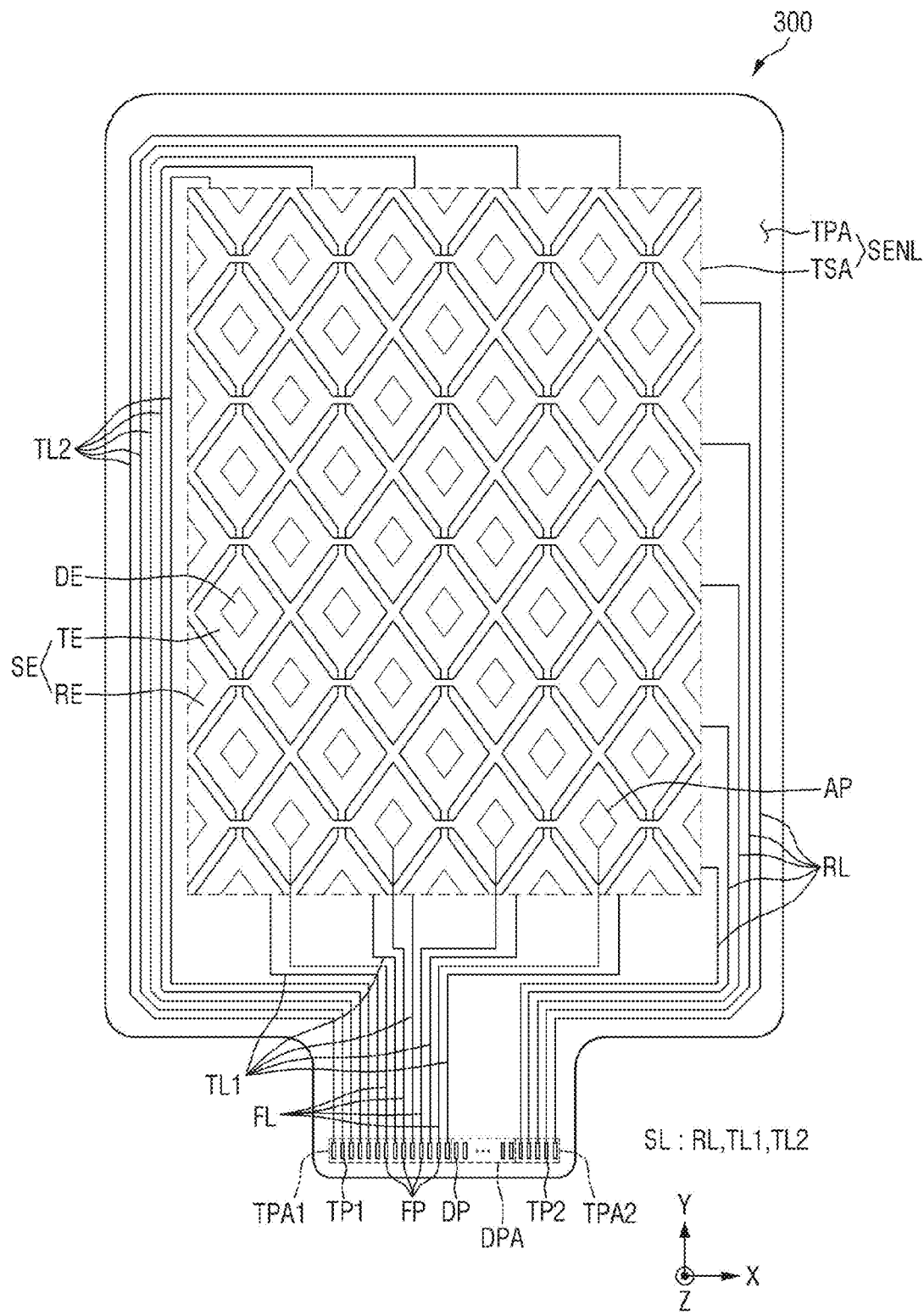
FIG. 40 is a layout view of a seventh exemplary embodiment of a sensor electrode layer of the display device of FIG. 1.

FIG. 40 is a layout view of a seventh exemplary embodiment of a sensor electrode layer of a display device of FIG. 1.

The exemplary embodiment of FIG. 40 is different from the exemplary embodiment of FIG. 4 in that antenna patterns AP are disposed adjacent to the lower side of a touch sensor area TSA.

Referring to FIG. 40, the antenna pads FP may be disposed in a first sensor pad area TPA1 disposed on the lower side of the display panel 300 along with the first sensor pads TP1. The antenna pads FP may be disposed between two first sensor pads TP1 adjacent to each other.

A display circuit board 310 may be disposed on the antenna pads FP and the first sensor pads TP1. The antenna pads FP and the first sensor pads TP1 may be electrically connected to the display circuit board 310 using a low-resistance, high-reliability material such as an anisotropic conductive film and an SAP. In such case, the antenna circuit board 350 may be eliminated, and the antenna driver circuit 340 may be disposed on the display circuit board 310.

The antenna patterns AP may be connected to the antenna pads FP through antenna feed lines FL, respectively. The antenna feed lines FL may be disposed between two adjacent first driving lines TL1.

As shown in FIG. 40, the antenna patterns AP and the antenna pads FP are disposed adjacent to the lower side of the touch sensor area TSA, and thus the distance from the antenna patterns AP to the antenna driver circuit 340 can be reduced. As a result, it is possible to reduce the loss of radio frequency signals.

Figure 41:
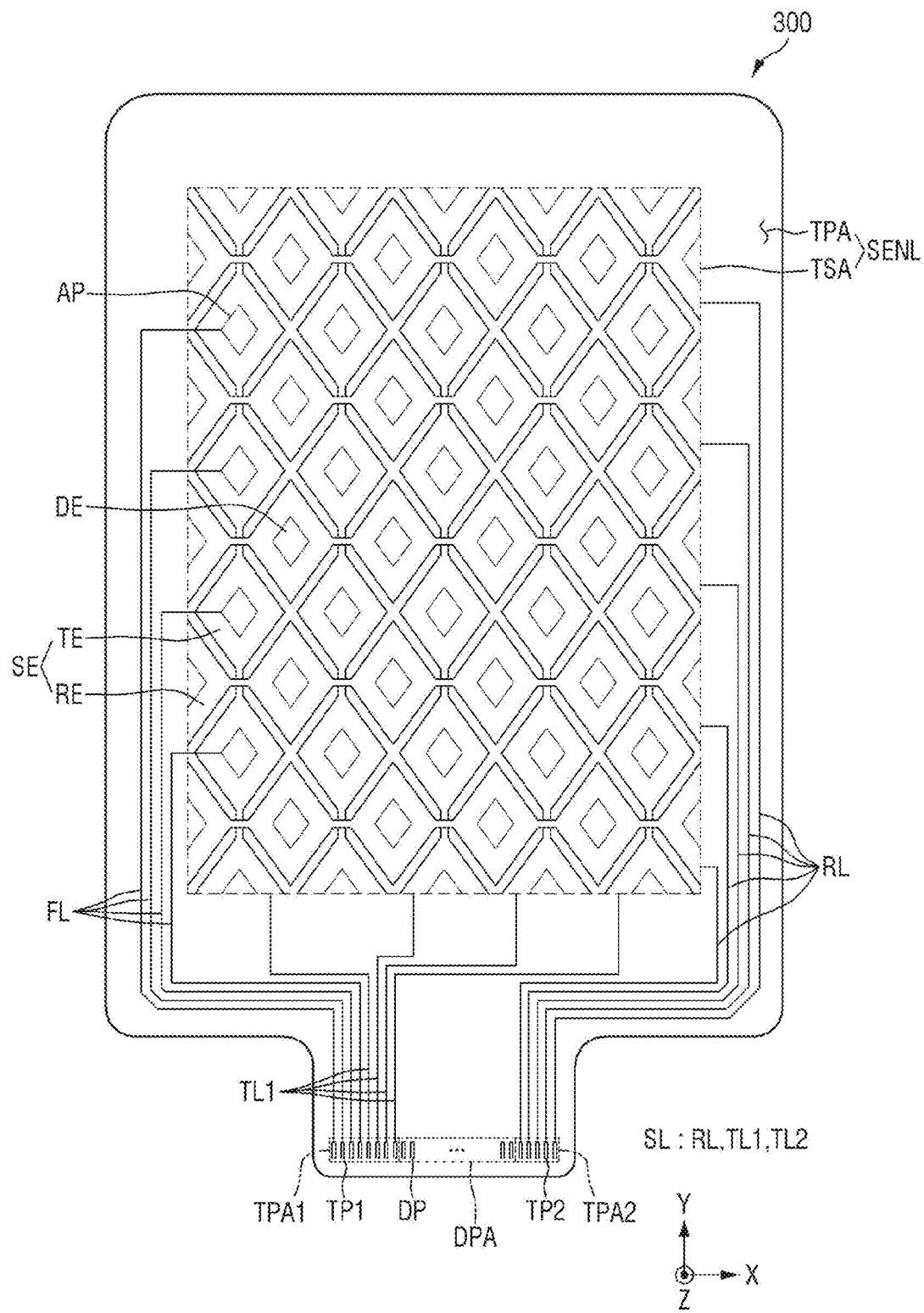
FIG. 41 is a layout view of an eighth exemplary embodiment of a sensor electrode layer of a display device of FIG. 1.

FIG. 41 is a layout view of an eighth exemplary embodiment of a sensor electrode layer of a display device of FIG. 1.

The exemplary embodiment of FIG. 41 is different from the exemplary embodiment of FIG. 40 in that second driving lines TL2 are eliminated, and antenna patterns AP are disposed adjacent to the left side of a touch sensor area TSA. As shown in FIG. 41, even though the antenna patterns AP are disposed adjacent to the left side of the touch sensor area TSA, the second driving lines TL2 are eliminated, and thus it is easy to design the antenna feed lines FL that connect the antenna patterns AP with the antenna pads FP.

Figure 42:
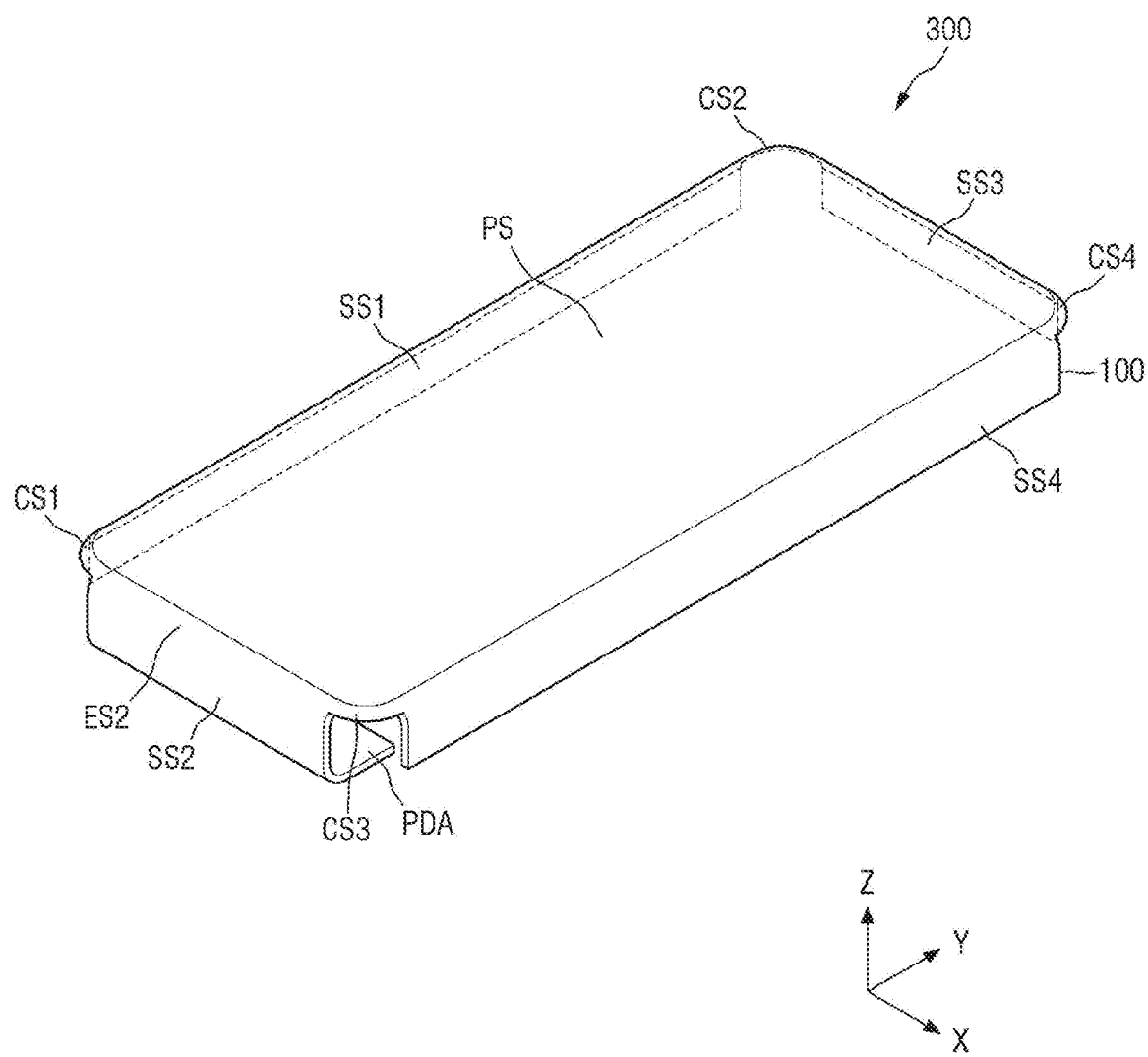
FIG. 42 is a perspective view of another exemplary embodiment of a display device constructed according to the principles of the invention.

FIG. 42 is a perspective view of another exemplary embodiment of a display device constructed according to the principles of the invention. The display device 10 is configured to display images on the four side surfaces as well as the front surface in the exemplary embodiment shown in FIG. 42.

Referring to FIG. 42, a display panel 300 may include a substrate having a front surface PS, a first side surface SS1, a second side surface SS2, a third side surface SS3, a fourth side surface SS4, a first corner CS1, a second corner CS2, a third corner CS3, and a fourth corner CS4.

The front surface PS of the display panel 300 may have, but is not limited to, a generally quadrangular shape having shorter sides in the first direction (x-axis direction) and longer sides in the second direction (y-axis direction) when viewed from the top. The front surface FS may have other shapes, such as other polygonal shapes, a circular shape or an oval shape when viewed from the top. The corners where the shorter sides and the longer side meet on the front surface PS may be bent with a certain curvature. Although the front surface PS is shown substantially flat in FIG. 42, the embodiments are not limited thereto. The front surface PS may include a curved surface.

The first side surface SS1 of the display panel 300 may extend from a first side of the front surface PS. For example, as shown in FIG. 42, the first side surface SS1 may extend from the left side of the front surface PS. The first side surface SS1 may be bent over a first bending line. The first bending line BL1 may be the boundary between the front surface PS and the first side surface SS1. The first side surface SS1 may be the left side surface of the display panel 300.

The second side surface SS2 of the display panel 300 may extend from a second side of the front surface PS. For example, as shown in FIG. 42, the second side surface SS2 may extend from the lower side of the front surface PS. The second side surface SS2 may be bent over a second bending line. The second bending line may be the boundary between the front surface PS and the second side surface SS2. The second side surface SS2 may be the lower side surface of the display panel 300.

The third side surface SS3 of the display panel 300 may extend from a third side of the front surface PS. For example, as shown in FIG. 42, the third side surface SS3 may extend from the upper side of the front surface PS. The third side surface SS3 may be bent over a third bending line. The third bending line may be the boundary between the front surface PS and the third side surface SS3. The third side surface SS3 may be the upper side surface of the display panel 300.

The fourth side surface SS4 of the display panel 300 may extend from the fourth side of the front surface PS. For example, as shown in FIG. 42, the fourth side surface SS4 may extend from the right side of the front surface PS. The fourth side surface SS4 may be bent over a fourth bending line. The fourth bending line may be the boundary between the front surface PS and the fourth side surface SS4. The fourth side surface SS4 may be the right-side surface of the display panel 300.

The first corner CS1 of the display panel 300 may extend from the first corner where the first side and the second side of the front surface PS meet. The first corner CS1 may be located between the first side surface SS1 and the second side surface SS2.

The second corner CS2 of the display panel 300 may extend from the second corner where the first side and the third side of the front surface PS meet. The second corner CS2 may be located between the first side surface SS1 and the third side surface SS3.

The third corner CS3 of the display panel 300 may extend from the third corner where the second side and the fourth side of the front surface PS meet. The third corner CS3 may be located between the second side surface SS2 and the fourth side surface SS4.

The fourth corner CS4 of the display panel 300 may extend from the fourth corner where the third side and the fourth side of the front surface PS meet. The fourth corner CS4 may be located between the third side surface SS3 and the fourth side surface SS4.

A pad area PDA of the display panel 300 may extend from one side of the second side surface SS2. For example, the pad area PDA may extend from the lower side of the second side surface SS2. The pad area PDA may be bent over a fifth bending line BL5. The fifth bending line BL5 may be the boundary between the second side portion SS2 and the pad area PDA. The pad area PDA of the display panel 300 may be bent over the fifth bending line BL5 to face the front surface PS of the display panel 300.

The front surface PS, the first side surface SS1, the second side surface SS2, the third side surface SS3 and the fourth side surface SS4 of the display panel 300 may be display areas where images are displayed. For example, the front surface PS of the display panel 300 may be a main display area for displaying a main image, while the first to fourth side surfaces SS1, SS2, SS3 and SS4 may be subsidiary display areas for displaying subsidiary images.

Figure 43:
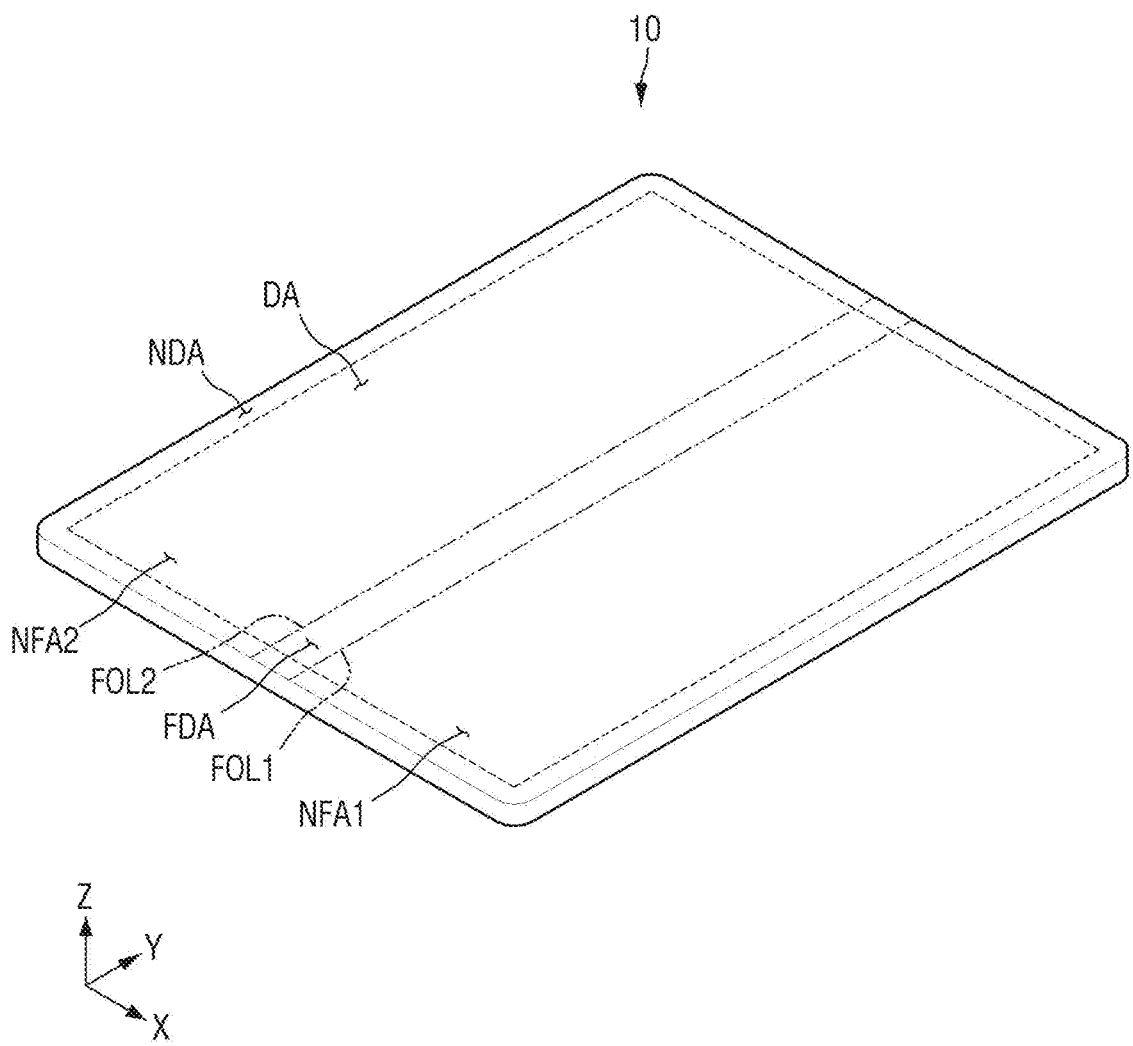
FIGS. 43 and 44 are perspective views of still other embodiments of display devices constructed according to the principles of the invention.
Figure 44:
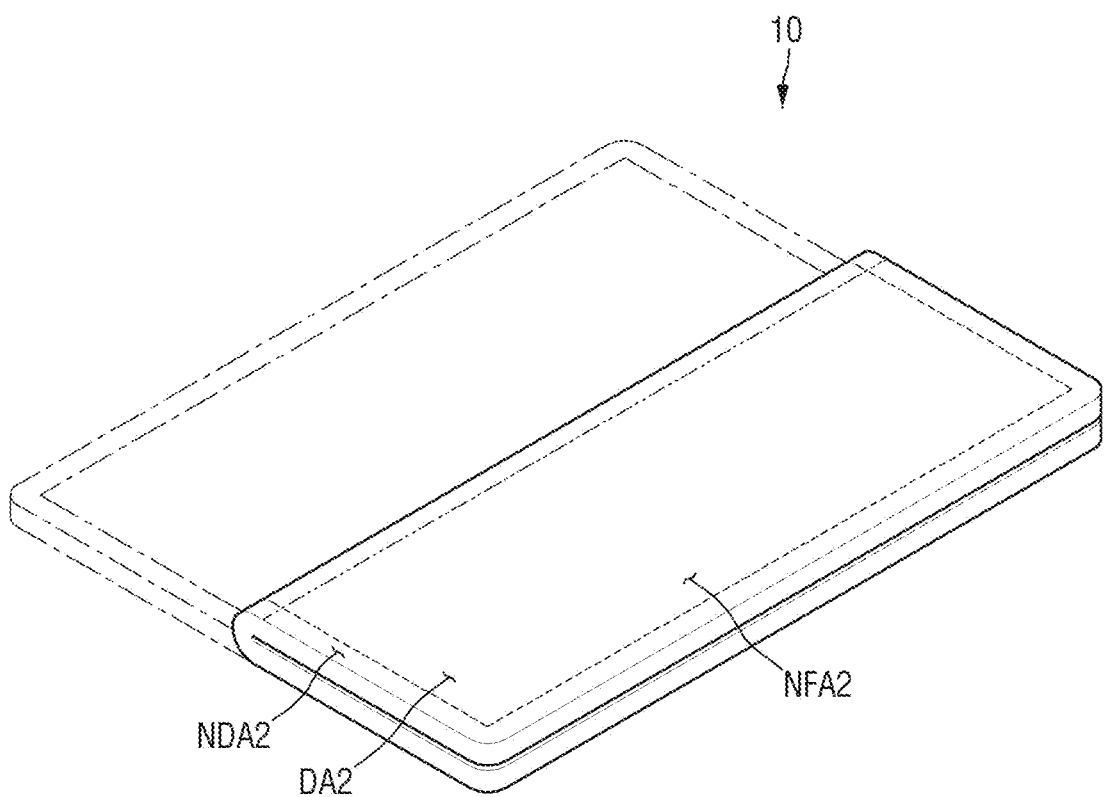

FIGS. 43 and 44 are perspective views of still other embodiments of display devices constructed according to the principles of the invention. In the exemplary embodiment shown in FIGS. 43 and 44, a display device 10 is a foldable display device that is folded in the first direction (x-axis direction).

Referring to FIGS. 43 and 44, the display device 10 can stay folded and unfolded. The display device 10 may be folded inwardly (in-folding manner) such that the front surface is located inside. When the display device 10 is bent or folded in the in-folding manner, a part of the front surface of the display device 10 may face the other part of the front surface. Alternatively, the display device 10 may be folded outwardly (out-folding manner) such that the front surface is located outside. When the display device 10 is bent or folded in the out-folding manner, a part of the rear surface of the display device 10 may face the other part of the rear surface.

The first non-folding area NFA1 may be disposed on one side, for example, the right side of the folding area FDA. The second non-folding area NFA2 may be disposed on the other side, for example, the left side of the folding area FDA.

The first folding line FOL1 and the second folding line FOL2 may extend in the second direction (y-axis direction), and the display device 10 may be folded in the first direction (x-axis direction). As a result, the length of the display device 10 in the first direction (the x-axis direction) may be reduced to about half, so that a user can carry the display device 10 easily.

The direction in which the first folding line FOL1 and the second folding line FOL2 extend is not limited to the second direction (y-axis direction). For example, the first folding line FOL1 and the second folding line FOL2 may extend in the first direction (x-axis direction), and the display device 10 may be folded in the second direction (y-axis direction). In such case, the length of the display device 10 in the second direction (y-axis direction) may be reduced by about half. Alternatively, the first folding line FOL1 and the second folding line FOL2 may extend in a diagonal direction of the display device 10 between the first direction (x-axis direction) and the second direction (y-axis direction). In such case, the display device 10 may be folded in a triangle shape.

When the first folding line FOL1 and the second folding line FOL2 extend in the second direction (y-axis direction), the length of the folding area FDA in the first direction (x-axis direction) may be smaller than the length in the second direction (y-axis direction). In addition, the length of the first non-folding area NFA1 in the first direction (x-axis direction) may be larger than the length of the folding area FDA in the first direction (x-axis direction). The length of the second non-folding area NFA2 in the first direction (x-axis direction) may be larger than the length of the folding area FDA in the first direction (x-axis direction).

The display device 10 may include a first display area DA1, a second non-display area DA2, a first non-display area NDA1, and a second non-display area NDA2. The first display area DA1 and the first non-display area NDA1 may be disposed on the upper surface of the display device 10. The first display area DA1 and the first non-display area NDA1 may overlap the folding area FDA, the first non-folding area NFA1, and the second non-folding area NFA2. Therefore, when the display device 10 is unfolded, images may be displayed on upper surfaces of the folding area FDA, the first non-folding area NFA1 and the second non-folding area NFA2 of the display device 10.

The second display area DA2 and the second non-display area NDA2 may be disposed on the lower surface of the display device 10. The second display area DA2 and the second non-display area NDA2 may overlap the second non-display area NFA2. Therefore, when the display device 10 is folded, images may be displayed on the lower surface of the second non-folding area NFA2 of the display device 10.

Figure 45:
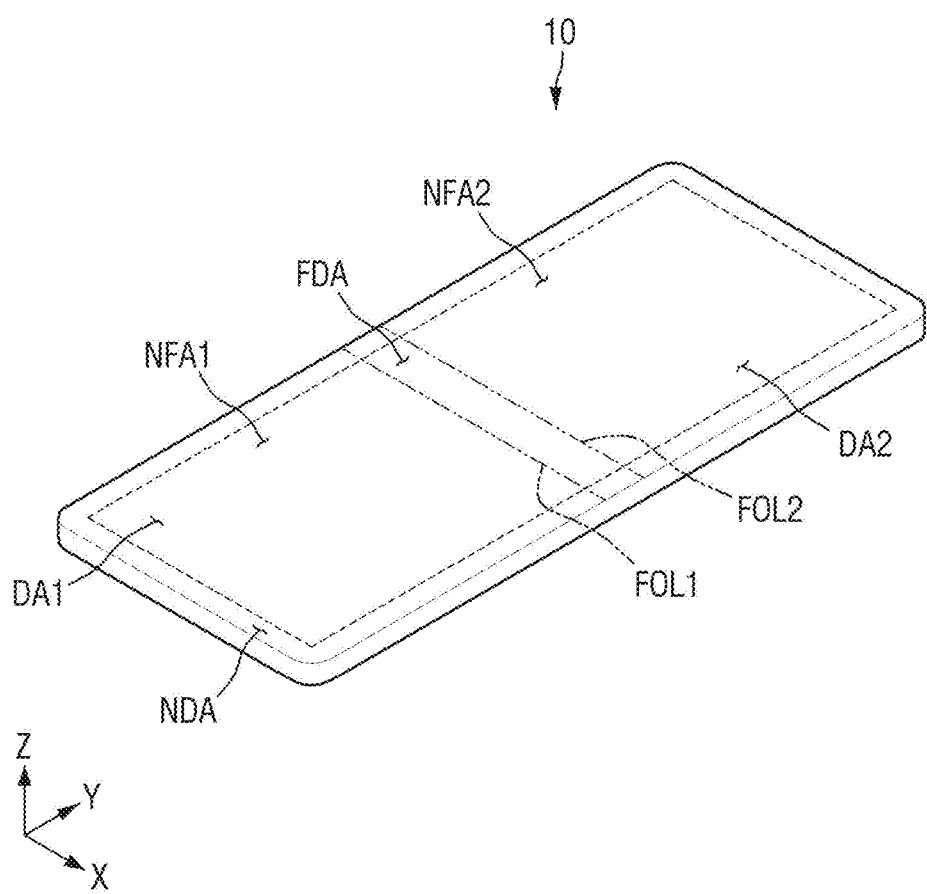
FIGS. 45 and 46 are perspective views of yet other embodiments of display devices constructed according to the principles of the invention.
Figure 46:
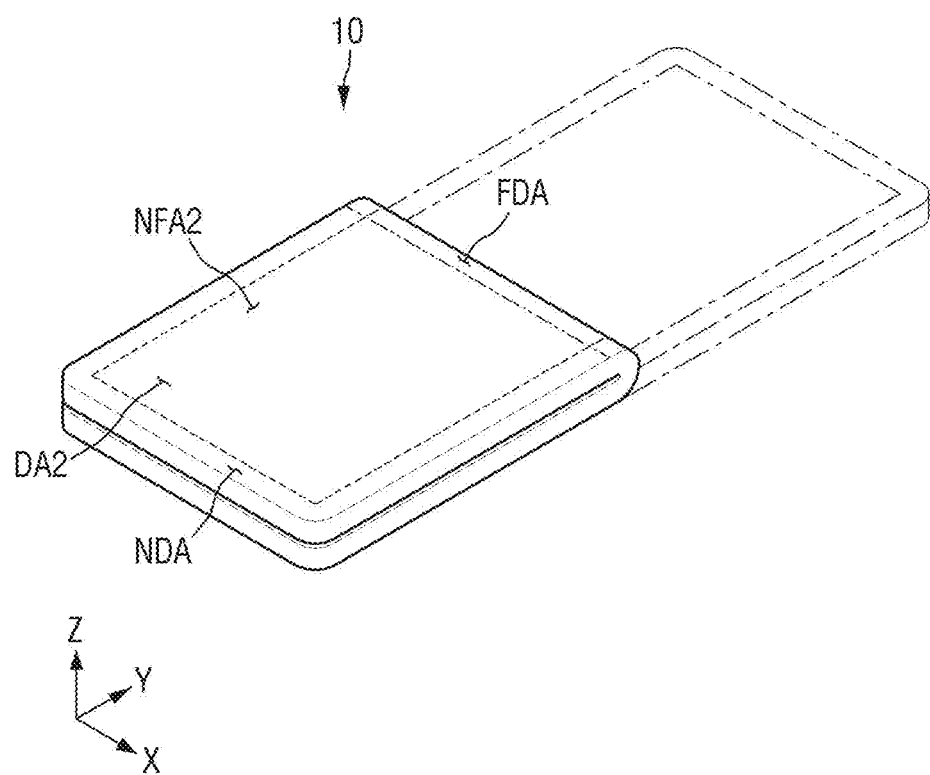

FIGS. 45 and 46 are perspective views of yet other embodiments of display devices constructed according to the principles of the invention. In the exemplary embodiment shown in FIGS. 45 and 46, a display device 10 is a foldable display device that is folded in the second direction (y-axis direction).

Referring to FIGS. 45 and 46, the display device 10 can stay folded and unfolded. The display device 10 may be folded inwardly (in-folding manner) such that the front surface is located inside. When the display device 10 is bent or folded in the in-folding manner, a part of the front surface of the display device 10 may face the other part of the front surface. Alternatively, the display device 10 may be folded outwardly (out-folding manner) such that the front surface is located outside. When the display device 10 is bent or folded in the out-folding manner, a part of the rear surface of the display device 10 may face the other part of the rear surface.

The display device 10 may include a folding area FDA, a first non-folding area NFA1, and a second non-folding area NFA2. The display device 10 can be folded at the folding area FDA, while it cannot be folded at the first non-folding area NFA1 and the second non-folding area NFA2.

The first non-folding area NFA1 may be disposed on one side, for example, the lower side of the folding area FDA. The second non-folding area NFA2 may be disposed on the other side, for example, the upper side of the folding area FDA. The folding area FDA may be an area bent with a predetermined curvature over the first folding line FOL1 and the second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

The first folding line FOL1 and the second folding line FOL2 may extend in the first direction (x-axis direction) as shown in FIGS. 45 and 46, and the display device 10 may be folded in the second direction (y-axis direction). As a result, the length of the display device 10 in the second direction (the y-axis direction) may be reduced by about half, so that the display device 10 is easy to carry.

The direction in which the first folding line FOL1 and the second folding line FOL2 extend is not limited to the first direction (x-axis direction). For example, the first folding line FOL1 and the second folding line FOL2 may extend in the second direction (y-axis direction), and the display device 10 may be folded in the first direction (x-axis direction). In such case, the length of the display device 10 in the first direction (x-axis direction) may be reduced by about half. Alternatively, the first folding line FOL1 and the second folding line FOL2 may extend in a diagonal direction of the display device 10 between the first direction (x-axis direction) and the second direction (y-axis direction). In such case, the display device 10 may be folded in a triangle shape.

When the first folding line FOL1 and the second folding line FOL2 extend in the first direction (x-axis direction) as shown in FIGS. 45 and 46, the length of the folding area FDA in the second direction (y-axis direction) may be smaller than the length in the first direction (x-axis direction). In addition, the length of the first non-folding area NFA1 in the second direction (y-axis direction) may be larger than the length of the folding area FDA in the second direction (y-axis direction). The length of the second non-folding area NFA2 in the second direction (y-axis direction) may be larger than the length of the folding area FDA in the second direction (y-axis direction).

The display area DA may be disposed on the upper surface of display device 10. In FIGS. 45 and 46, each of the display area DA and the non-display area NDA overlaps the folding area FDA, the first non-folding area NFA1 and the second non-folding area NFA2. It is, however, to be understood that the embodiments are not limited thereto. For example, each of the display area DA and the non-display area NDA may overlap at least one of the folding area FDA, the first non-folding area NFA1, and the second non-folding area NFA2.

Display devices constructed according to the principles and some embodiments of the invention include antenna patterns as well as driving electrodes and sensing electrodes. Therefore, such a display device can sense a touch of an object or a person using the mutual capacitance between the driving electrodes and the sensing electrodes as well as transmit and receive radio frequency signals using the antenna patterns.

In display devices constructed according to the principles and some embodiments of the invention the antenna patterns and the antenna pads are all disposed adjacent to one side of a touch sensor area, so the length of the antenna feed lines connecting the antenna patterns with the antenna pads can be reduced. Accordingly, it is possible to reduce loss of radio frequency signals transmitted through the antenna feed lines.

In display devices constructed according to the principles and some embodiments of the invention the touch sensor area includes antenna patterns, so antenna patterns may be formed simultaneously when the driving electrodes, sensing electrodes, and dummy patterns are formed. Therefore, no additional process for forming antenna patterns is required.

In display devices constructed according to the principles and some embodiments of the invention antenna patterns are formed in place of some dummy patterns in the touch sensor area, so a high degree of design freedom can be achieved for the number and size of antenna patterns.

In display devices constructed according to the principles and some embodiments of the invention, shielding electrodes overlap the antenna feed lines in the third direction (z-axis direction) of the display device, so that the electric field by the radio frequency signals applied to the antenna feed lines from the outside can be blocked by the shielding electrodes. As a result, it is possible to reduce the sensor electrodes from being affected by the electric field of the antenna feed lines.

In display devices constructed according to the principles and some embodiments of the invention, the antenna pattern and the antenna feed line are directly connected without passing through the contact holes, and thus it is possible to prevent loss of radio frequency signals caused by the contact resistance in the contact holes. In this manner, when the display device is employed by a portable electronic device including a battery such as a mobile phone, a smart phone and a tablet PC, it is possible to prevent the battery lifetime from being reduced due to additional power consumption caused by loss of radio frequency signals.

In display devices constructed according to the principles and some embodiments of the invention, when an antenna pattern is connected to a first antenna feed line and a second antenna feed line in the display device, the radio frequency signal of a first polarized wave can be transmitted and received via the first antenna feed line, and the radio frequency signal of a second polarized wave can be can be transmitted and received via the second antenna feed line. That is, two radio frequency signals of polarized waves can be transmitted and received using a single antenna pattern.

In display devices constructed according to the principles and some embodiments of the invention may include a plurality of antenna patterns having different areas, so that a plurality of radio frequency signals having different frequencies can be transmitted and received.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a substrate;
a first sensor electrode and a second sensor electrode located on the substrate;
a metal pattern located on the substrate, and electrically separated and spaced apart from the first sensor electrode and the second sensor electrode, the metal pattern for transmitting electromagnetic waves of wireless communications;
a transmitting line electrically connected to the metal pattern; and
an insulating layer between the metal pattern and the transmitting line in a thickness direction,
wherein the first sensor electrode, the second sensor electrode, and the metal pattern are located on the insulating layer,
wherein the transmitting line electrically connected to the metal pattern is located in a different layer from those of the first sensor electrode, the second sensor electrode, and the metal pattern, and
wherein the transmitting line overlaps with the first sensor electrode or second sensor electrode in the thickness direction of the substrate.

2. The display device of claim 1, wherein the metal pattern is connected to the transmitting line through a first contact hole penetrating the insulating layer.

3. The display device of claim 1, wherein the first sensor electrode, the second sensor electrode, and the metal pattern are in contact with an upper surface of the insulating layer.

4. The display device of claim 1, wherein the insulating layer is located on the transmitting line.

5. The display device of claim 1, further comprising a first connector electrically connected to the second sensor electrode, and located in a different layer from those of the first sensor electrode, the second sensor electrode, and the metal pattern.

6. The display device of claim 5, wherein the first connector is connected to the second sensor electrode through a second contact hole penetrating the insulating layer.

7. The display device of claim 5, wherein the insulating layer is located on the pattern transmitting line and the first connector.

8. The display device of claim 5, wherein the insulating layer is in contact with an upper surface of the transmitting line and an upper surface of the first connector.

9. The display device of claim 1, further comprising:
a first sensor line electrically connected to the first sensor electrode; and
a second sensor line electrically connected to the second sensor electrode,
wherein the second sensor line crosses the transmitting line.

10. The display device of claim 9, wherein the first sensor electrode or the second sensor electrode surrounds the metal pattern.

11. An electronic device comprising:
a display device configured to display an image, and comprising:
a substrate;
a first sensor electrode and a second sensor electrode located on the substrate;

a metal pattern located on the substrate, and electrically separated and spaced apart from the first sensor electrode and second sensor electrode, the metal pattern for transmitting electromagnetic waves of wireless communications;

a transmitting line electrically connected to the metal pattern; and an insulating layer between the metal pattern and the transmitting line in a thickness direction, wherein the first sensor electrode, the second sensor electrode, and the metal pattern are located on the insulating layer, wherein the transmitting line electrically connected to the metal pattern is located in a different layer from those of the first sensor electrode, the second sensor electrode, and the metal pattern, and wherein the transmitting line overlaps with the first sensor electrode or second sensor electrode in the thickness direction of the substrate.

12. The electronic device of claim 11, wherein the metal pattern is connected to the transmitting line through a first contact hole penetrating the insulating layer.

13. The electronic device of claim 11, wherein the first sensor electrode, the second sensor electrode, and the metal pattern are in contact with an upper surface of the insulating layer.

14. The electronic device of claim 11, wherein the insulating layer is located on the transmitting line.

15. The electronic device of claim 11, further comprising a first connector electrically connected to the second sensor electrode, and located in a different layer from those of the first sensor electrode, the second sensor electrode, and the metal pattern.

16. The electronic device of claim 15, wherein the first connector is connected to the second sensor electrode through a second contact hole penetrating the insulating layer.

17. The electronic device of claim 15, wherein the insulating layer is located on the transmitting line and the first connector.

18. The electronic device of claim 15, wherein the insulating layer is in contact with an upper surface of the transmitting line and an upper surface of the first connector.

19. The electronic device of claim 11, further comprising:
a first sensor line electrically connected to the first sensor electrode; and
a second sensor line electrically connected to the second sensor electrode,
wherein the second sensor line crosses the transmitting line.

20. The electronic device of claim 19, wherein the display device is implemented as a mobile phone, a smart phone, a tablet PC, a mobile communications terminal, an electronic notebook, an electronic book, a portable multimedia player (PMP), a navigation device, an ultra mobile PC (UMPC), a television, a laptop computer, a monitor, an electronic billboard, or an Internet of Things (IoT) device.

* * * * *